United States Patent [19]
Fujisawa

[11] Patent Number: 5,970,043
[45] Date of Patent: Oct. 19, 1999

[54] DISK DRIVE HAVING A DISK LOADING MECHANISM

[75] Inventor: Shinichi Fujisawa, Akiruno, Japan

[73] Assignee: Teac Corporation, Tokyo, Japan

[21] Appl. No.: 08/869,825

[22] Filed: Jun. 5, 1997

[30] Foreign Application Priority Data

Jun. 7, 1996 [JP] Japan .................................. 8-146146

[51] Int. Cl.$^6$ ............................. G11B 23/00; G11B 33/02
[52] U.S. Cl. ........................... 369/271; 369/36; 369/75.2
[58] Field of Search .................................. 369/270, 75.2, 369/77.2, 36, 271, 291; 360/99.12

[56] References Cited

U.S. PATENT DOCUMENTS

| | | | |
|---|---|---|---|
| 4,498,165 | 2/1985 | Wilkinson, Jr. | 369/270 |
| 4,701,899 | 10/1987 | D'Alayer De Costemor D'Arc | 369/36 |
| 4,734,813 | 3/1988 | Bessho | 360/133 |
| 5,001,700 | 3/1991 | Rowden et al. | 369/270 |

FOREIGN PATENT DOCUMENTS 6-259870  9/1994  Japan .

*Primary Examiner*—Stuart S. Levy
*Assistant Examiner*—Tod Kupstas
*Attorney, Agent, or Firm*—Michael N. Meller

[57] ABSTRACT

A disk loading mechanism of a disk drive includes a turntable which supports a disk at a playback position. A clamper clamps the disk on the turntable when the disk is rotated. A clamper holder supports the clamper such that the clamper is vertically movable relative to the turntable. A turntable moving unit vertically moves the turntable relative to the clamper between a non-contact position and a supporting position, the turntable and the disk being not placed in contact with each other when the turntable is at the non-contact position, and, when the turntable is at the supporting position, the disk being supported on the turntable. A clamper holder moving unit moves the clamper holder between a first position and a second position, the clamper and the disk being not placed in contact with each other when the clamper holder is at the first position, and, when the clamper holder is at the second position, the disk on the turntable is clamped by the clamper. The turntable moving unit and the clamper holder moving unit are configured to effectively prevent deformation of the disk when the disk is clamped by the clamper or released from the clamper.

20 Claims, 53 Drawing Sheets

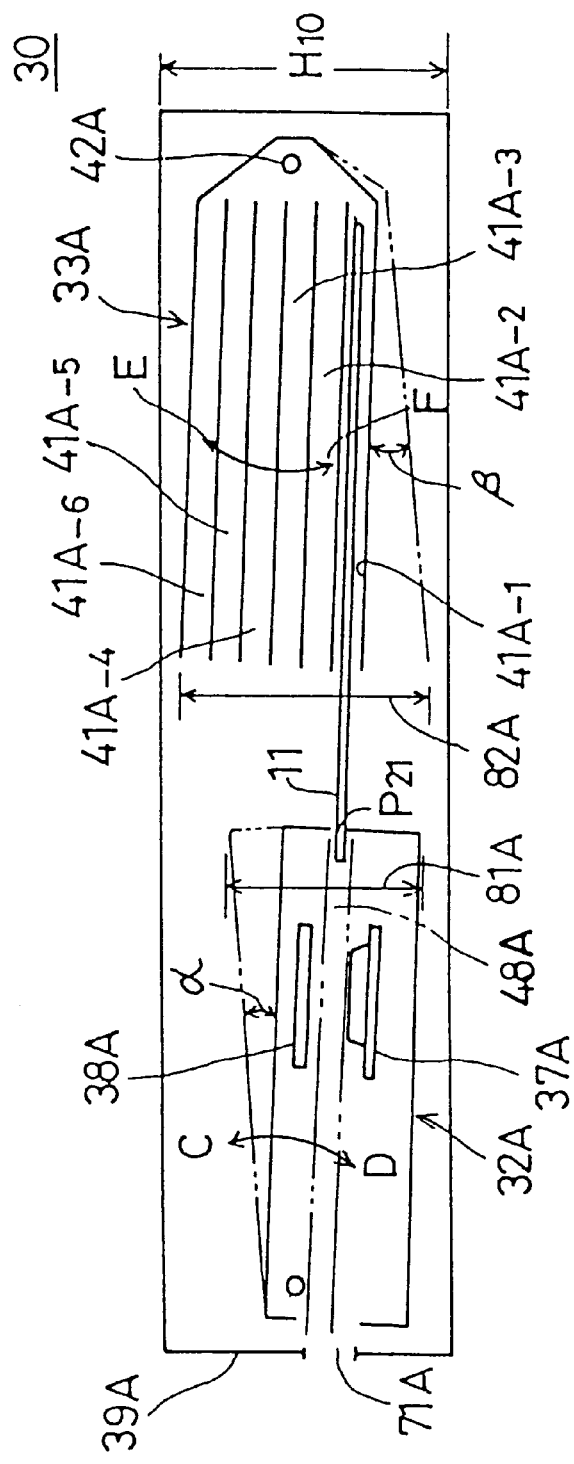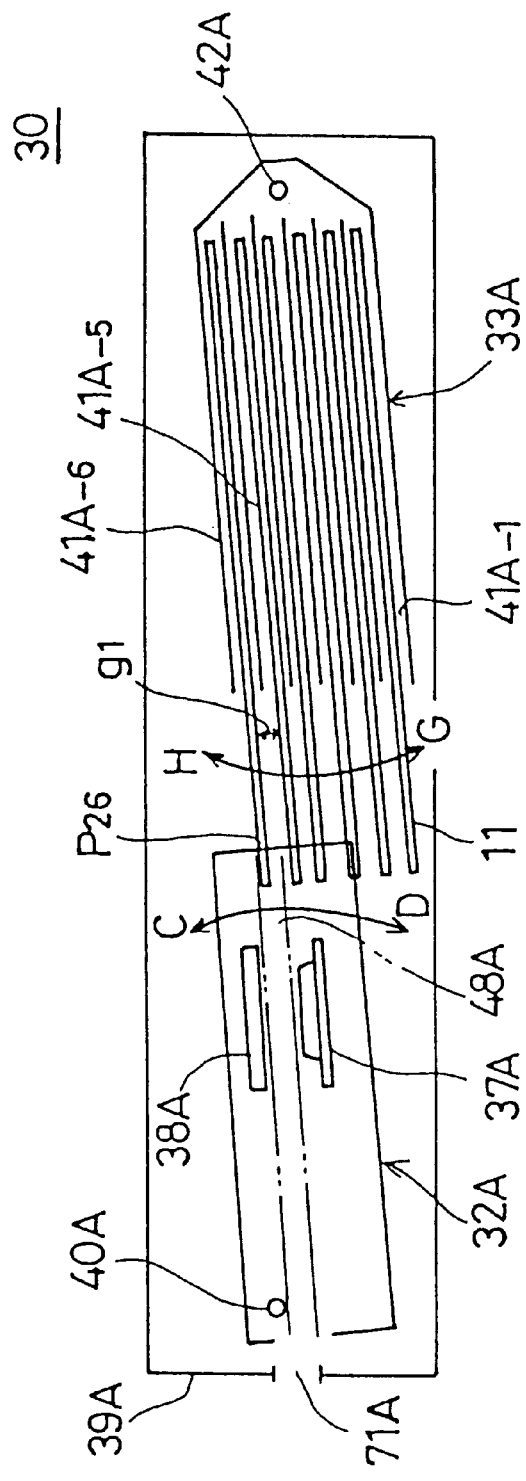

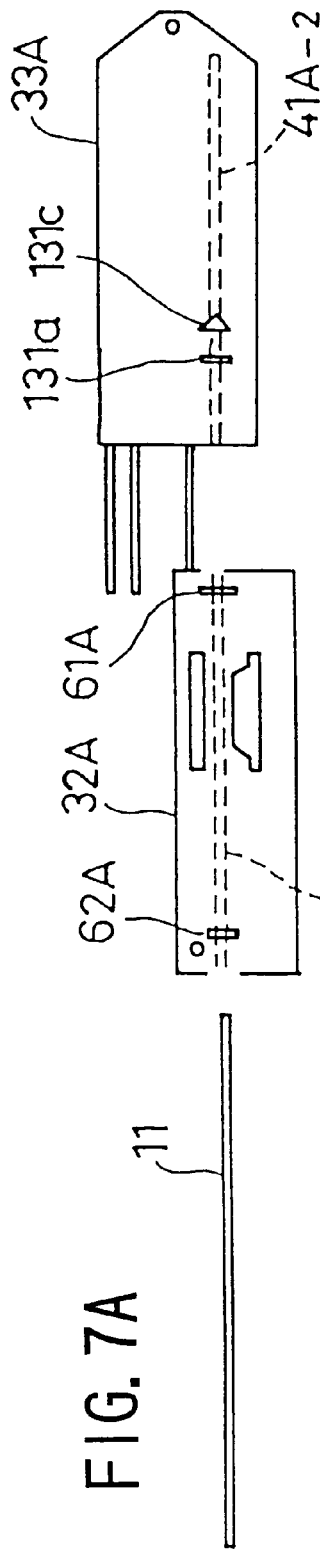
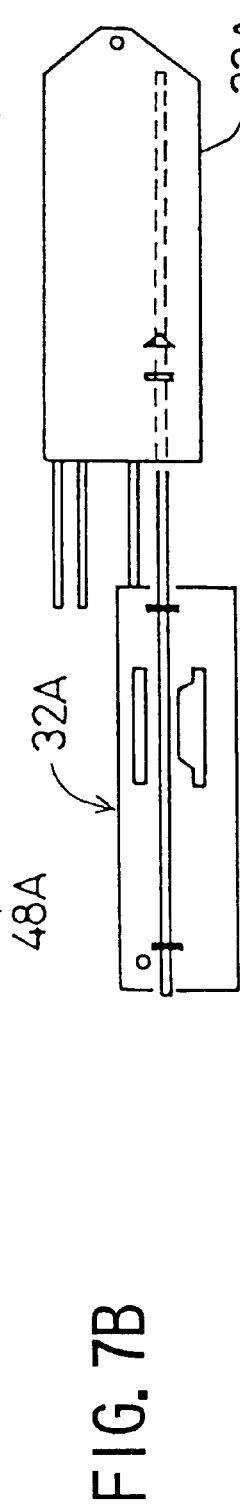
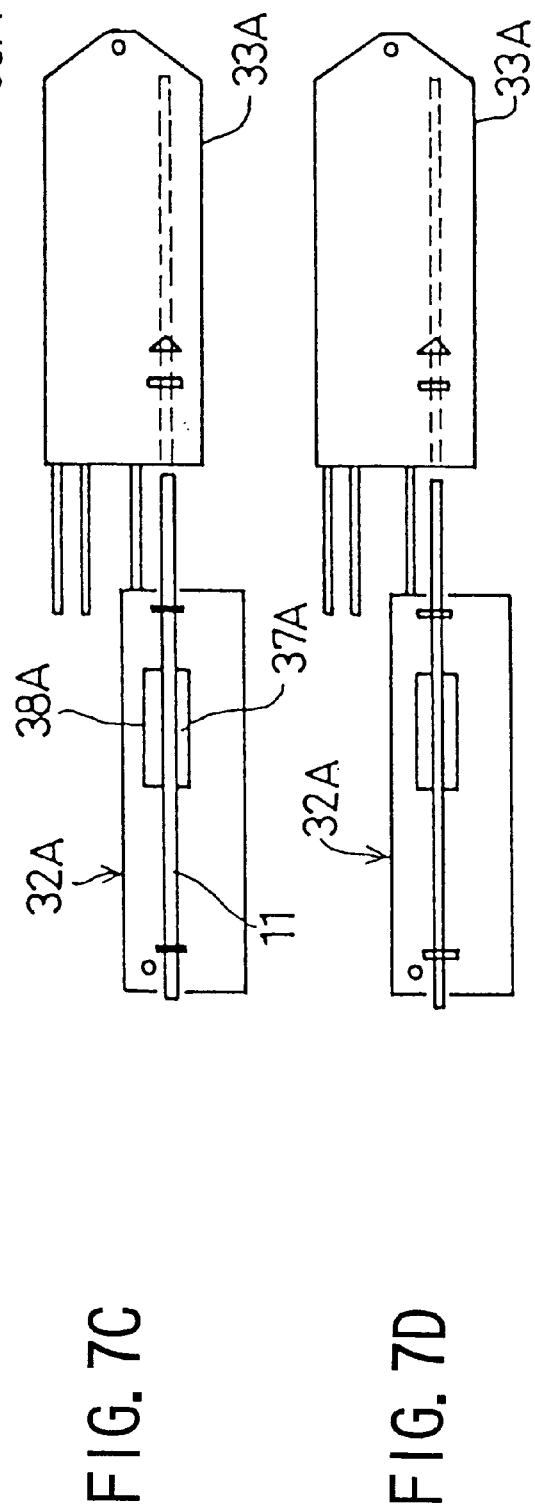
FIG. 7A
FIG. 7B
FIG. 7C
FIG. 7D

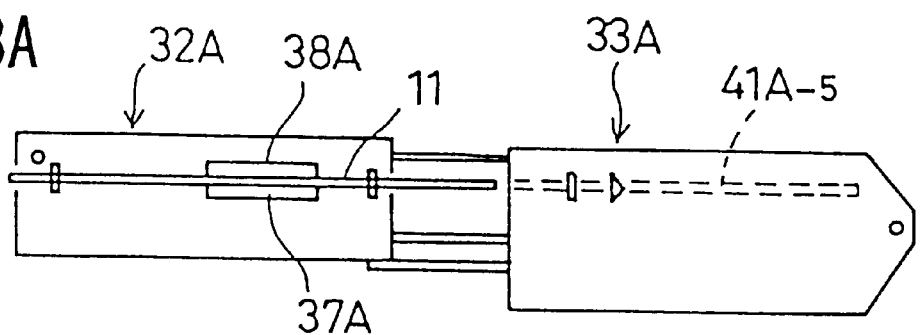
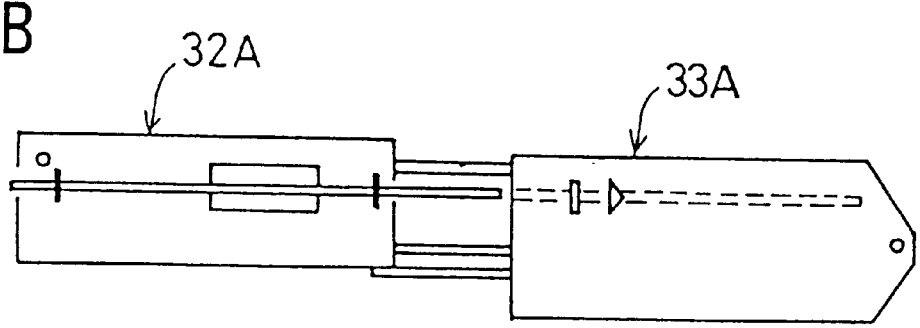
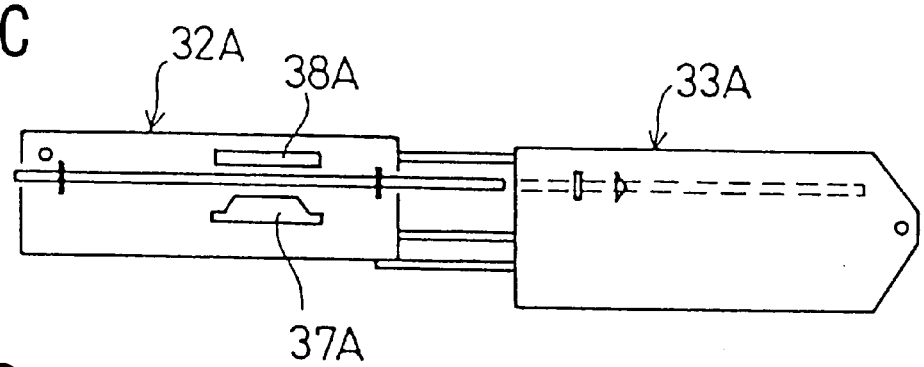
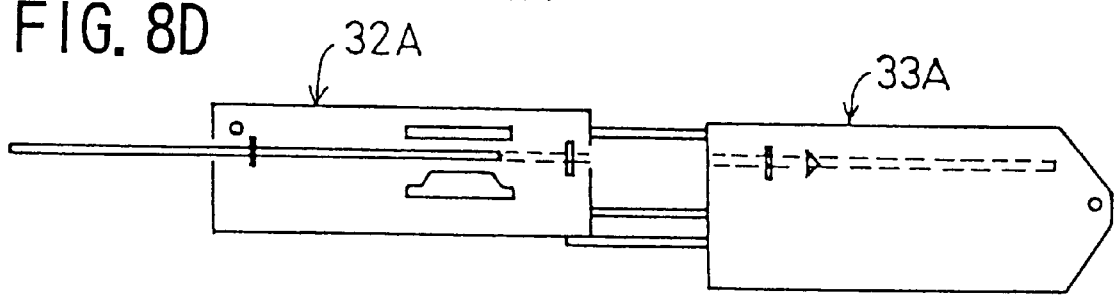

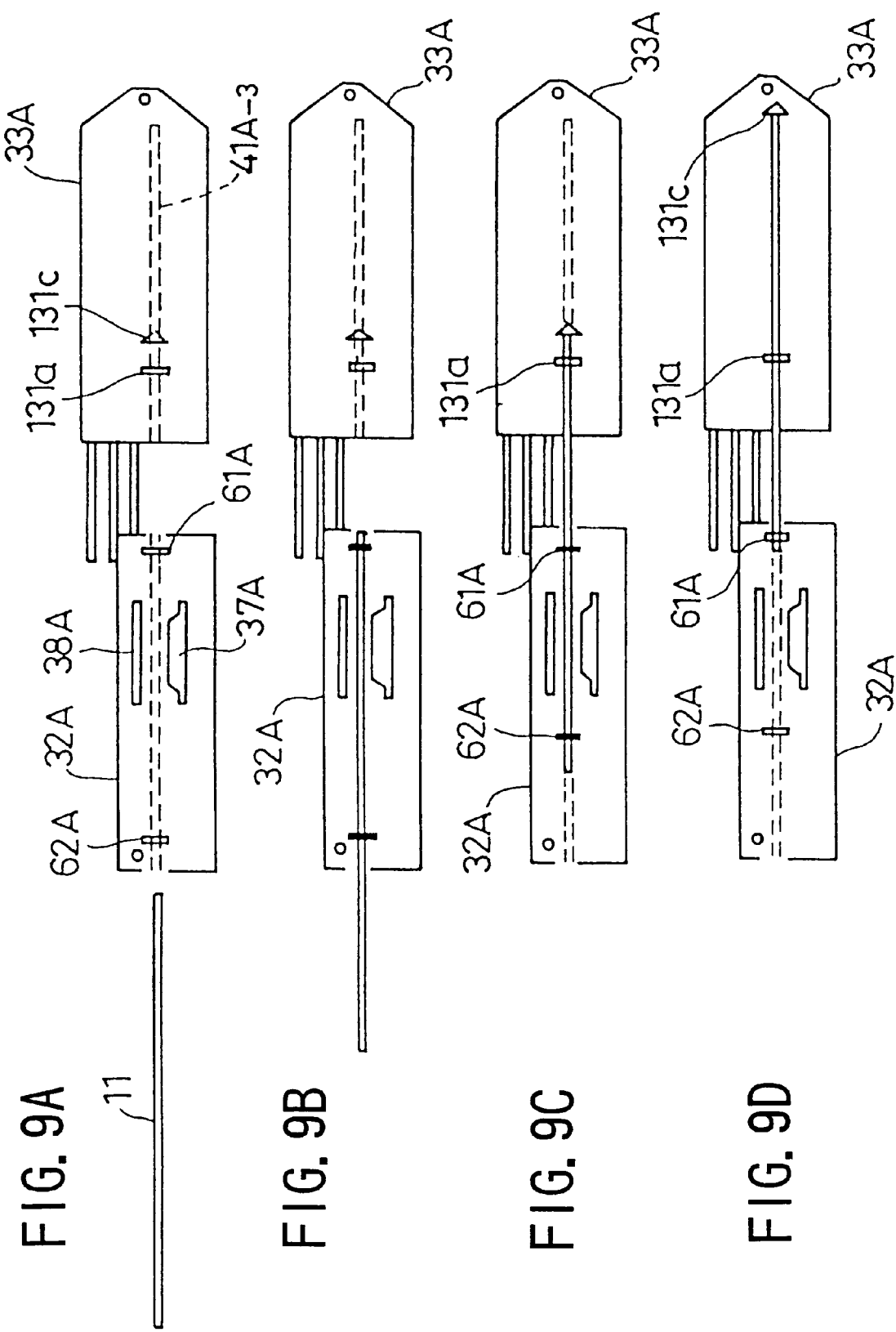

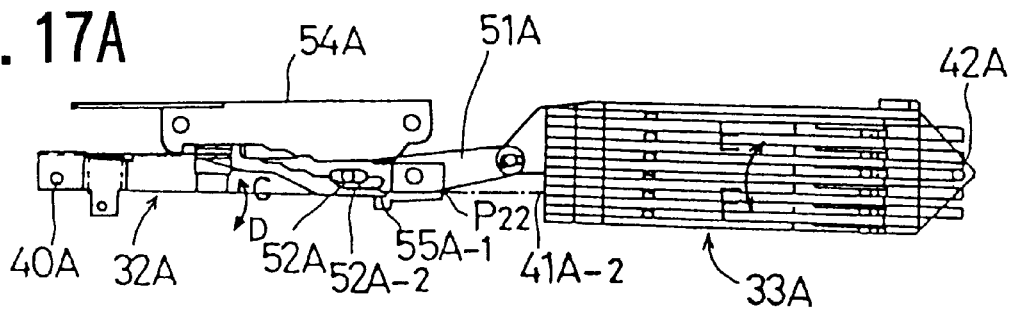
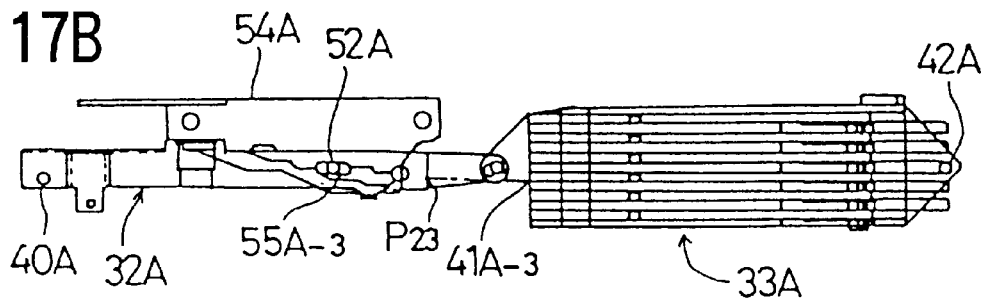
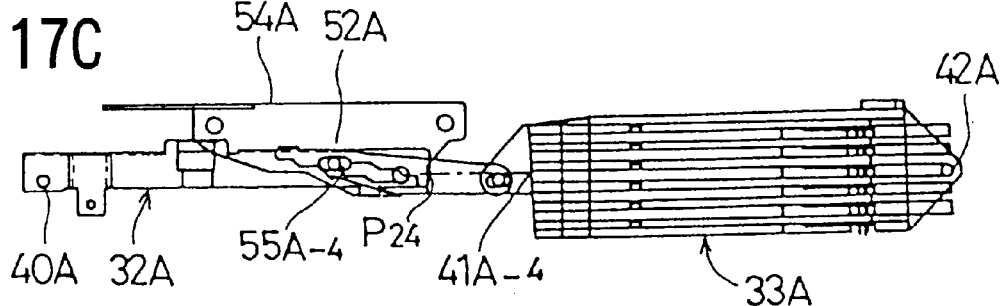
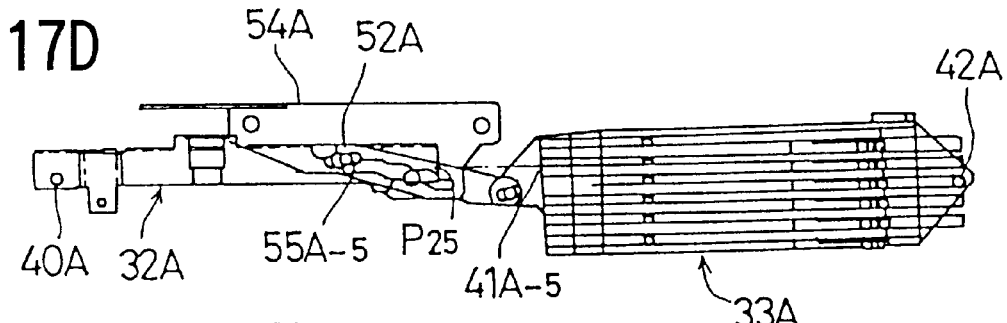
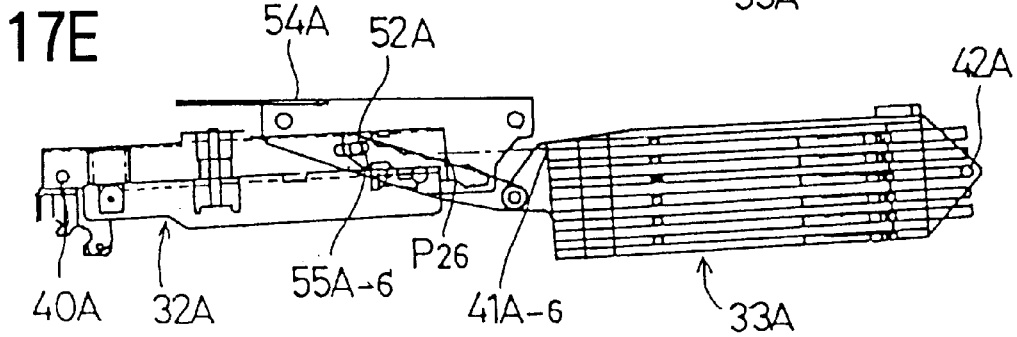

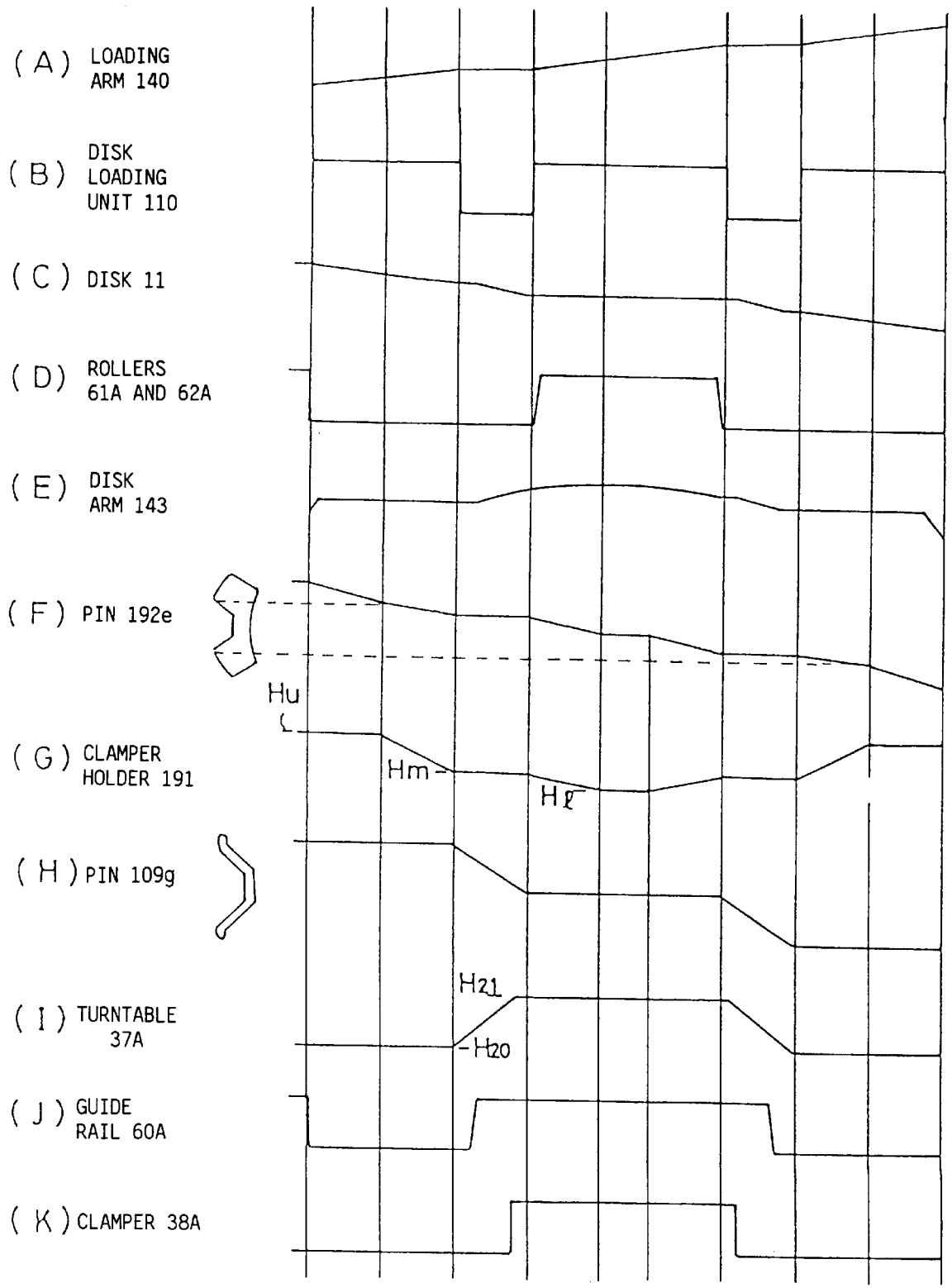

FIG. 35D

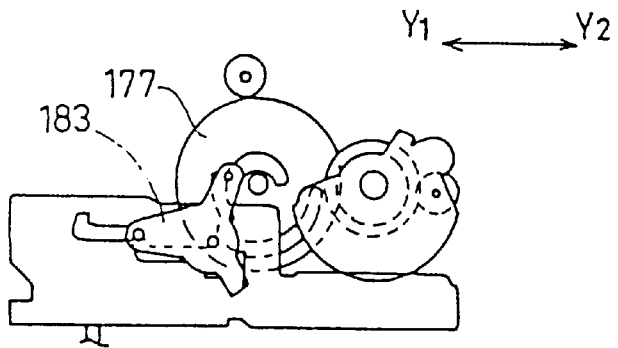
FIG. 36A
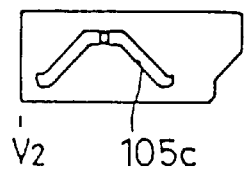
FIG. 36B
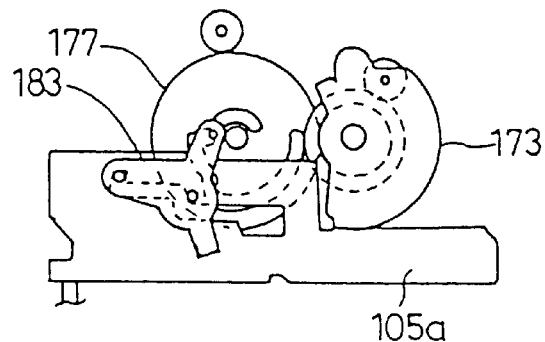
FIG. 36C
FIG. 36D
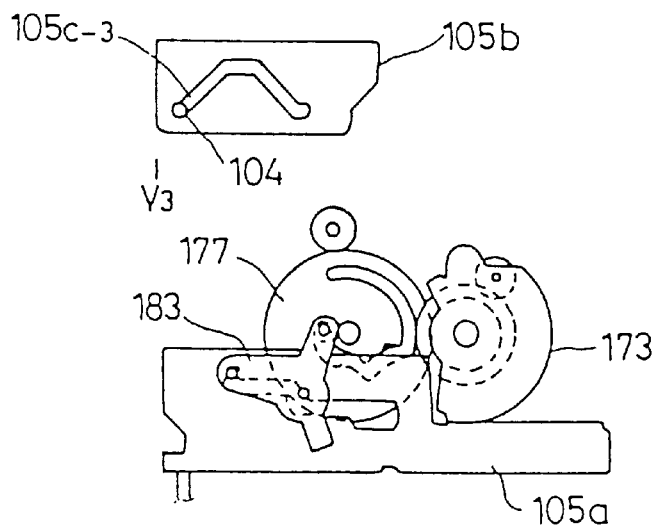
FIG. 36E
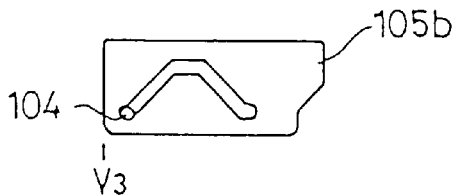
FIG. 36F

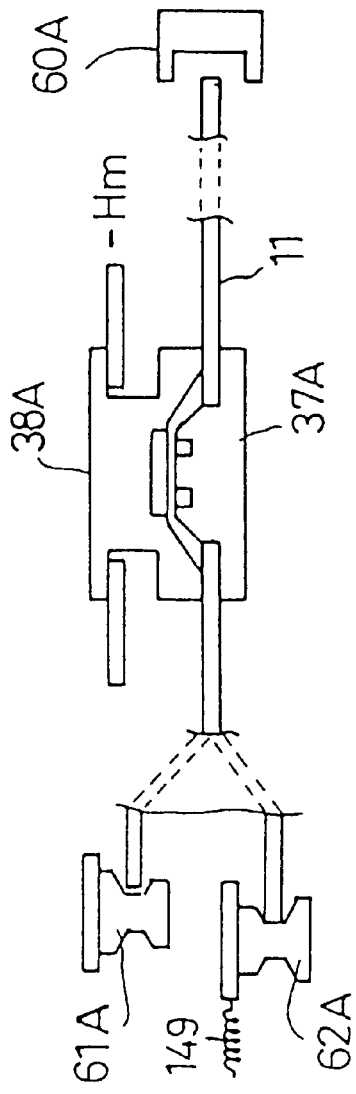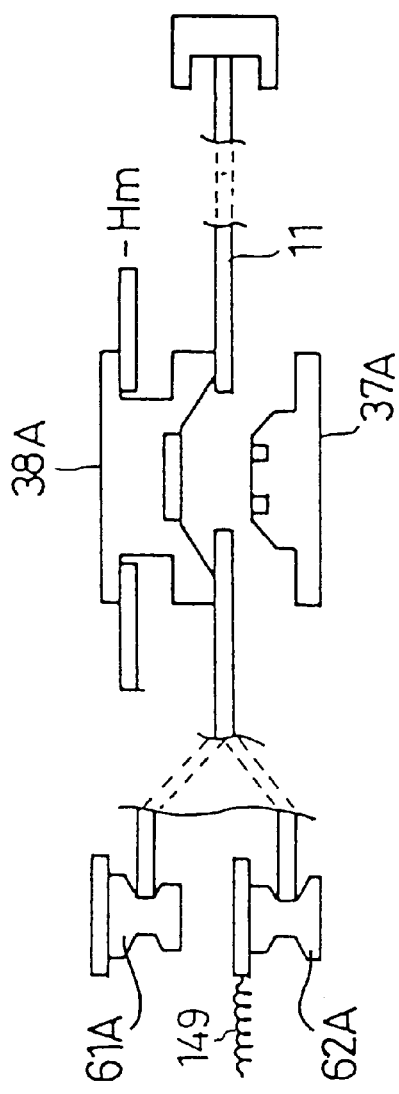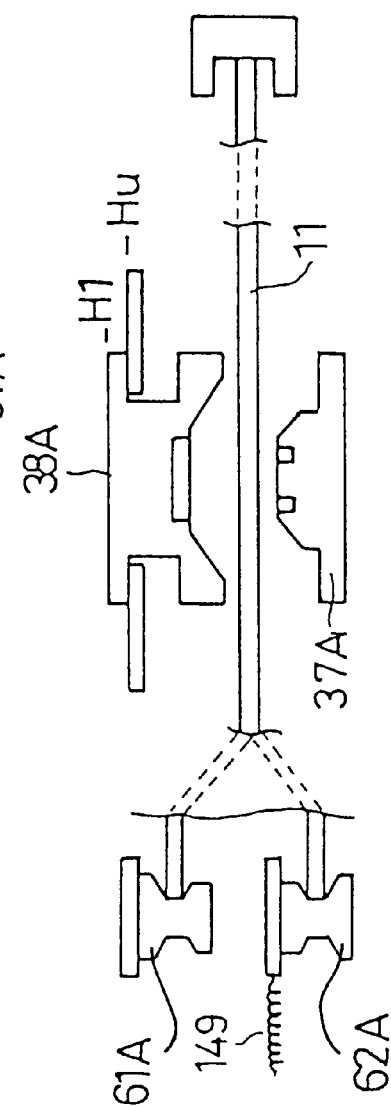

SWITCH 160

SENSOR 106

DISK DRIVE HAVING A DISK LOADING MECHANISM

BACKGROUND OF THE INVENTION

(1) Field of the Invention

The present invention generally relates to a disk drive for use in a computer system, and more particularly to a disk drive having a disk loading mechanism in which a disk from a disk holder unit is transported to a playback position and the disk at the playback position is clamped by a clamper on a turntable when a data signal is reproduced from the disk.

(2) Description of the Related Art

A CD-ROM disk drive for use in a computer system is known. In the CD-ROM disk drive, a CD-ROM (Compact Disk—Read Only Memory) from a disk holder unit is transported to a playback position and the CD-ROM at the playback position is clamped by a clamper on a turntable. The CD-ROM clamped by the clamper is rotated by the turntable when a data signal is reproduced from the CD-ROM.

It is desirable that the CD-ROM which is processed by the CD-ROM disk drive to reproduce the data signal is hardly deformed when the CD-ROM above the turntable is clamped by the clamper or when the CD-ROM clamped on the turntable is released by the clamper.

The CD-ROM is a type of data recording medium. Hereinafter, the CD-ROM will be called the disk for the sake of convenience.

FIGS. 1A through 1D show a conventional disk clamping mechanism 300 used for a disk drive.

As shown in FIGS. 1A and 1B, in the conventional disk clamping mechanism 300, a disk 11 is placed between a turntable 301 and a clamper 303. The disk 11 when it is supported on the turntable 301 is rotated by the turntable 301 around the center of the turntable 301. A clamper holder 302 movably supports the clamper 303, and moves up and down the clamper 303 according to a movement of the clamper holder 302.

In the above disk clamping mechanism 300, the peripheral edge 11a of the disk 11 is held by a pair of holding members 304 and 305 when the disk 11 above the turntable 301 is clamped by the clamper 303 or when the disk 11 clamped on the turntable 301 is released by the clamper 303.

As shown in FIGS. 1A and 1B, when the disk 11 above the turntable 301 is clamped by the clamper 303, the turntable 301 is moved up toward the clamper 303 and the clamper holder 302 is maintained at an upper position "H100". If the disk 11 deviates from the center of the turntable 301, the clamping of the disk 11 between the turntable 301 and the clamper 303 may be defective and a deformation of the disk 11 on the turntable 301 may occur when the turntable 301 is moved up, as shown in FIG. 1B. Since the clamper holder 302 is maintained at the upper position "H100", the clamper 303 is retained by the clamper holder 302 at the upper position "H100". When the turntable 301 is moved up, the clamping of the disk 11 between the turntable 301 and the clamper 303 may be incomplete. Therefore, the disk 11 when it is clamped on the turntable 301 is deformed.

As shown in FIGS. 1C and 1D, when the disk 11 clamped on the turntable 301 is released by the clamper 303, the turntable 301 is moved down away from the clamper 303 and the clamper holder 302 is maintained at a lower position "H101". Since the clamper holder 302 is maintained at the lower position "H101", the clamper holder 302 can be moved up from the lower position "H101" by a difference "j" in the height between the upper position "H100" and the lower position "H101". Therefore, with respect to the clamper holder 302, the clamper 303 can be moved down from the position shown by FIG. 1C by the difference "j". The clamper 303 is attracted by the turntable 301 by using an electromagnetic force when the disk 11 is placed between the turntable 301 and the clamper 303. Therefore, when the turntable 301 is moved down, the clamper 303 is moved down together with the turntable 301. The releasing of the disk 11 on the turntable 301 from the clamper 303 may be incomplete and the disk 11 at this time is deformed as shown in FIG. 1D.

Accordingly, the above-described conventional disk clamping mechanism 300 has a problem in that the disk 11 may be deformed when the disk 11 above the turntable 301 is clamped or when the disk 11 clamped on the turntable 301 is released by the clamper 303. A deformation of the disk is detrimental to data recorded on the disk and a reproducing operation of the disk drive.

SUMMARY OF THE INVENTION

A general object of the present invention is to provide an improved disk drive in which the above-described problems are eliminated.

Another, more specific object of the present invention is to provide a disk drive having a disk loading mechanism which effectively prevents the deformation of the disk when the disk above the turntable is clamped by the clamper.

Still another object of the present invention is to provide a disk drive having a disk loading mechanism which effectively prevents the deformation of the disk when the disk clamped on the turntable is released from the clamper.

The above-mentioned objects of the present invention are achieved by a disk drive having a disk loading mechanism which comprises: a turntable which supports a disk at a playback position to rotate the disk around a center of the turntable; a clamper which clamps the disk on the turntable when the disk is rotatable around the center of the turntable; a clamper holder which supports the clamper such that the clamper is vertically movable relative to the turntable; a turntable moving unit which vertically moves the turntable relative to the clamper between a non-contact position and a supporting position, the turntable and the disk being not placed in contact with each other when the turntable is at the non-contact position, to form a transporting passage between the turntable and the clamper through which the disk is allowed to pass, and, when the turntable is at the supporting position, the disk being supported on the turntable; and a clamper holder moving unit which moves the clamper holder between a first position and a second position, the clamper and the disk being not placed in contact with each other when the clamper holder is at the first position, and, when the clamper holder is at the second position, the disk on the turntable is clamped by the clamper, wherein the turntable moving unit and the clamper holder moving unit are configured such that, when the disk above the turntable is clamped by the clamper, the clamper holder moving unit moves the clamper holder from the first position to an intermediate position between the first position and the second position to move the clamper toward the turntable, the turntable moving unit vertically moves the turntable from the non-contact position to the supporting position after the clamper is moved toward the turntable, and the clamper holder moving unit finally moves the clamper holder from the intermediate position to the second position so that the disk on the turntable is clamped by the clamper.

In the disk loading mechanism of the disk drive of the present invention, the turntable moving unit and the clamper holder moving unit are configured such that, when the disk above the turntable is clamped by the clamper, the clamper holder moving unit moves the clamper holder from the first position to the intermediate position to move the clamper toward the turntable before the turntable moving unit vertically moves the turntable from the non-contact position to the supporting position. Accordingly, it is possible to effectively prevent the deformation of the disk when the position of the disk deviates from the playback position and the disk above the turntable is clamped by the clamper.

Further, in the disk loading mechanism, the turntable moving unit and the clamper holder moving unit are configured such that, when the disk on the turntable at the playback position is released from the clamper, the clamper holder moving unit moves the clamper holder from the second position to the intermediate position before the turntable moving unit vertically moves the turntable from the supporting position to the non-contact position. Accordingly, it is possible for the disk loading mechanism of the disk drive of the present invention to effectively prevent the deformation of the disk when the disk clamped on the turntable is released from the clamper.

BRIEF DESCRIPTION OF THE DRAWINGS

Other objects, features and advantages of the present invention will be more apparent from the following detailed description when read in conjunction with the accompanying drawings in which:

FIGS. 3A and 3B are diagrams for explaining a relationship between a playback unit and a disk holder unit in the disk drive of FIG. 2;

FIGS. 7A through 7D are diagrams for explaining an operation of the disk transporting unit;

FIGS. 8A through 8D are diagrams for explaining an operation of the disk transporting unit;

FIGS. 9A through 9D are diagrams for explaining an operation of the disk transporting unit;

FIGS. 17A through 17E are diagrams for explaining operations of the rotating unit;

FIG. 18 is a diagram showing movements of the elements of the disk drive;

FIGS. 35A through 35F and FIGS. 36A through 36F are diagrams for explaining operations of the elements of the disk loading unit;

FIGS. 42A through 42C are diagrams for explaining an operation of the disk clamping unit when the disk on the turntable at the playback position is released from the clamper;

DETAILED DESCRIPTION OF THE PREFERRED EMBODIMENT

A description will now be given of the preferred embodiment of the present invention with reference to the accompanying drawings.

Figure 1A:
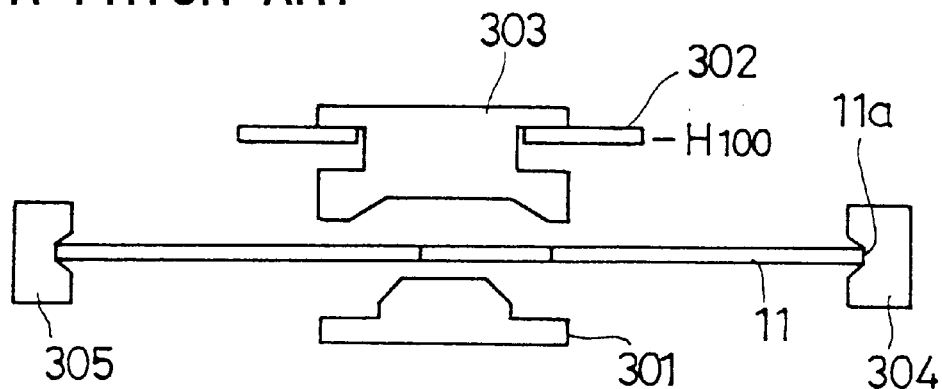
FIGS. 1A through 1D are diagrams for explaining a conventional disk clamping mechanism.
Figure 1B:
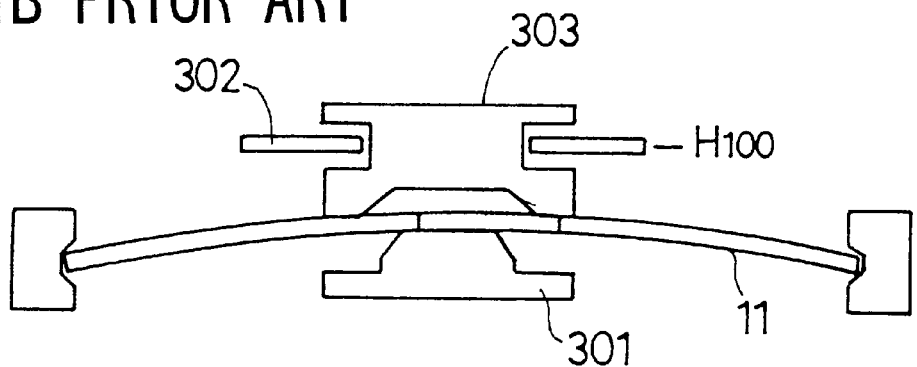
Figure 1C:
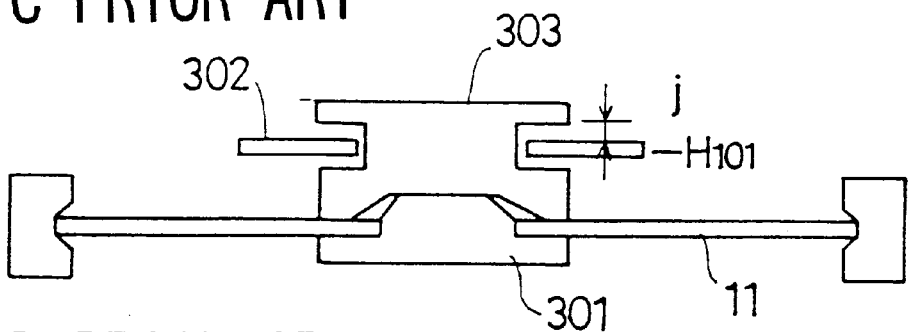
Figure 1D:
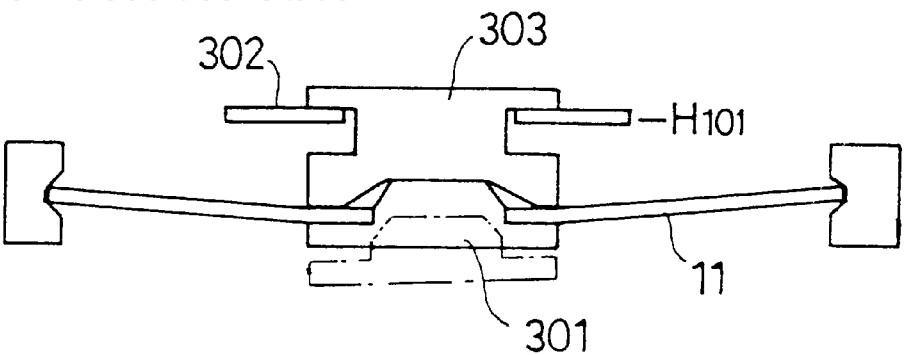
Figure 2:
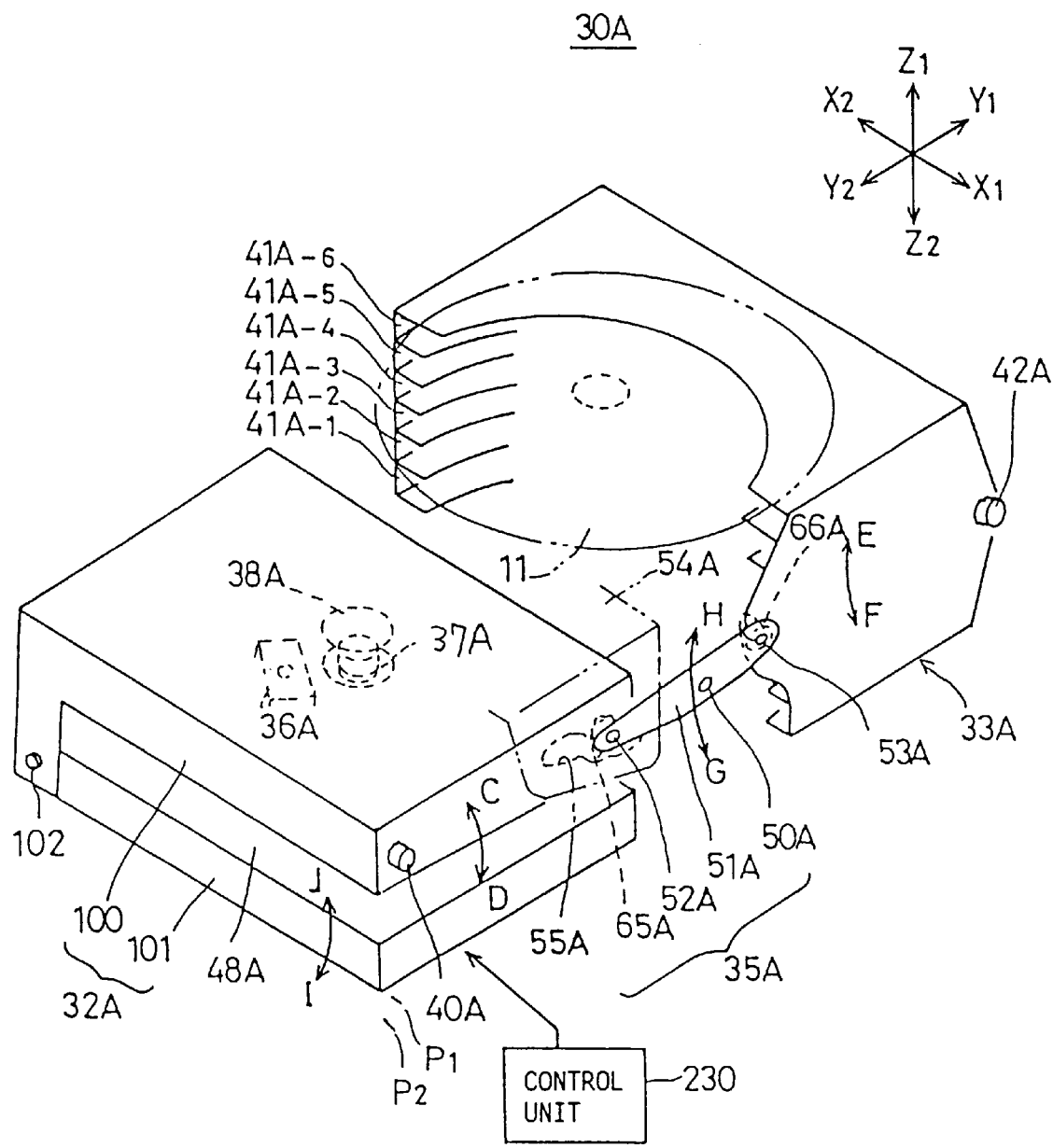
FIG. 2 is a diagram showing a disk drive embodying the present invention.
Figure 4:
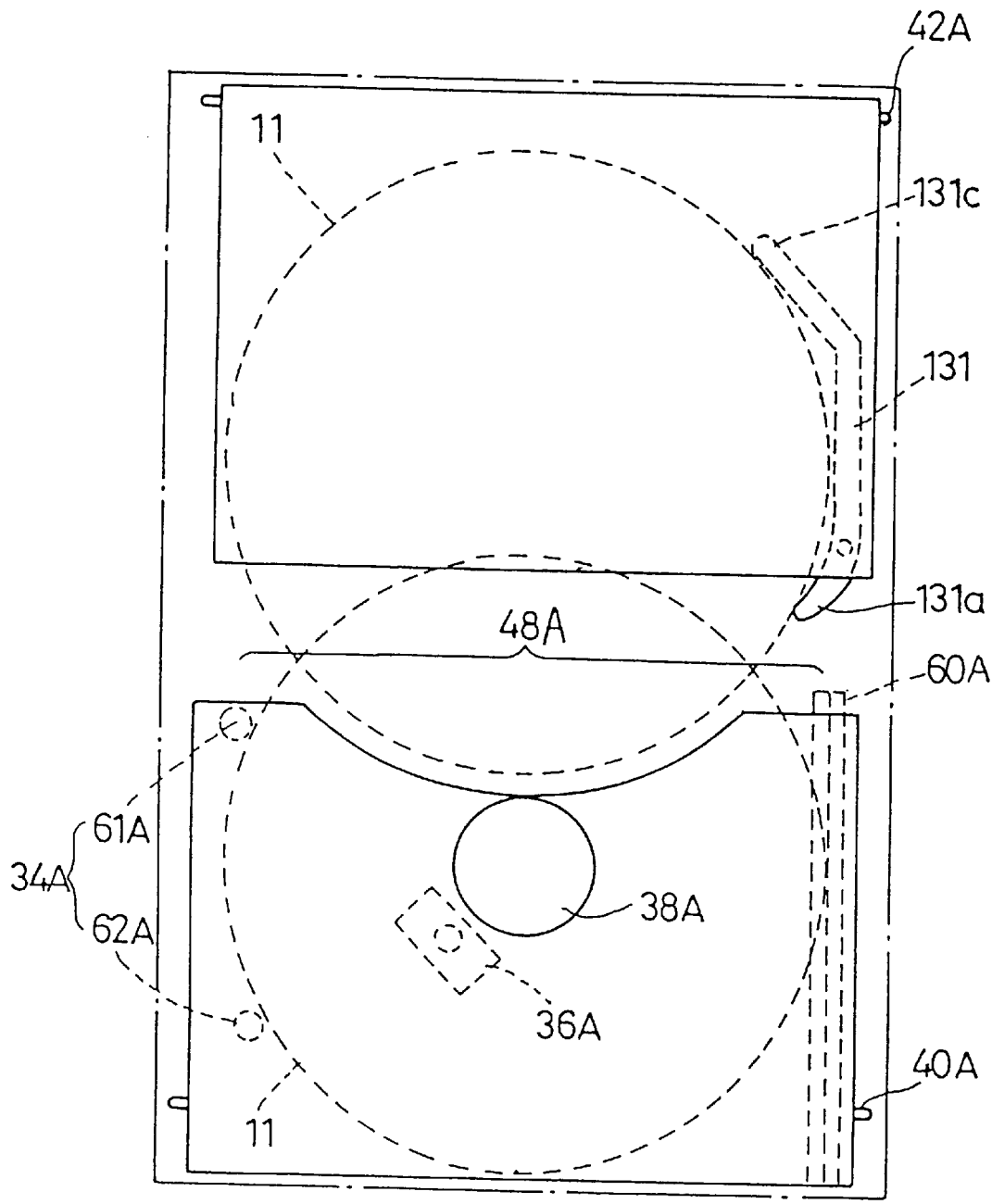
FIG. 4 is a diagram showing the disk drive of FIG. 2.

FIGS. 2 through 4 show a CD-ROM disk drive 30A embodying the present invention. In the accompanying drawings, unless otherwise specified, a lateral direction of the disk drive 30A is indicated by the arrow X1 or X2, a longitudinal direction of the disk drive 30A is indicated by the arrow Y1 or Y2, and a vertical direction of the disk drive 30A is indicated by the arrow Z1 or Z2.

As shown in FIG. 2, the disk drive 30A comprises a playback unit 32A, a disk holder unit 33A, and a rotating unit 35A. A disk 11 held by the disk holder unit 33A is indicated by a two-dot chain line in FIG. 2. The disk 11 in the present embodiment is a CD-ROM (Compact Disk— Read Only Memory). As shown in FIG. 4, the disk drive 30A includes a disk transporting unit 34A.

As shown in FIG. 2, the playback unit 32A comprises an optical pickup 36A, a turntable 37A and a clamper 38A. The playback unit 32A plays back the disk 11 which is transported from the disk holder unit 33A to the turntable 37A through a transporting passage 48A.

The disk holder unit 33A can hold a plurality of disks which are stacked in horizontal conditions in a plurality of disk holding portions 41A-1 through 41A-6. In the present embodiment, six disks can be held in the disk holding portions 41A-1 through 41A-6 of the disk holder unit 33A. The disk 11 shown in FIG. 2 is held in one of the disk holding portions 41A-1 through 41A-6. The disk transporting unit 34A transports the disk 11 from the disk holder unit 33A to the turntable 37A of the playback unit 32A. The playback unit 32A and the disk holder unit 33A are connected to each other by the rotating unit 35A, and the playback unit 32A and the disk holder unit 33A are rotatable to each other by the rotating unit 35A.

In the disk drive 30A, a position of the disk 11 (indicated by the dotted line as the upper circle in FIG. 4) which is placed within the disk holder unit 33A and a position of the disk 11 (indicated by the dotted line as the lower circle in FIG. 4) which is placed within the playback unit 32A overlaps each other. When the disk 11 is held in the disk holder unit 33A, the turntable 37A in the playback unit 32A is locked and it is not rotated. When the disk 11 is placed on the turntable 38A in the playback unit 32A, the disk 11 and the turntable 37A can be rotated around the center of the turntable 37A.

Figure 14:
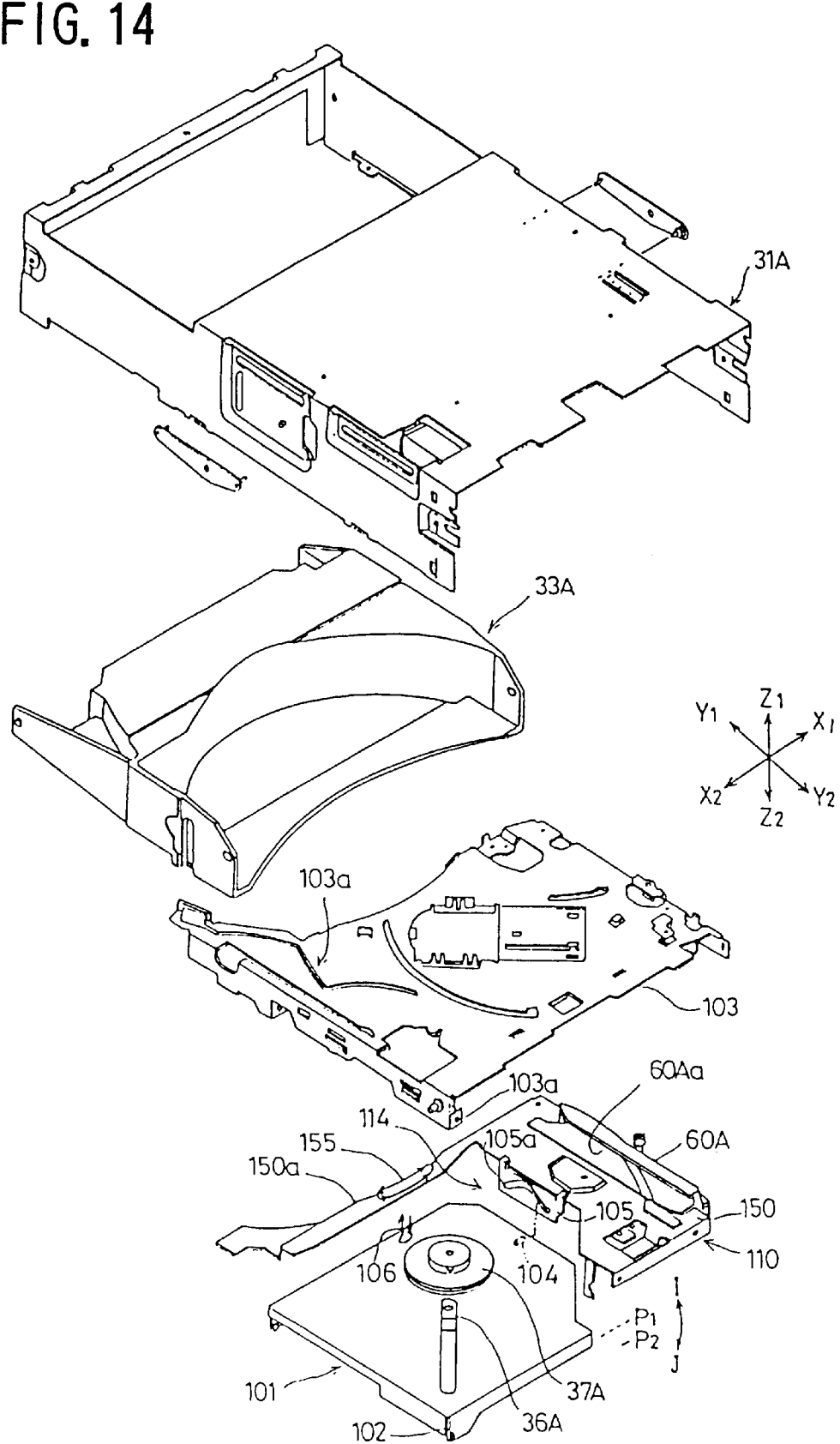
FIG. 14 is an exploded view of the elements of the disk drive.

FIG. 14 is an exploded view of the elements of the disk drive 30A of FIG. 2. As shown in FIG. 14, the disk drive 30A comprises a frame 31A, the disk holder unit 33A and the playback unit 32A. The playback unit 32A includes, as shown in FIG. 2, a disk loading member 100 and a disk drive member 101. The disk drive member 101 is supported by the disk loading member 100. The transporting passage 48 is formed as the location between the disk loading member 100 and the disk drive member 101.

As shown in FIG. 2, the disk loading member 100 has a pair of laterally extending pins 40A which are provided on the sides at the front end corners of the disk loading member 100. The pins 40A are fitted to the frame 31A, and the disk loading member 100 is supported by the frame 31A through the pins 40A such that the disk loading member 100 is rotatable around the pins 40A in a rotating direction indicated by the arrow "C" or "D" in FIG. 2.

As shown in FIG. 2, the disk drive member 101 has a longitudinally extending pin 102 which is provided at the front end corner of the disk drive member 101. The pin 102 is fitted into a center hole 103a of a chassis 103 which is shown in FIG. 14. As shown in FIG. 14, the disk drive member 101 includes a laterally extending pin 104 which is provided on the side at the middle portion of the disk drive member 101. The pin 104 is fitted into a guide groove 105c of a slide member 105 shown in FIG. 14. Thus, the disk drive member 101 is supported by the slide member 105 and the chassis 103 through the pin 104 and the pin 102. The disk drive member 101 is rotatable around the pin 102 in a rotating direction indicated by the arrow "I" or "J" in FIG. 2.

The guide groove 105c of the slide member 105 is shaped, as shown in FIG. 14, such that, when the slide member 105 is moved in the longitudinal direction (indicated by the arrow Y1 or Y2) relative to the disk drive member 101, the disk drive member 101 is rotated around the pin 102 in a rotating direction (indicated by the arrow I or J in FIG. 2). In accordance with the movement of the slide member 105 relative to the disk drive member 101, the disk drive member 101 is moved up and down, or vertically rotatable around the pin 102 between a horizontal position indicated by "P1" and a slanted position indicated by "P2" as shown in FIG. 2.

As shown in FIG. 14, the disk drive member 101 comprises the optical pickup 36A, the turntable 37A, and a disk detecting sensor 106. The disk detecting sensor 106 optically detects whether the disk 11 is placed in the disk drive member 101.

Figure 15:
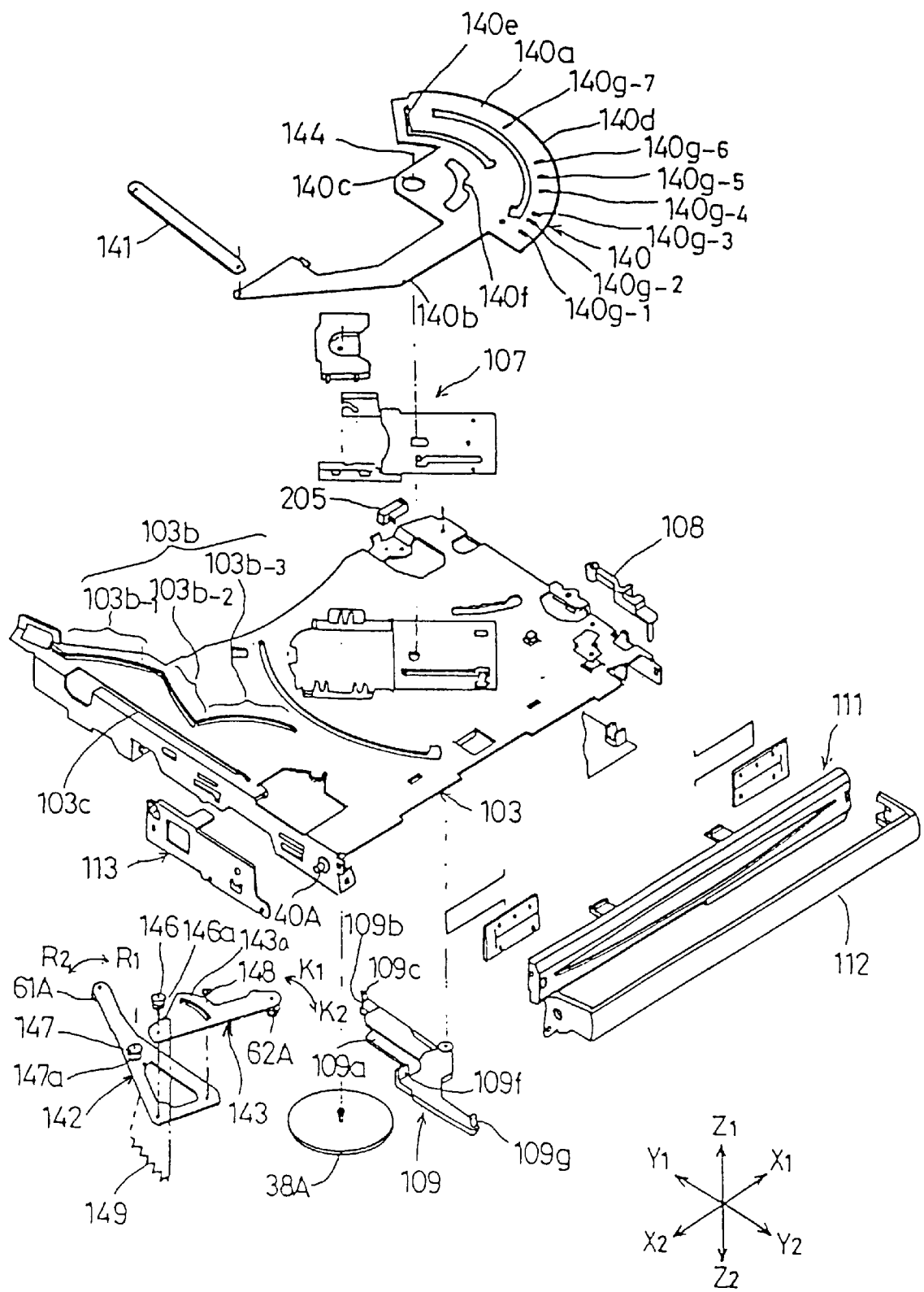
FIG. 15 is an exploded view of the elements of the disk transporting unit.

The disk loading member 100 has the chassis 103. The disk loading member 100 includes the clamper 38A, the disk transporting unit 34A, and various other elements arranged on the chassis 103. FIG. 15 is an exploded view of the elements of the disk loading member 100 which will be described later.

The disk loading member 100 comprises a disk loading unit 110 arranged on the bottom surface of the chassis 103. The disk loading unit 110 has a chassis base 150. The disk loading unit 110 comprises a loading motor 174, the slide member 105, and a plurality of gears arranged on the chassis base 150. The elements of the disk loading unit 110 will be described later.

The disk holder unit 33A includes, as shown in FIG. 2, a pair of laterally extending pins 42A which are provided on the sides at the rear ends of the disk holder unit 33A. The pins 42A are fitted to the frame 31A, and the disk holder unit 33A is supported by the frame 31A through the pins 42A such that the disk holder unit 33A is rotatable around the pins 42A in a rotating direction (indicated by the arrow E or F in FIG. 2).

As shown in FIG. 3A, in the disk holder unit 33A, the disk 11 is held in one of the disk holding portions 41A-1 through 41A-6. As shown in FIG. 3B, six disks 11 can be stacked in the disk holding portions 41A-1 through 41A-6 of the disk holder unit 33A one by one. In the condition of FIG. 3B, a distance between two adjacent ones of the six disks 11 in the disk holder unit 33A is indicated by "g1", and the distance eagle is great enough not to cause the friction between the two adjacent disks 11 when one of the six disks 11 is transported from the disk holder unit 33A to the playback unit 32A or returned from the playback unit 32A to the disk holder unit 33A.

Figure 16:
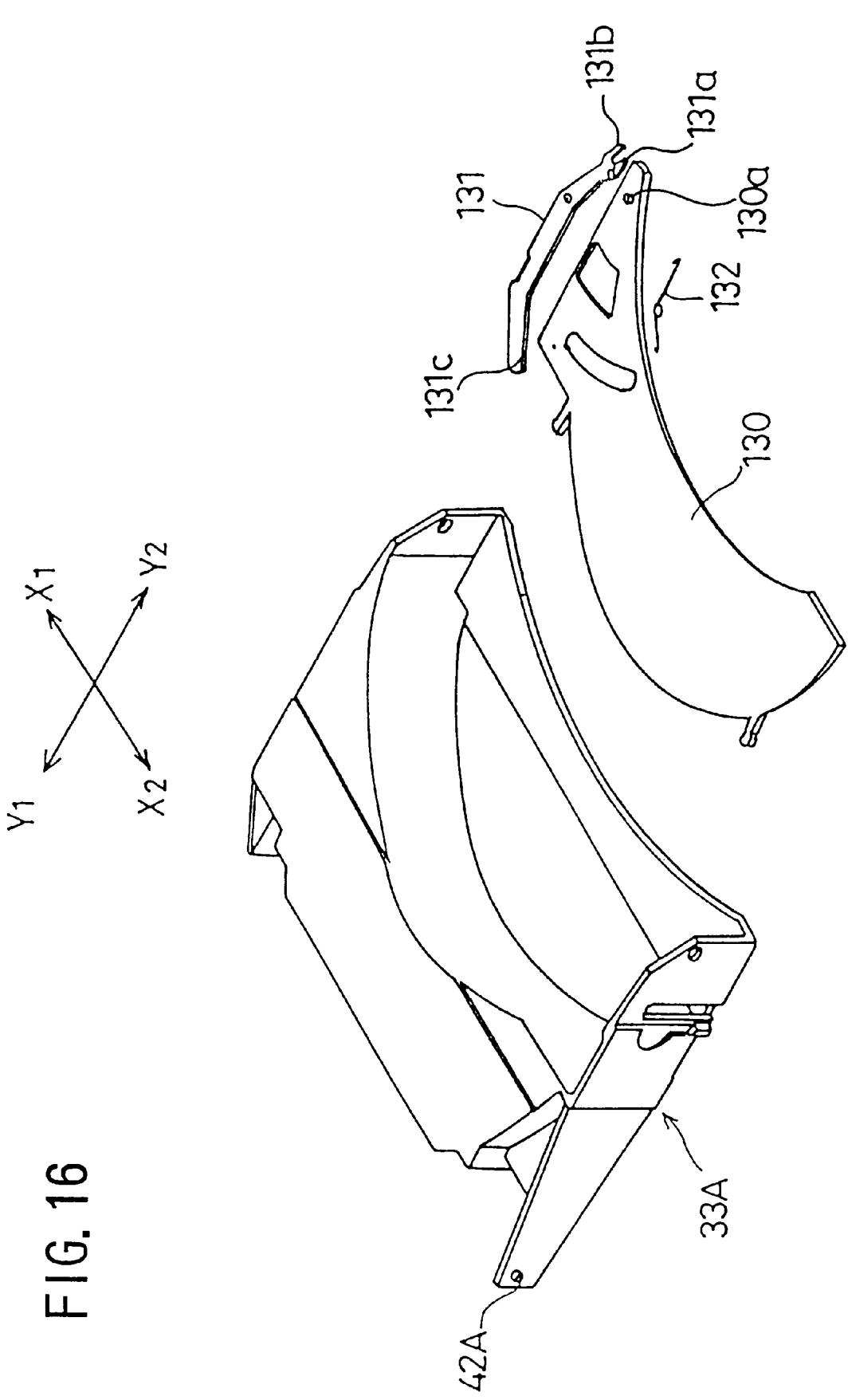
FIG. 16 is an exploded view of the elements of the disk holder unit.

FIG. 16 shows the elements of the disk holder unit 33A in the disk drive 30A of FIG. 2. In the disk holder unit 33A, two adjacent ones of the disk holding portions 41A-1 through 41A-6 are separated by a separating plate 130. For each of the separating plates 130 of the disk holder unit 33A, a disk handling arm 131 is provided. When the disk 11 at one of the disk holding portions of the disk holder unit 33A is transported to the playback unit 32A, the disk handling arm 131 serves to push the disk 11 outward from the disk holder unit 33A. Also, when the disk 11 from the playback unit 32A is returned back to the original portion of the disk holder unit 33A, the disk handling arm 131 serves to retain the disk 11 in a corresponding one of the disk holding portions 41A-1 through 41A-6 of the disk holder unit 33A. The respective disk handling arms 131 provided for the disk holding portions 41A-1 through 41A-6 are movable independently of each other.

As shown in FIG. 16, the disk handling arm 131 has a retaining claw 131a at one end of the disk handling arm 131 and a pushing claw 131c at the other end thereof. The disk handling arm 131 is rotatably supported at its middle portion on the disk holder unit 33A. The retaining claw 131a and the pushing claw 131c will be described later.

Figure 11:
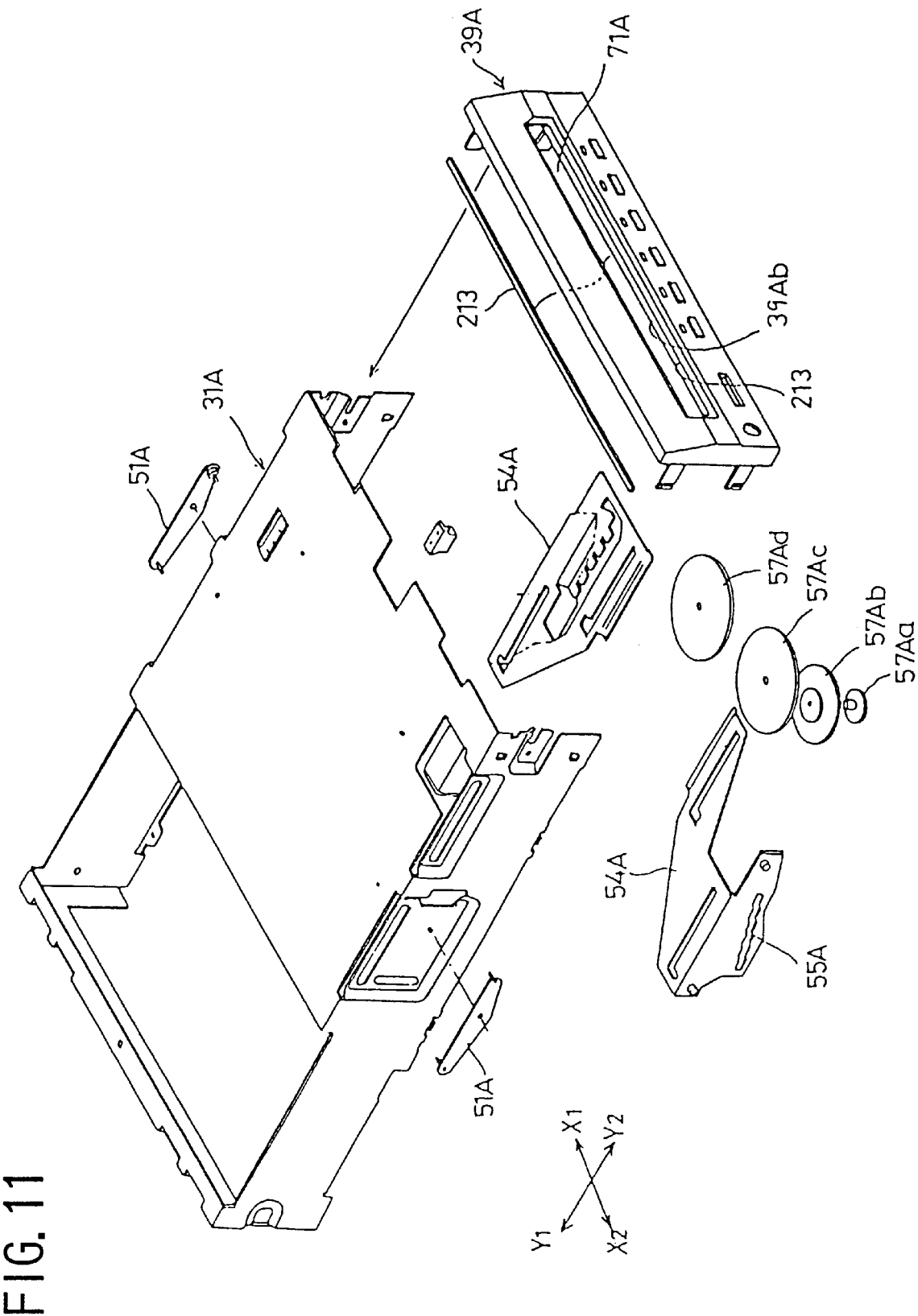
FIG. 11 is an exploded view of the elements of a rotating unit in the disk drive.
Figure 12C:
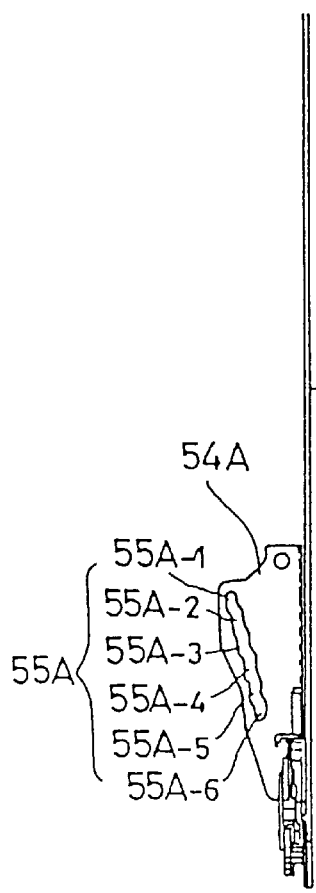
FIGS. 12A through 12C are diagrams showing the elements of the rotating unit of FIG. 11
Figure 12A:
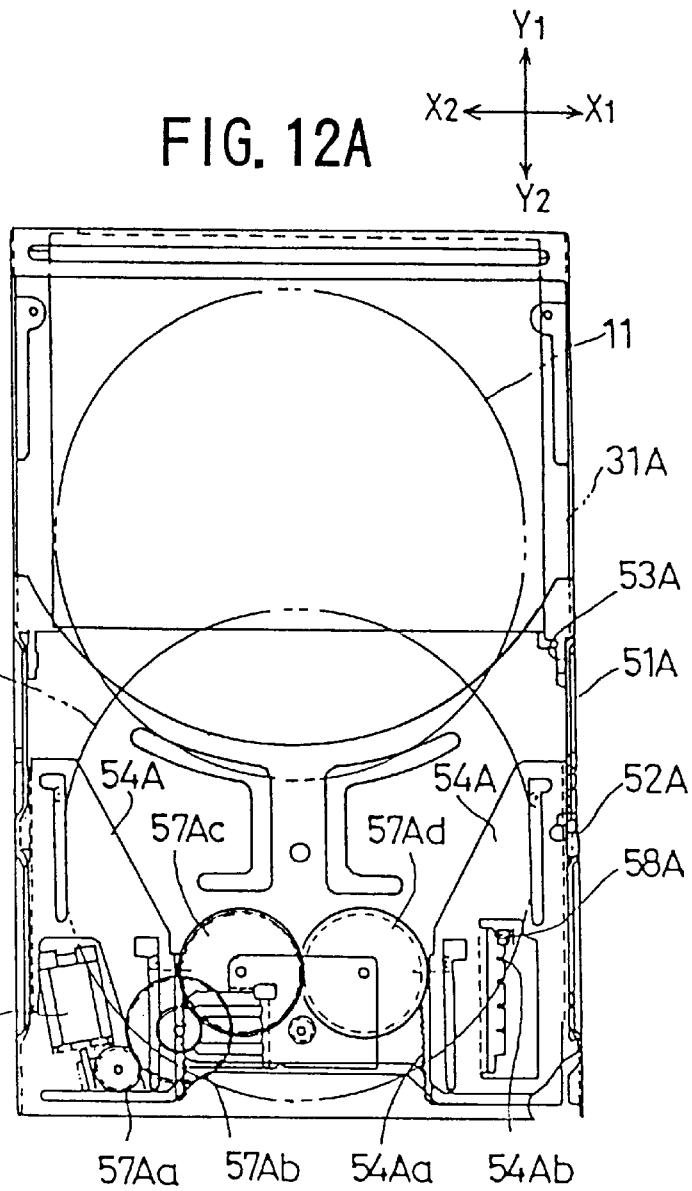
Figure 12B:
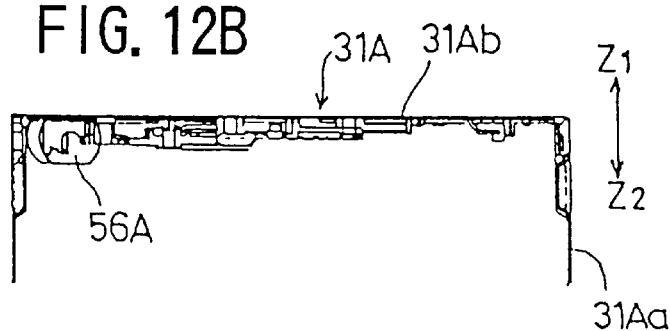
Figure 13:
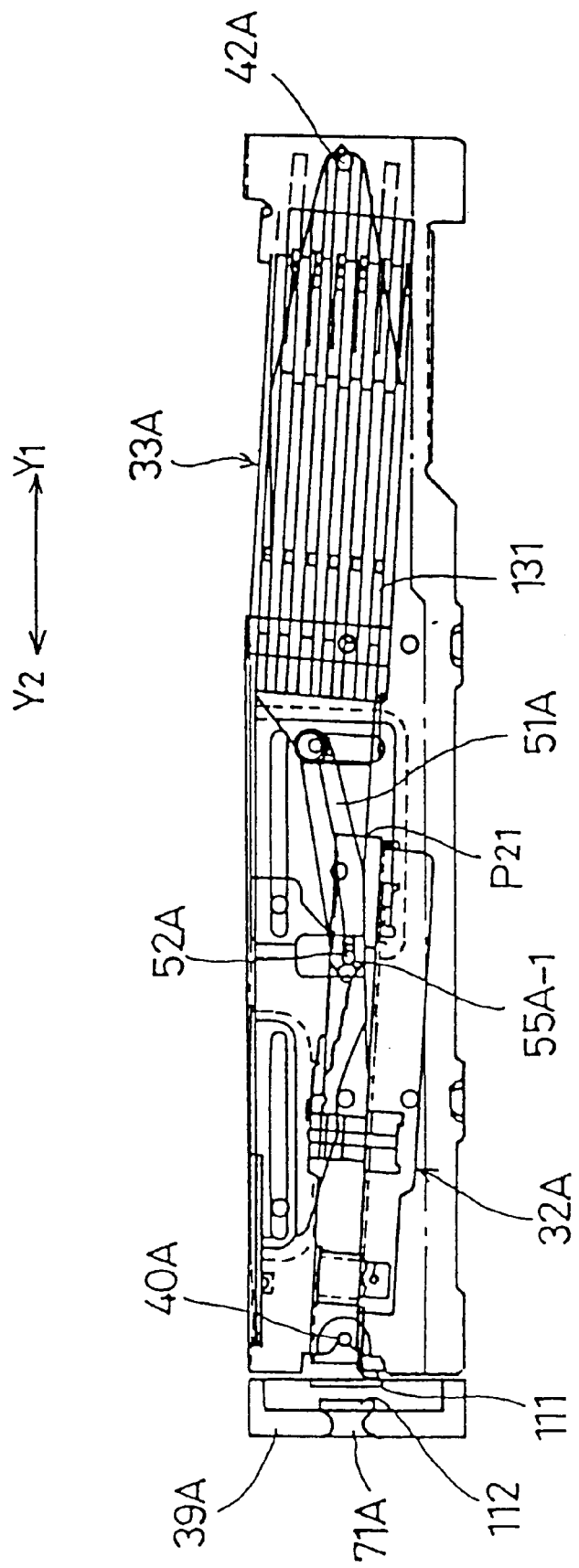
FIG. 13 is a diagram for explaining an operation of the rotating unit of FIG. 11.

FIG. 11, FIGS. 12A–12C and FIG. 13 show the elements of the rotating unit 35A in the disk drive 30A of FIG. 2. FIGS. 12A, 12B and 12C are a top view, a front view and a side view of the rotating unit 35A in the disk drive 30A, respectively.

As shown in FIG. 11, the rotating unit 35A includes a pair of arms 51A which are provided on the sides of the frame 31A. The arms 51A on the sides of the frame 31A are the same as each other.

As shown in FIG. 11, FIGS. 12A–12C and FIG. 13, a pin 50A is fixed to a side wall 31Aa of the frame 31A, and the arm 51A is rotatably supported at its middle portion on the side wall 31Aa of the frame 31A by the pin 50A. A pin 52A is provided at one of the arm 51A, and the pin 52A is fitted into a slot 65A (shown in FIG. 2) of the playback unit 32A. The arm 51A is movably supported on the playback unit 32A by the pin 52A, and the arm 51A is movable to the playback unit 32A along the slot 65A. A pin 53A is provided at the other end of the arm 51A, and the pin 53A is fitted into a slot 66A (shown in FIG. 2) of the disk holder unit 33A.

Further, the rotating unit 35A includes sliders 54A which are movably supported on the bottom of a top plate 31Ab of the frame 31A at the side portions of the top plate 31Ab. Each of the sliders 54A is movable relative to the frame 31A in the longitudinal direction "Y1" or "Y2". Each slider 54A has an L-shaped cross-section. The left-side slider 54A includes, as shown in FIG. 11, a stepped opening 55A formed in a vertical wall of the left-side slider 54A. The pin 52A provided at one end of the arm 51A is fitted into the stepped opening 55A of the slider 54A.

As shown in FIG. 12A, in the rotating unit 35A, a motor 56A is secured to the bottom of the top plate 31Ab of the frame 31A. A plurality of gears 57Aa, 57Ab, 57Ac and 57Ad are engaged with each other, and the gear 57Aa is engaged with the motor 56A. The gears 57Aa through 57Ad are secured to the bottom of the top plate 31Ab of the frame 31A.

As shown in FIG. 12A, the right-side slider 54A includes a rack 56Aa and a slit 54Ab which are formed in the right-side slider 54A. The rotating unit 35A includes a slider moving unit which moves the slider 54A in the longitudinal direction "Y1" or "Y2". An optical sensor 58A is attached to the right-side slider 54A. The slit 54Ab and the optical sensor 58A constitute a position detecting unit which detects the position of the rotating unit 35A in the frame 31A of the disk drive 30A.

As shown in FIG. 12C, the stepped opening 55A of the slider 54A is formed so that it includes a first step 55A-1, a second step 55A-2, a third step 55A-3, a fourth step 55A-4, a fifth step 55A-5, and a sixth step 55A-6.

FIGS. 17A through 17E show operations of the rotating unit 35A when the sliders 54A are moved forward and backward in the longitudinal direction "Y1" or "Y2".

When the sliders 54A are moved forward in the longitudinal direction "Y1" by the motor 56A, the position of the pin 52A in the stepped opening 55A is shifted to the right of FIGS. 17A through 17E. The playback unit 32A is rotated around the pins 40A in the rotating direction "C", and the disk holder unit 33A is rotated around the pins 42A in the rotating direction "F" by the arms 51A.

On the other hand, when the sliders 54A are moved backward in the longitudinal direction "Y2" by the motor 56A, the position of the pin 52A in the stepped opening 55A is shifted to the left of FIGS. 17A through 17E. The playback unit 32A is rotated around the pins 40A in the rotating direction "D", and the disk holder unit 33A is rotated around the pins 42A in the rotating direction "E" by the arms 51A.

More specifically, when the pin 52A is fitted to the first step 55A-1 of the stepped opening 55A, the playback unit 32A is rotated to the maximum rotating angle in the rotating direction "D", and the disk holder unit 33A is rotated to the maximum rotating angle in the rotating direction "E". The position of the transporting passage 48A of the playback unit 32A at this time is indicated by "P21" in FIG. 3A. The transporting passage 48A of the slanted playback unit 32A is placed in line with the disk holding portion 41A-1 of the slanted disk holder unit 33A, as shown in FIG. 3A.

When the pin 52A is fitted to the second step 55A-2 of the stepped opening 55A, the playback unit 32A is slightly rotated in the rotating direction "C", and the disk holder unit 33A is slightly rotated in the rotating direction "F". The position of the transporting passage 48A of the playback unit 32A at this time is indicated by "P22" in FIG. 17A. The transporting passage 48A of the slanted playback unit 32A is placed in line with the disk holding portion 41A-2 of the slanted disk holder unit 33A, as shown in FIG. 17A.

When the pin 52A is fitted to the third step 55A-3 of the stepped opening 55A, the playback unit 32A is further rotated in the rotating direction "C", and the disk holder unit 33A is further rotated in the rotating direction "F". The position of the transporting passage 48A of the playback unit 32A at this time is indicated by "P23" in FIG. 17B. The transporting passage 48A of the slanted playback unit 32A is placed in line with the disk holding portion 41A-3 of the slanted disk holder unit 33A, as shown in FIG. 17B.

When the pin 52A is fitted to the fourth step 55A-4 of the stepped opening 55A, the playback unit 32A is further rotated in the rotating direction "C", and the disk holder unit 33A is further rotated in the rotating direction "F". The position of the transporting passage 48A of the playback unit 32A at this time is indicated by "P24" in FIG. 17C. The transporting passage 48A of the slanted playback unit 32A is placed in line with the disk holding portion 41A-4 of the slanted disk holder unit 33A, as shown in FIG. 17C.

When the pin 52A is fitted to the fifth step 55A-5 of the stepped opening 55A, the playback unit 32A is further rotated in the rotating direction "C", and the disk holder unit 33A is further rotated in the rotating direction "F". The position of the transporting passage 48A of the playback unit 32A at this time is indicated by "P25" in FIG. 17D. The transporting passage 48A of the slanted playback unit 32A is placed in line with the disk holding portion 41A-5 of the slanted disk holder unit 33A, as shown in FIG. 17D.

When the pin 52A is fitted to the sixth step 55A-6 of the stepped opening 55A, the playback unit 32A is rotated to the maximum rotating angle in the rotating direction "C", and the disk holder unit 33A is rotated to the maximum rotating angle in the rotating direction "F". At this time, the transporting passage 48A of the slanted playback unit 32A is placed in line with the disk holding portion 41A-6 of the slanted disk holder unit 33A, as shown in FIG. 17E or FIG. 3B.

As shown in FIGS. 3A and 3B, the playback unit 32A and the disk holder unit 33A are configured in the disk drive 30A such that the playback unit 32A is rotatable around the pins 40A in the rotating direction "C" or "D" and the disk holder unit 33A is rotatable around the pins 42A in the rotating direction "E" or "F". In FIGS. 3A and 3B, a front bezel provided at the front end of the disk drive 30A is indicated by reference numeral 39A, and an insertion opening in the middle of the front bezel 39A is indicated by reference numeral 71A.

A range of the rotating angle of the playback unit 32A in which the playback unit 32A can be rotated around the pins 40A is indicated by "α" in FIG. 3A. In the present embodiment, the range "α" of the rotating angle of the playback unit 32A is ±3 degrees to the horizontal position. A height 81A within the disk drive 30A required for the playback unit 32A to be rotated in the permissible range "α" of the rotating angle is as shown in FIG. 3A. In addition, a permissible range of the rotating angle of the disk holder unit 33A around the pins 42A is indicated by "β" in FIG. 3A. In the present embodiment, the range "β" of the rotating angle of the disk holder unit 33A is ±3 degrees to the horizontal position. A height 82A within the disk drive 30A required for the disk holder unit 33A to be rotated in the permissible range "β" of the rotating angle is as shown in FIG. 3A. The height 81A and the height 82A are relatively small, and a total height "H10" of the disk drive 30A can be made relatively small. This feature of the present embodiment is advantageous to provide a disk drive having a reduced height.

FIG. 15 shows the elements of the disk transporting unit 34A in the disk drive 30A of FIG. 2. FIGS. 19 through 30 show an operation of the disk transporting unit 34A of FIG. 15.

As shown, the elements of the disk transporting unit 34A are arranged on the chassis 103 of the disk loading member 100. The disk transporting unit 34A generally has a loading arm 140, a link arm 141, a first disk arm 142, a second disk arm 143, and a guide rail 60A.

The loading arm 140 includes a circular portion 140a, an arm portion 140b extending from the circular portion 140a, and a hole 140c in the middle of the loading arm 140. A shaft 144 on the chassis 103 is fitted into the hole 140c of the loading arm 140, and the loading arm 140 is rotatably supported on the chassis 103 at the shaft 144.

Further, in the loading arm 140, a toothed portion 140d on the periphery of the circular portion 140a, an L-shaped guide opening 140e, a tooth-shaped cam 140f, and a plurality of slits 140g-1 through 140g-7 are formed. The toothed portion 140d is connected to a gear 179. The L-shaped guide opening 140e is connected to an ejection lever 109. The tooth-shaped cam 140f is connected to a clamper holder moving unit 107. The gear 179, the ejection lever 109, and the clamper holder moving unit 107 will be described later.

An optical sensor 145 is arranged on the chassis 103 adjacent to the circular portion 140a. The optical sensor 145 is used to detect which of the slits 140g-1 through 140g-7 of the loading arm 140 is positioned at the optical sensor 145 when the loading arm 140 is rotated around the shaft 144. A position of the disk transporting unit 34A in the disk drive 30A according to the rotation of the loading arm 140 around the shaft 144 is detected by using the optical sensor 145 in association with the slits 140g-1 through 140g-7 of the loading arm 140.

As shown in FIG. 15, in the chassis 103, a W-shaped guide opening 103b and a straight guide opening 103c at the left-end side portion of the chassis 103 are formed. The guide opening 103b generally extends in the longitudinal direction "Y1" or "Y2" in a zigzag manner, and the guide opening 103c extends straight in the longitudinal direction "Y1" or "Y2" along the left-end side edge of the chassis 103. The guide opening 103b is divided into a first slanted opening 103b-1, a second slanted opening 103b-2, and a third slanted opening 103b-3. The first slanted opening 103b-1 slantingly extends toward the right lateral direction "X1", the second slanted opening 103b-2 slantingly extends toward the left lateral direction "X2", and the third slanted opening 103b-3 slantingly extends toward the right lateral direction "X1".

Further, in the chassis 103, a projection 103f (not shown in FIG. 15) projecting downward from the bottom surface of the chassis 103 is formed adjacent to the front end of the third slanted opening 103b-3. The projection 103f will be described later. Further, an insertion lever 108 having a downwardly extending pin 108 formed at the front end of the insertion lever 108 is arranged at the front right corner of the chassis 103. The insertion lever 108 will be described later.

Figure 20:
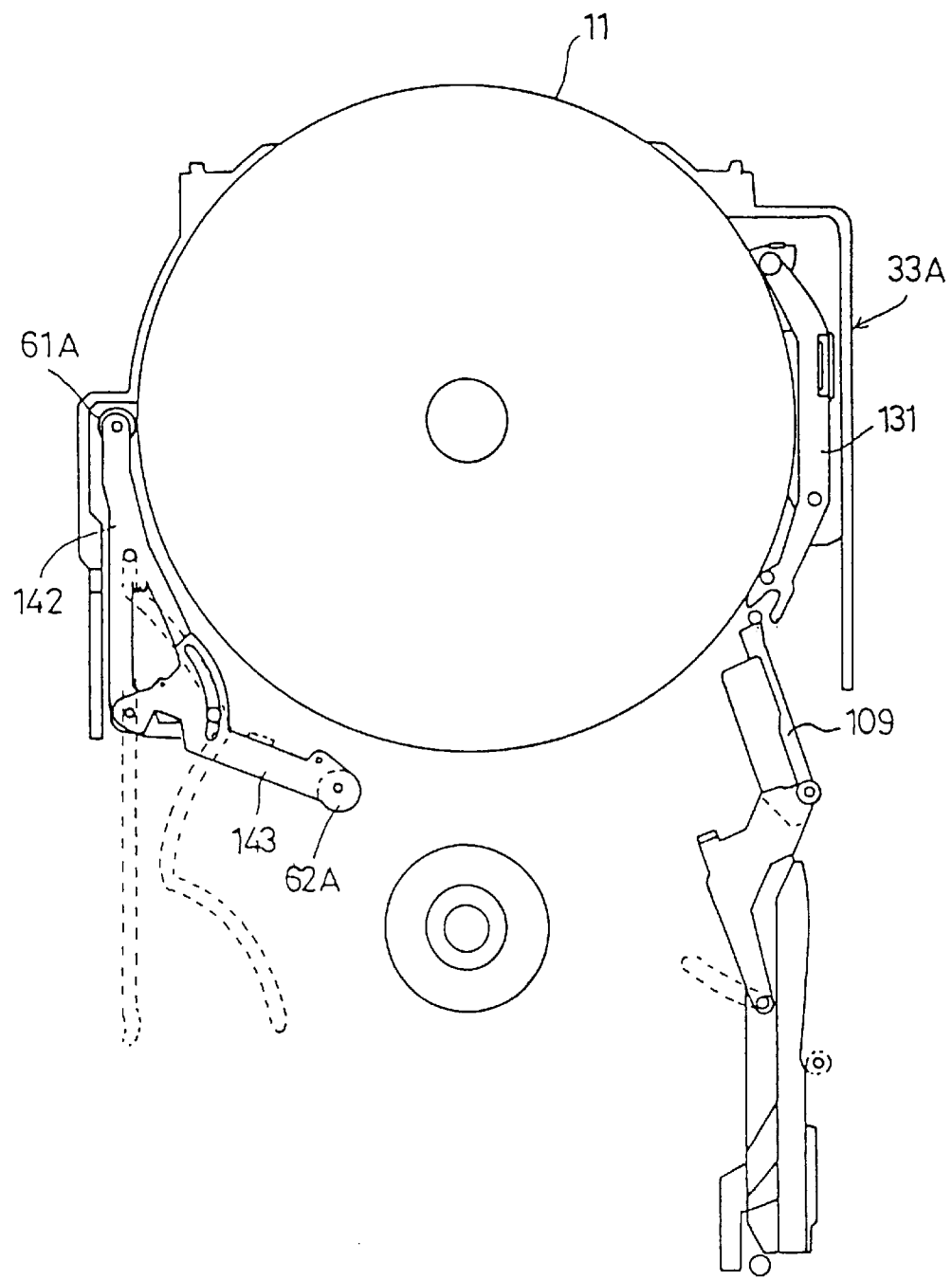

As shown in FIG. 20, the first disk arm 142 and the second disk arm 143 are fitted into the W-shaped guide opening 103b and the straight guide opening 103c in the chassis 103. The first disk arm 142 and the second disk arm 143 are moved according to the configuration of the guide opening 103b and the guide opening 103c.

As shown in FIG. 15, a pin 146 is fitted to one end of the second disk arm 143 and crimped at one end of the first disk arm 142. The first disk arm 142 and the second disk arm 143 are connected to each other by the pin 146 such that the second disk arm 143 is rotatably supported on the end of the first disk arm 142. Thus, the second disk arm 143 is rotatable relative to the first disk arm 142 around the pin 146. The pin 146 has an annular groove 146a formed on the upper peripheral wall of the pin 146, and the annular groove 146a of the pin 146 is fitted to the guide opening 103c of the chassis 103 on the bottom surface of the chassis 103.

The first disk arm 142 has a roller 61A fitted to the other end of the first disk arm 142. The roller 61A is supported on the bottom surface of the first disk arm 142 and rotatable around the center of the roller 61A. A pin 147 has an annular groove 147a formed on the upper peripheral wall of the pin 147, and the pin 147 is crimped at the middle portion of the first disk arm 142. The annular groove 147a of the pin 147 is fitted to the guide opening 103b of the chassis 103 on the bottom surface of the chassis 103.

The second disk arm 143 has a roller 62A fitted to the other end of the second disk arm 143. The roller 62A is supported on the bottom surface of the second disk arm 143 and rotatable around the center of the roller 62A. The second disk arm 143 has a circular opening 143a formed in the middle portion of the second disk arm 143. A pin 148 is movably fitted to the circular opening 143a of the second disk arm 143, and the lower portion of the pin 148 is crimped to the first disk arm 142. The second disk arm 143 is rotatable around the pin 146 in a rotating direction (indicated by the arrow K1 or K2 in FIG. 15) within a range of the circular opening 143a of the second disk arm 143 to which the pin 148 is fitted. A spring 149 is connected between the first disk arm 142 and the second disk arm 143. The spring 149 exerts a biasing force on the second disk arm 143 such that the second disk arm 143 is biased in the rotating direction "K1" by the spring 149.

As described above, the first disk arm 142 and the second disk arm 143 are arranged on the bottom surface of the chassis 103 such that the pin 146 is fitted to the straight guide opening 103c and the pin 147 is fitted to the W-shaped guide opening 103b.

Figure 19:
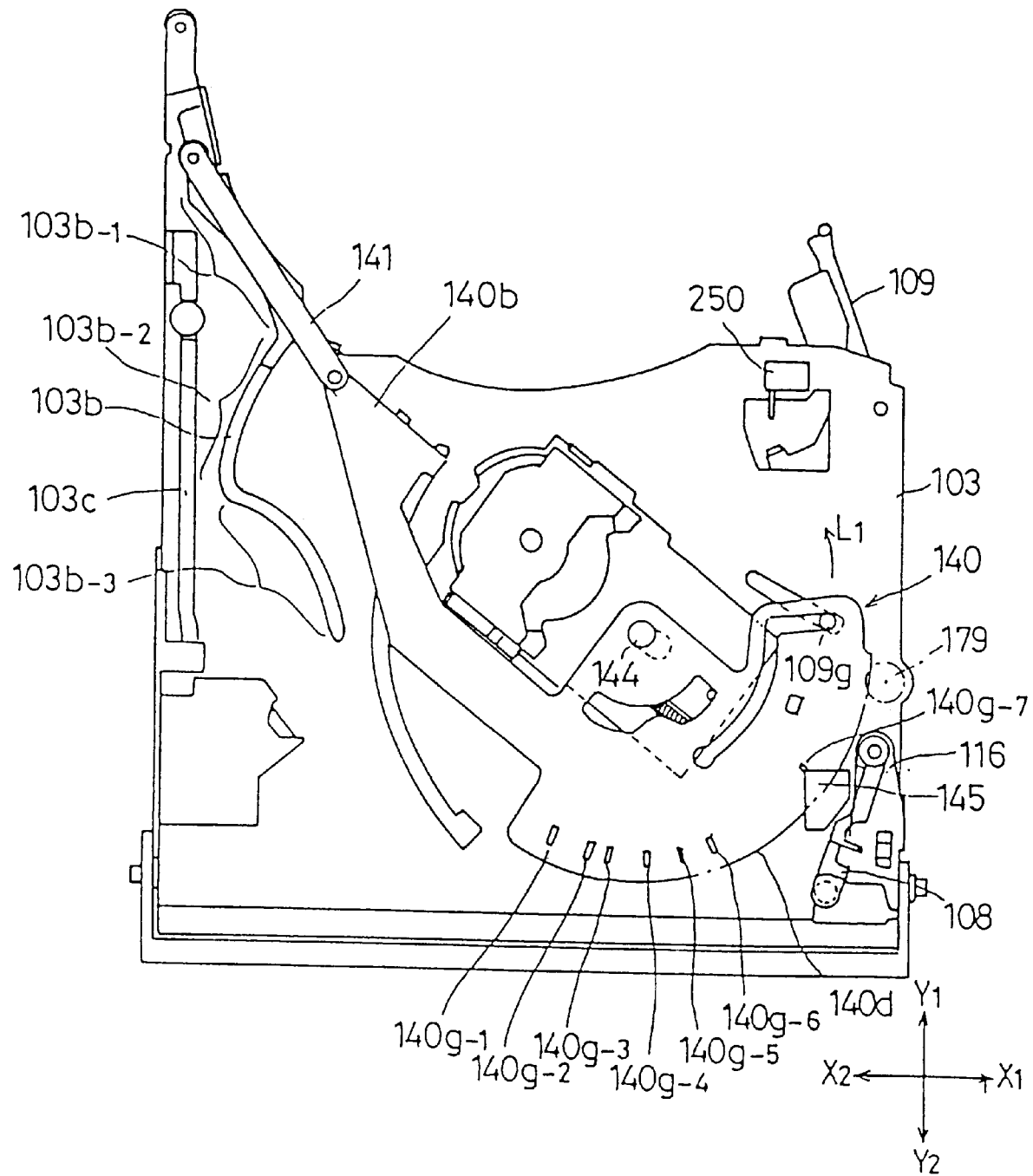
FIG. 19 and FIG. 20 are diagrams showing a starting position of the disk transporting unit during a disk transporting operation.

As shown in FIG. 19, the link arm 141 is connected at its one end to the end of the arm portion 140b of the loading arm 140. The pin 147 is fitted to the other end of the link arm 141. Therefore, the loading arm 140 is connected to the first disk arm 141 through the link arm 141. When the loading arm 140 is rotated around the shaft 144, the pin 146 is moved along the straight guide opening 103c and the pin 147 is moved along the W-shaped guide opening 103b so that the first disk arm 142 is rotated. At the same time, the second disk arm 143 is rotated around the pin 146 together with the rotation of the first disk arm 142. Further, the roller 61A at the end of the first disk arm 142 and the roller 62A at the end of the second disk arm 143 are moved along the guide opening 103c and the guide opening 103b in the chassis 103, respectively.

Figure 22A:
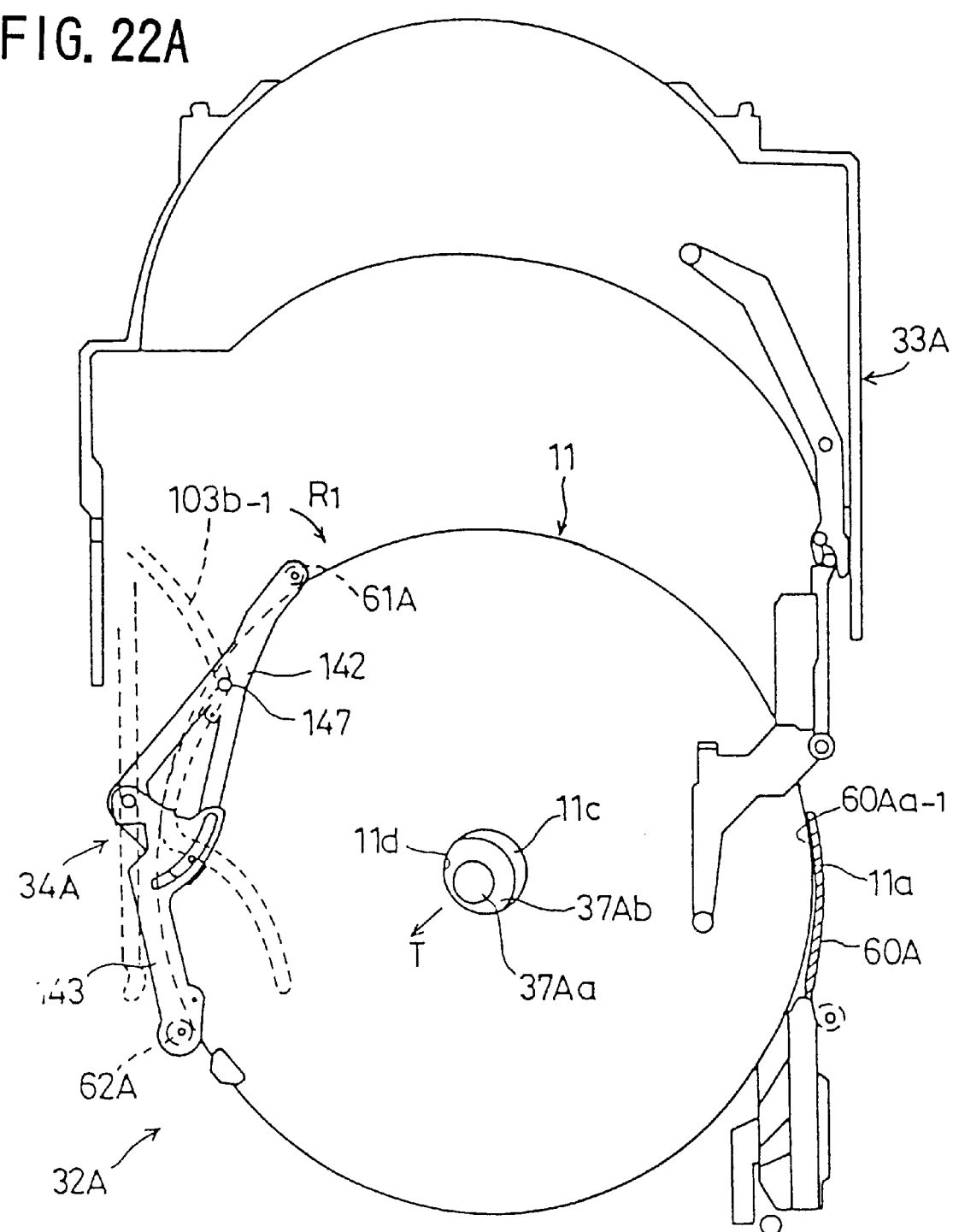
FIGS. 22A and 22B are diagrams showing a second position of the disk transporting unit during the disk transporting operation.

As shown in FIG. 22A, the guide rail 60A is secured to the top surface of the chassis base 150 of the disk loading unit 110. The disk loading unit 110 is arranged on the bottom surface of the chassis 103 of the disk loading member 100. The guide rail 60A is arranged on the side of the bottom surface of the chassis 103. At the right-end side portion of the chassis 103, the guide rail 60A is arranged, and the guide rail 60A extends in the longitudinal direction "Y1" or "Y2". The guide rail 60A has a guide groove 60Aa-1 formed on the inner side wall of the guide rail 60A.

As shown in FIG. 15, the ejection lever 109 has a guide groove 109a formed on the inner side wall of the ejection lever 109. The ejection lever 109 is rotatably supported on the chassis 103 at the middle portion of the ejection lever 109. A switch 250 is arranged at the rear right corner of the chassis 103. The ejection lever 109 has an upwardly raised pin 109g formed at one end of the ejection lever 109. When the ejection lever 109 is rotated, the switch 250 is turned ON by the rotation of the ejection lever 109. Otherwise the switch 250 is set in the OFF state. When the ejection lever 109 is not rotated, the pin 109g is fitted to the L-shaped guide opening 140e of the loading arm 140.

As described above, the disk 11 from the disk holder unit 33A is transported to the turntable 37A of the playback unit 32A through the transporting passage 48A. The playback unit 32A and the disk holder unit 33A are rotated, and the time for the transporting passage 48A of the playback unit 32A to be in line with one of the disk holding portions 41A-1 through 41A-6 of the disk holder unit 33A when the disk 11 is transported from the disk holder unit 33A to the turntable 37A can be made relatively small.

Next, in FIGS. 5A through 10C, various disk transporting operations of the disk transporting unit 34A in the disk drive 30A are shown. In accordance with instructions from the control unit 230, the disk transporting operations of the disk transporting unit 34A in the disk drive 30A are controlled. For example, the disk in one of the disk holding portions 41A-1 through 41A-6 of the disk holder unit 42A is transported to the turntable 37A and supported at the playback position, and the disk within the playback unit 32A after the disk is played back is returned back to the original portion of the disk holder unit 42A. In addition, when an ejecting action is manually performed by the operator on the disk drive 30A, the disk within the disk holder unit 42A is ejected out of the disk drive 30A.

(1) FIGS. 5A through 5D show a disk transporting operation of the disk transporting unit 34A in the disk drive 30A when the disk 11 in the disk holding portion 41A-5 of the disk holder unit 33A is transported to the turntable 37A of the playback unit 32A, and the disk 11 on the turntable 37A is supported at the playback position.

It is assumed that the disk 11 is contained in the disk holding portion 41A-5 of the disk holder unit 33A. When a disk transporting instruction from the control unit 230 which specifies the disk holding portion 41A-5 of the disk holder unit 33A is given, the disk transporting operation of the disk transporting unit 34A, as shown in FIGS. 5A through 5D, is started.

In FIGS. 5A through 10C, black rectangles for the retaining claw 131a, the roller 61A and the roller 62A indicate that these elements are placed into contact with the circumference of the disk 11, and white rectangles for the retaining claw 131a, the roller 61A and the roller 62A indicate that these elements are not placed in contact with or separated from the circumference of the disk 11.

Figure 5A:
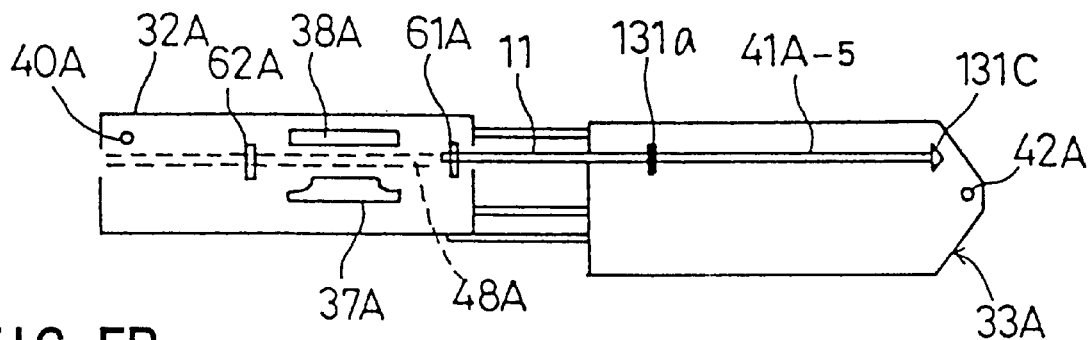
FIGS. 5A through 5D are diagrams for explaining an operation of a disk transporting unit in the disk drive of FIG. 2.

(1-A) The rotating unit 35A rotates both the playback unit 32A and the disk holder unit 33A. As shown in FIG. 5A, the transporting passage 48A of the playback unit 32A and the disk holding portion 41A-5 of the disk holder unit 33A are placed in line with each other.

Figure 5B:
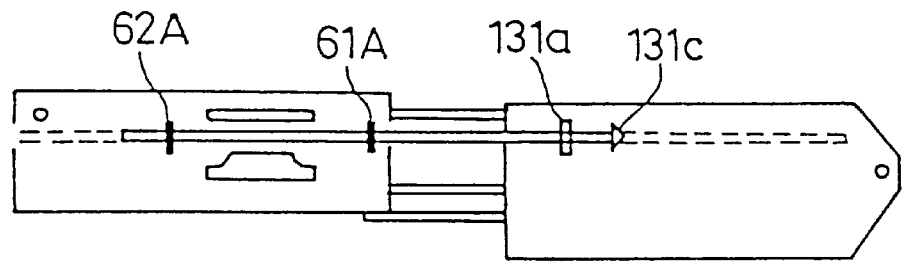

(1-B) The disk handling arm 131 of the disk holding portion 41A-5 is rotated, and the disk 11 is released from the retaining claw 131a. As shown in FIG. 5B, the disk 11 is pushed in the longitudinal direction "Y2" from the disk holding portion 41A-5 to the playback unit 32A by the pushing claw 131c.

Figure 5C:
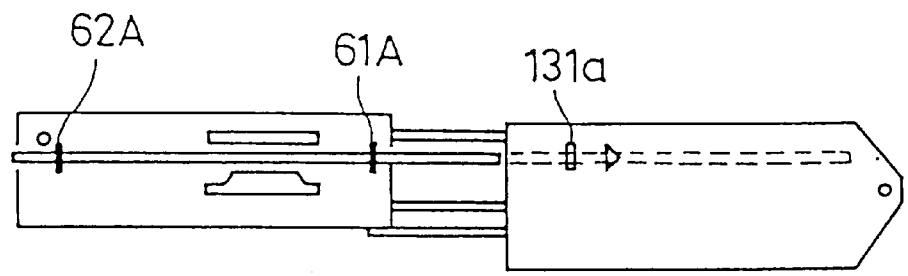

(1-C) The rollers 61A and 62A of the disk transporting unit 34A retain the disk 11 and are moved to transport the disk 11 in the longitudinal direction "Y2" to the playback position within the playback unit 32A, as shown in FIG. 5C.

Figure 5D:
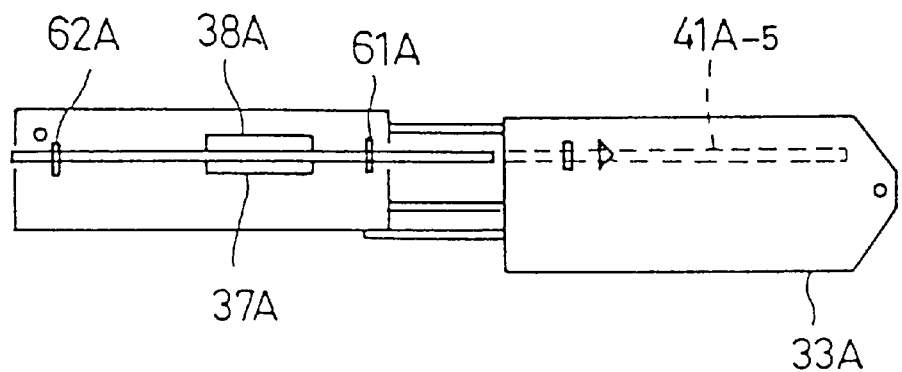

(1-D) As shown in FIG. 5D, the turntable 37A is vertically moved to the clamper 38A. The disk 11 on the turntable 37A is clamped by the clamper 38A. The disk 11 clamped on the turntable 37A is released from the rollers 61A and 62A of the disk transporting unit 34A. After this, the disk 11 is rotated by the turntable 37A and a data signal is reproduced from the disk 11.

If the disk 11 is contained in the playback unit 32A when the disk transporting instruction which specifies the disk holding portion 41A-5 of the disk holder unit 33A is given, a disk returning operation is performed and the disk transporting operation described above is performed thereafter.

(2) FIGS. 6A through 6D show a disk returning operation of the disk transporting unit 34A when the disk 11 within the playback unit 32A is returned back to the original disk holding portion (in this case, which is the disk holding portion 41A-2) of the disk holder unit 42A after the disk 11 is played back.

Figure 6A:
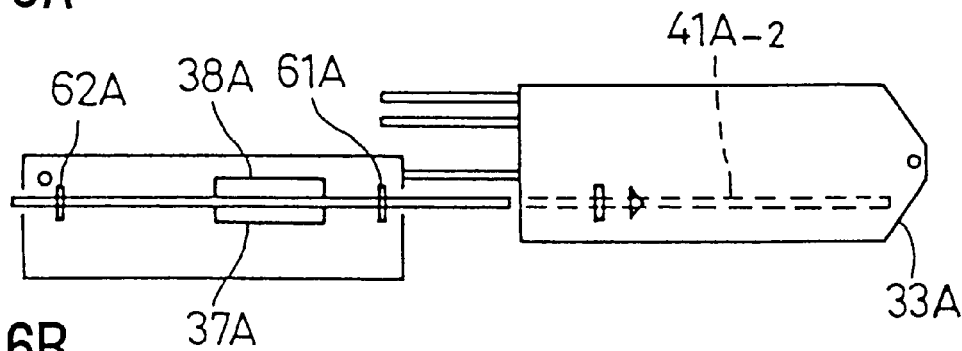
FIGS. 6A through 6D are diagrams for explaining an operation of the disk transporting unit.

It is assumed that the playback of the disk 11 which is transported from the disk holding portion 41A-2 of the disk holder unit 33A to the playback unit 32A is finished. As shown in FIG. 6A, the transporting passage 48A of the playback unit 32A and the disk holding portion 41A-2 of the disk holder unit 33A are placed in line with each other.

When a disk playback instruction from the control unit 230 which specifies another disk is given, the disk returning operation of the disk transporting unit 34A, as shown in FIGS. 6A through 6D, is started.

Figure 6B:
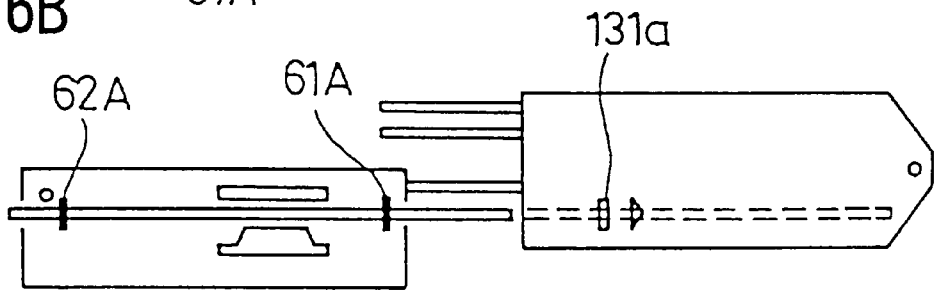

(2-A) As shown in FIG. 6B, the rollers 61A and 62A of the disk transporting unit 34A retain the disk 11 within the playback unit 32A. The turntable 37A is vertically moved away from the disk 11. The clamper 38A is moved up from the disk 11, and the disk 11 is released from the clamper 38A.

Figure 6C:
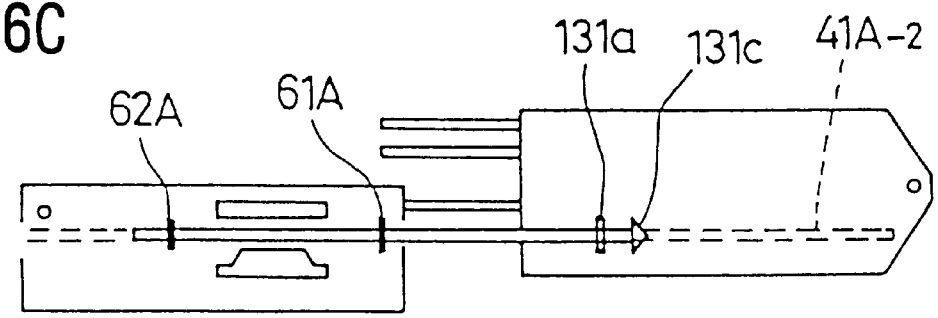

(2-B) As shown in FIG. 6C, the rollers 61A and 62A of the disk transporting unit 34A are moved to transport the disk 11 in the longitudinal direction "Y1" to the disk holding portion 41A-2 of the disk holder unit 33A.

Figure 6D:
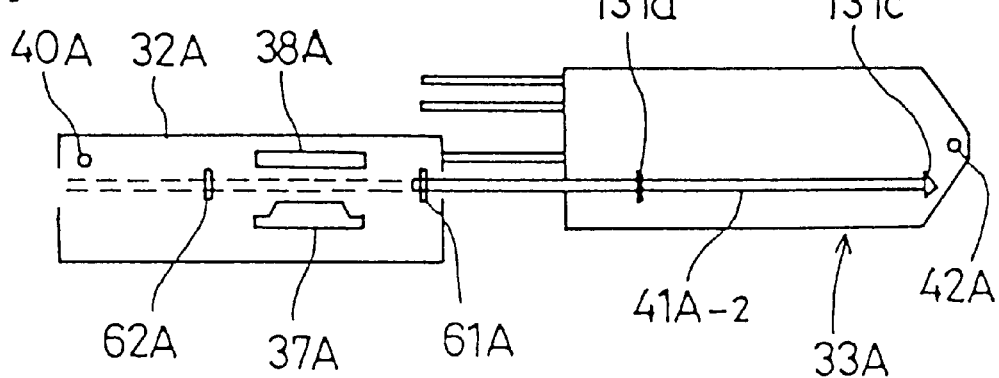

(2-C) As shown in FIG. 6D, the retaining claw 131*a* pushes the disk 11 so that the disk 11 is held in the disk holding portion 41A-2 of the disk holder unit 33A.

(3) FIGS. 7A through 7D show a disk inserting operation of the disk transporting unit 34A when the disk 11 is inserted into the playback unit 32A and a disk playback instruction for the disk 11 is given.

When the disk playback instruction which specifies the inserted disk 11 is given, the disk inserting operation of the disk transporting unit 34A, as shown in FIGS. 7A through 7D, is started.

(3-A) The rotating unit 35A rotates both the playback unit 32A and the disk holder unit 33A so that the transporting passage 48A of the playback unit 32A and the disk holding portion 41A-2 (in this case, which is assumed as containing no disk therein) of the disk holder unit 33A are placed in line with each other, as shown in FIG. 7A.

(3-B) The disk 11 is inserted into the playback unit 32A through the insertion opening 71A by the operator. As shown in FIG. 7B, the disk 11 is transported in the longitudinal direction "Y1" to the turntable 37A by the rollers 61A and 62A of the disk transporting unit 34A.

(3-C) As shown in FIG. 7C, the turntable 37A and the clamper 38A are vertically moved so that the disk 11 on the turntable 37A is clamped by the clamper 38A.

(3-D) As shown in FIG. 7D, the rollers 61A and 62A of the disk transporting unit 34A are moved, and the disk 11 is released from the rollers 61A and 62A. After this, the reproduction of a data signal from the disk 11 is performed by the playback unit 32A.

(4) FIGS. 8A through 8D show a disk ejecting operation of the disk transporting unit 34A when the disk 11 is ejected out of the playback unit 32A after the playback of the disk 11 is finished.

When the disk transporting unit 34A is at a position shown in FIG. 8A and a disk ejecting action is performed by the operator, the disk ejecting operation of the disk transporting unit 34A, as shown in FIGS. 8B through 8D, is started.

(4-A) As shown in FIG. 8B, the rollers 61A and 61B of the disk transporting unit 34A retain the disk 11 within the playback unit 32A.

(4-B) As shown in FIG. 8C, the turntable 37A and the clamper 38A are vertically moved so that the disk 11 on the turntable 37A is released from the clamper 38A. A motor (not shown) is driven to open the insertion opening 71A of the playback unit 32A.

(4-C) As shown in FIG. 8D, the disk 11 is transported in the longitudinal direction "Y2" out of the playback unit 32A by the disk transporting unit 34A. After this, the operator retains the disk 11 projecting out of the playback unit and pulls out the disk 11 from the disk drive 30A.

After the disk 11 is pulled out, the insertion opening 71A of the playback unit 32A is closed.

(5) FIGS. 9A through 9D show a disk holding operation of the disk transporting unit 34A when the disk 11 is inserted into the playback unit 32A and the disk 11 is transported to and held in the disk holder unit 33A.

When a disk holding instruction which specifies the disk holding portion 41A-3 of the disk holder unit 33A is given by the operator, the disk transporting operation of the disk transporting unit 34A, as shown in FIGS. 9A through 9D, is started.

(5-A) The rotating unit 35A rotates both the playback unit 32A and the disk holder unit 33A. As shown in FIG. 9A, the transporting passage 48A of the playback unit 32A and the disk holding portion 41A-3 of the disk holder unit 33A are placed in line with each other.

(5-B) The disk 11 is inserted into the playback unit 32A through the insertion opening 71A by the operator. As shown in FIG. 9B, the rollers 61A and 62A of the disk transporting unit 34A retain the disk 11 within the playback unit 32A.

(5-C) As shown in FIG. 9C, the disk 11 is transported in the longitudinal direction "Y1" from the playback unit 32A to the disk holding portion 41A-3 of the disk holder unit 33A through the transporting passage 48A by the disk transporting unit 34A.

(5-D) The retaining claw 131*a* pushes the disk 11 toward the disk holder unit 33A. As shown in FIG. 9D, the disk 11 is retained in the disk holding portion 41A-3 of the disk holder unit 33A. The disk 11 is released from the disk transporting unit 34A.

Figure 10A:
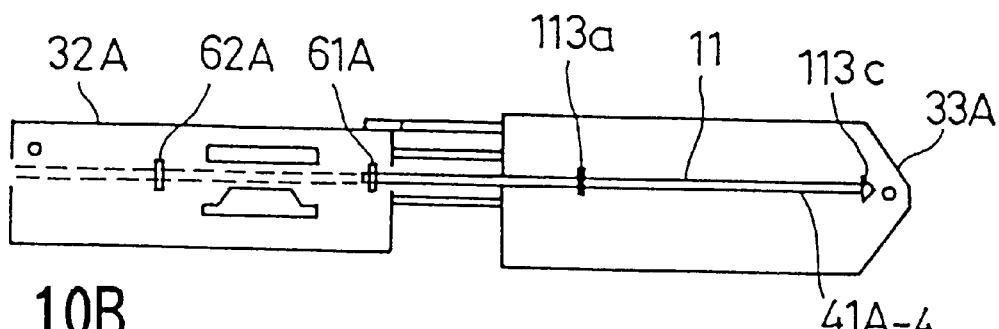
FIGS. 10A through 10C are diagrams for explaining an operation of the disk transporting unit.
Figure 10B:
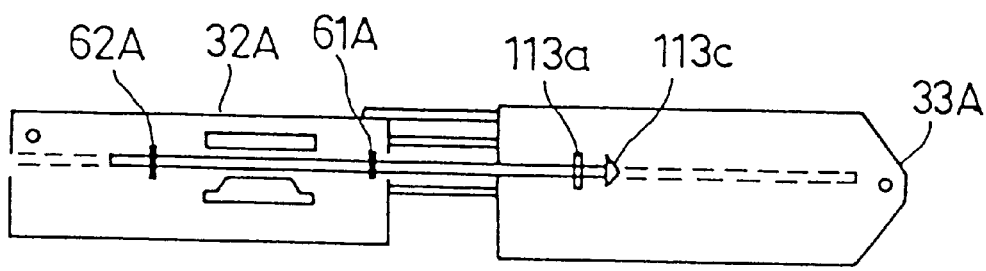
Figure 10C:
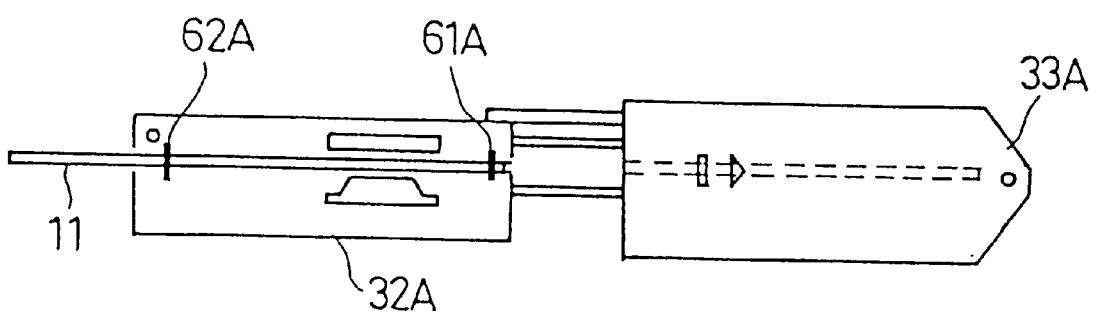

(6) FIGS. 10A through 10C show a disk ejecting operation of the disk transporting unit 34A when the disk 11 in one of the disk holding portions 41A-1 through 41A-6 (in this case, which is the disk holding portion 41A-4) of the disk holder unit 33A is ejected out of the disk drive 30A.

When a disk ejecting instruction from the control unit 230 which specifies the disk holding portion 41A-4 is given by the operator, the disk ejecting operation of the disk transporting unit 34A, as shown in FIGS. 10A through 10C, is started.

(6-A) The rotating unit 35A rotates both the playback unit 32A and the disk holder unit 33A. As shown in FIG. 10A, the transporting passage 48A of the playback unit 32A and the disk holding portion 41A-4 of the disk holder unit 33A are placed in line with each other.

(6-B) As shown in FIG. 10B, the disk 11 is released from the retaining claw 131*a*, and the pushing claw 113*c* pushes the disk 11 in the longitudinal direction "Y2" from the disk holding portion 41A-4 of the disk holder unit 33A toward the playback unit 32A. The rollers 61A and 62A of the disk transporting unit 34A retain the disk 11 projecting into the playback unit 62A and transport the disk 11 in the longitudinal direction "Y2" through the transporting passage 48A.

(6-C) As shown in FIG. 10C, the disk 11 is transported in the longitudinal direction "Y2" to project out of the playback unit 62A by the disk transporting unit 34A. After this, the operator retains the disk 11 projecting out of the playback unit 32A and pulls out the disk 11 from the disk drive 30A.

FIG. 18 shows movements of the elements of the disk transporting unit 34A in the disk drive 30A when the disk 11 is transported to the turntable 37A and the disk 11 above the turntable 37A is clamped by the clamper 38A. In FIG. 18, (A) indicates a movement of the loading arm 140, (B) indicates a movement of the disk loading unit 110, (C) indicates a movement of the disk 11, (D) indicates a movement of the rollers 61A and 62A, (E) indicates a movement of the second disk arm 143, (F) indicates a movement of a pin 192e of a clamper slider 192 (which will be described later), (G) indicates a movement of a clamper holder 191 (which will be described later), (H) indicates a movement of the pin 109g, (I) indicates a movement of the turntable 37A, (J) indicates a movement of the guide rail 60A, and (K) indicates a movement of the clamper 38A.

Figure 27:
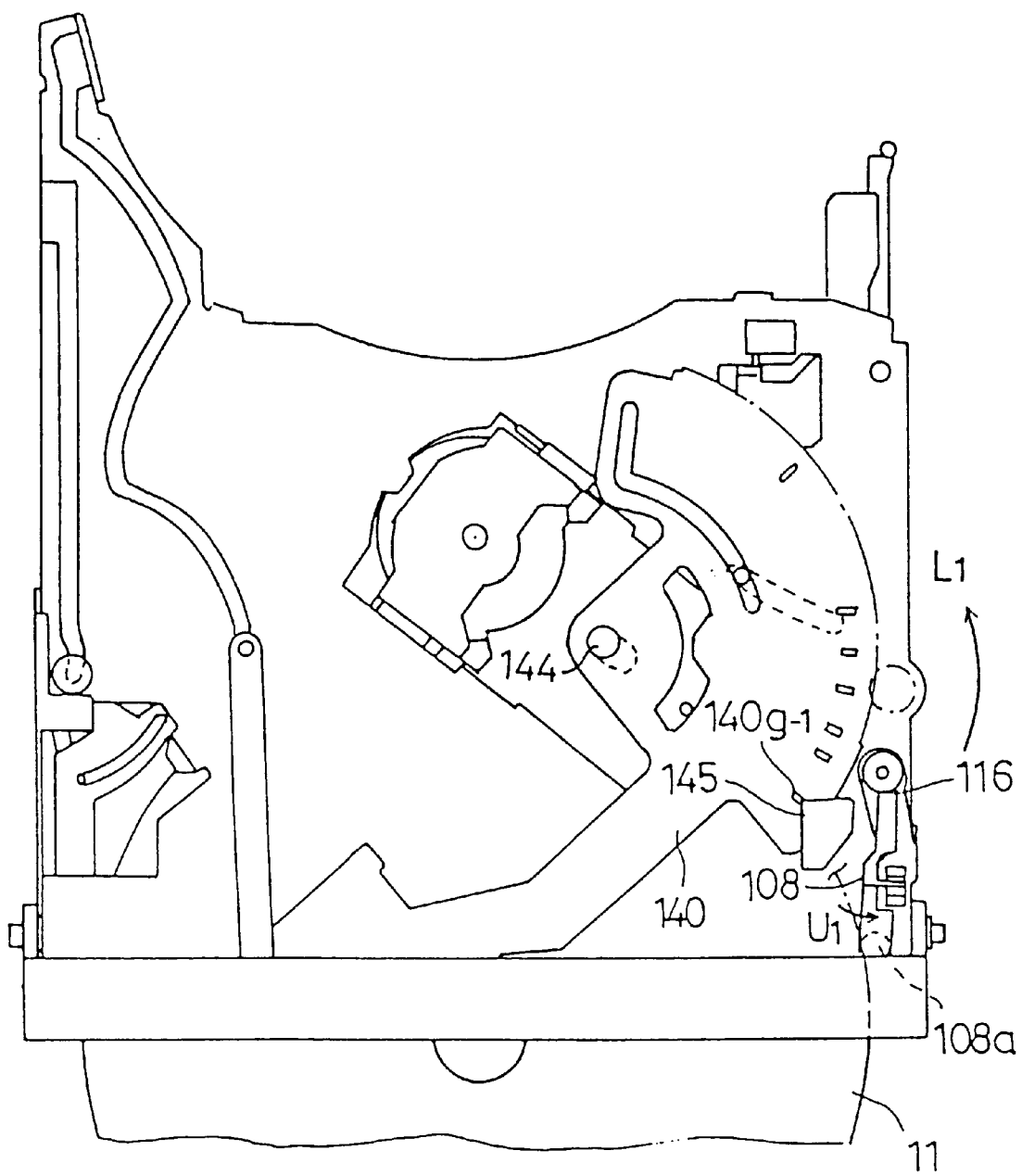
FIGS. 27 and 28 are diagrams showing a second position of the disk transporting unit during the disk ejecting operation.
Figure 38:
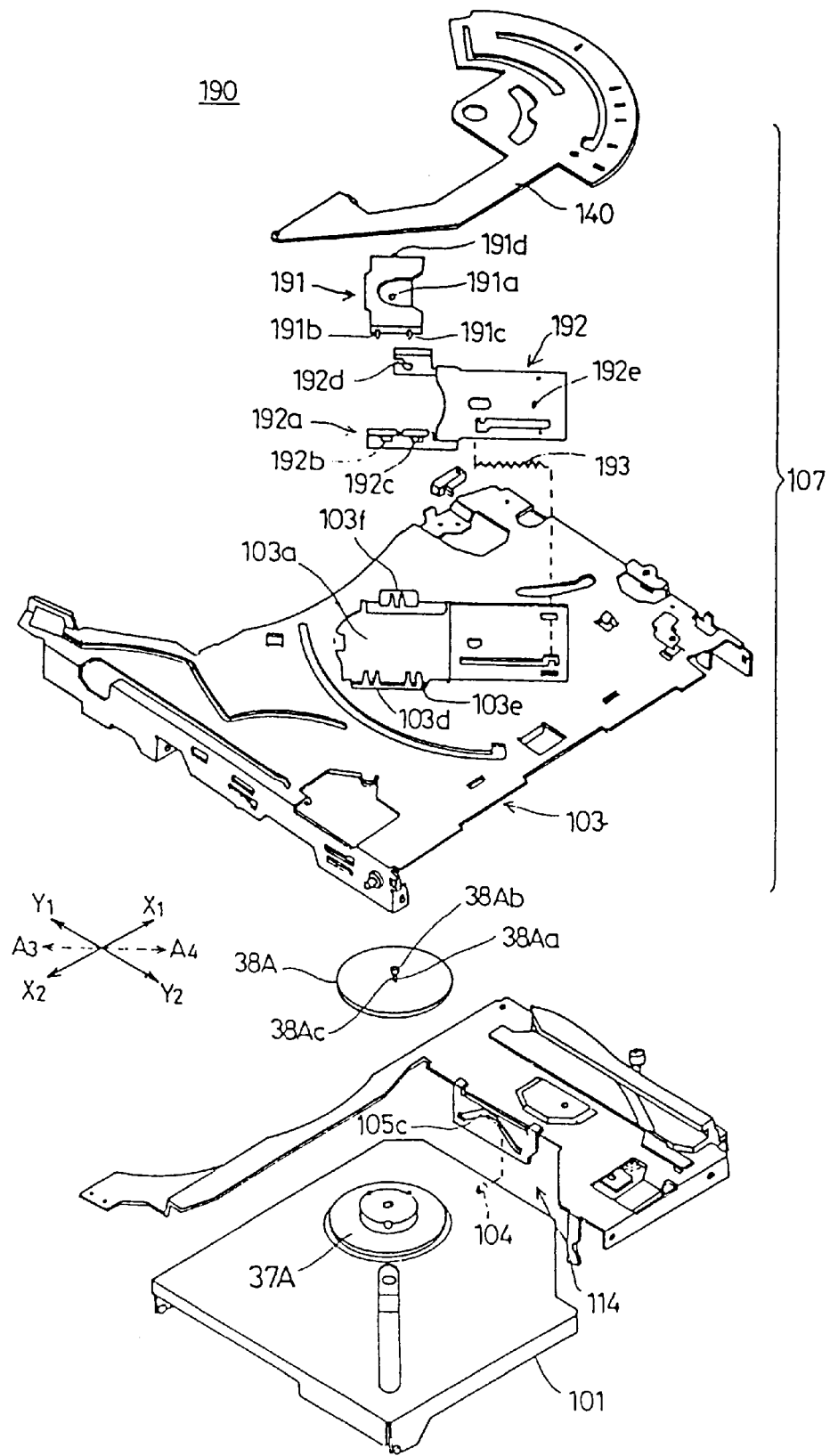
FIG. 38 is an exploded view of the elements of a disk clamping unit in the disk drive.

FIGS. 19 and 20 show a starting position of the disk transporting unit 34A in the disk drive 30A. FIGS. 27 and 38 show a disk ejected position of the disk transporting unit 34A in the disk drive 30A. The disk transporting unit 34A can be moved between the starting position and the disk ejected position.

When the switch 250 is in the OFF state and the slit 140g-7 of the loading arm 140 is sensed by the optical sensor 145, it is detected that the disk transporting unit 34A is at the starting position of FIGS. 19 and 20. When a disk transporting instruction from a control unit 230 (shown in FIG. 2) of the computer system is supplied, the loading motor 174 (shown in FIG. 33) in the disk loading unit 110 is driven in the forward direction.

In the disk transporting unit 34A which is at the starting position of FIGS. 19 and 20, the loading arm 140 is rotated around the shaft 144 in the rotating direction (indicated by the arrow "L1" in FIG. 19) by the loading motor 174. The slit 140g-6 of the loading arm 140 is sensed by the optical sensor 145.

Figure 21A:
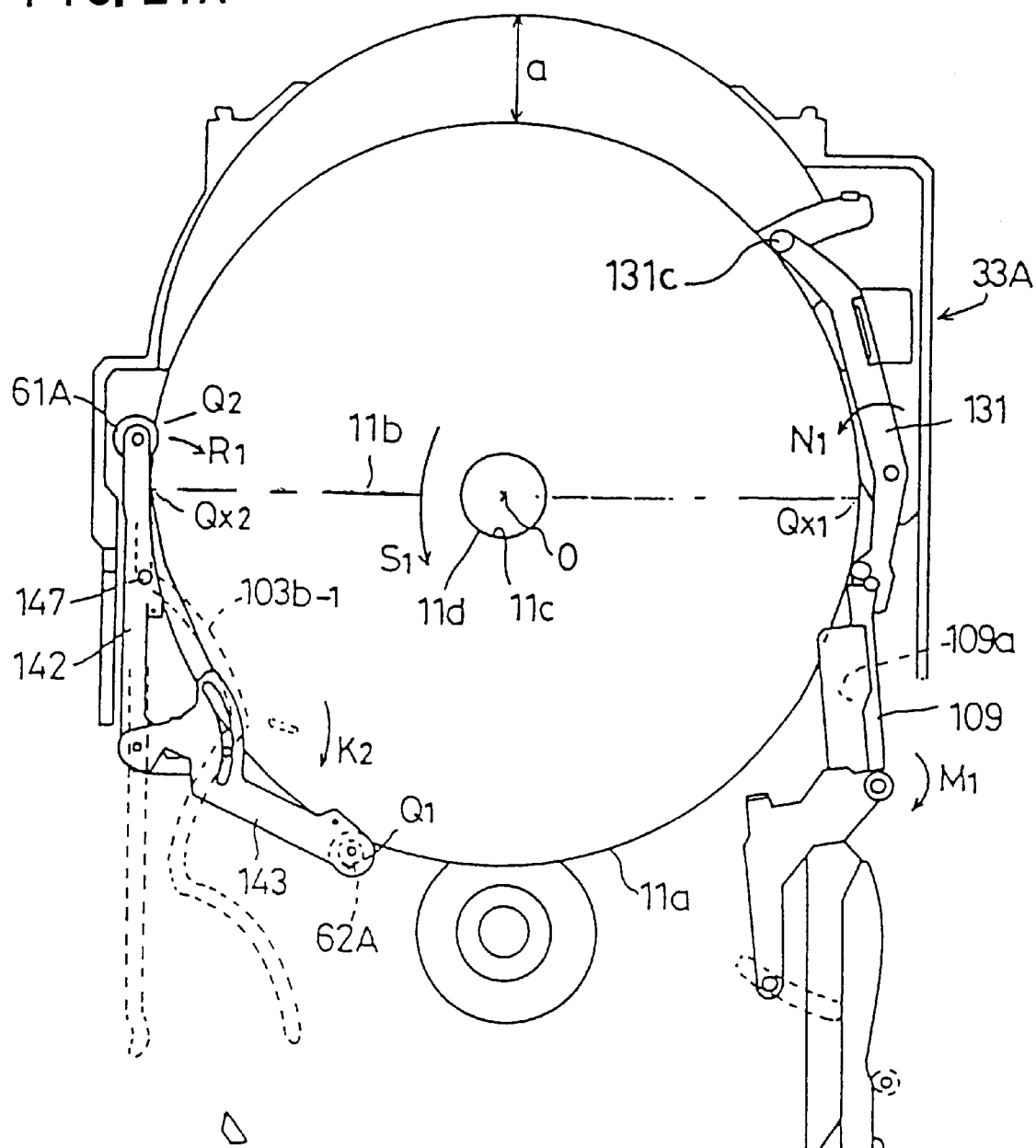
FIGS. 21A and 21B are diagrams showing a first position of the disk transporting unit during the disk transporting operation.
Figure 21B:
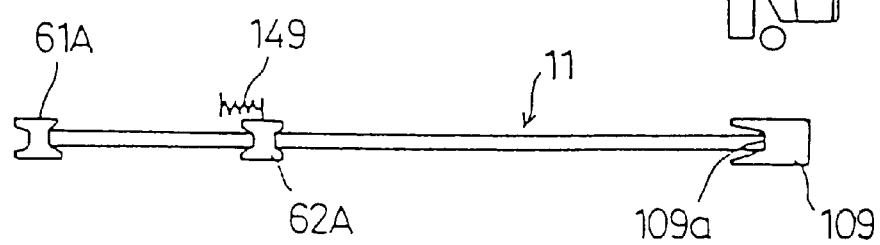

When the rotation of the loading arm 140 in the rotating direction "L1" is started, the disk transporting unit 34A is at a first position of FIGS. 21A and 21B. FIG. 21B shows a cross section of the disk transporting unit 34A at the first position.

The first disk arm 142 and the second disk arm 143 are slightly moved in the longitudinal direction "Y2". The pin 109g of the ejection lever 109 is moved along the guide opening 104e of the loading arm 104. The ejection lever 109 is rotated in the rotating direction (indicated by "M1" in FIG. 21A). The switch 250 is turned ON by the rotation of the ejection lever 109. The disk handling arm 131 is also rotated in the rotating direction (indicated by "N1" in FIG. 21A) by the rotation of the ejection lever 109. The disk 11 is moved in the longitudinal direction "Y1" by a distance (indicated by the arrow "a" in FIG. 21A) from the read end of the disk holder unit 33A by the pushing claw 131c of the disk handling arm 131.

In FIG. 21A, intersecting points between a circumference 11a of the disk 11 and a centerline 11b of the disk 11 are indicated by "Qx1" and "Qx2". A central opening of the disk 11 is indicated by "11c", and an inner perimeter of the central opening of the disk 11 is indicated by "11d". The center of the disk 11 is indicated by "O".

As described above, the disk 11 is moved in the longitudinal direction "Y2" by the disk handling arm 131, and the circumference 11a of the disk 11 is brought into contact with the roller 62A of the second disk arm 143 at the point "Q1". The second disk arm 143 is rotated in the rotating direction "K2" against the biasing force of the spring 149 by the movement of the disk 11. Further, the first disk arm 142 is slightly rotated in the rotating direction "R1" by the rotation of the second disk arm 143, and the roller 61A of the first disk arm 142 is brought into contact with the circumference 11a of the disk 11 at the point "Q2". Since the ejection lever 109 is rotated in the rotating direction "M1", the guide groove 109a of the ejection lever 109 is parallel to the longitudinal direction "Y1". The circumference 11a of the disk 11 is fitted to the guide groove 109a so that the disk 11 can be moved in the longitudinal direction "Y1" along the guide groove 109a, as shown in FIG. 21B.

Figure 22B:
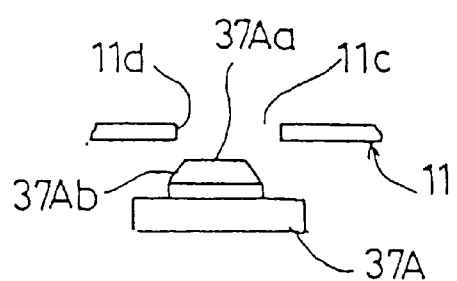

When the loading arm 140 is further rotated around the shaft 144 in the rotating direction "L1", the disk transporting unit 34A is at a second position of FIGS. 22A and 22B. FIG. 22B shows a cross section of the disk transporting unit 34A at the second position.

As shown in FIG. 22A, the first disk arm 142 and the second disk arm 143 are moved in the longitudinal direction "Y2". The pin 147 is moved along the slanted guide opening 103b-1, and the first disk arm 142 is rotated around the pin 146 in the rotating direction "R1". The roller 61A of the first disk arm 142 pushes the circumference 11a of the disk 11 in the lateral direction "X1". The disk 11 is further moved in the longitudinal direction "Y2" by the roller 61A. The circumference 11a of the disk 11 is fitted to the guide groove 60Aa-1 of the guide rail 60A so that the disk 11 can be moved in the longitudinal direction "Y2" along the guide groove 60Aa-1, as shown in FIG. 22A.

In the second position of FIGS. 22A and 22B, the second disk arm 143 is further rotated around the pin 146 in the rotating direction "K2". The roller 62A of the second disk arm 143 is moved along the circumference 11a of the disk 11 and does not restrict the movement of the disk 11 in the longitudinal direction "Y2" while the roller 62A and the disk 11 are placed in contact with each other.

In the second position of FIGS. 22A and 22B, the disk 11 is supported in the horizontal position by the roller 61A, the roller 62A and the guide groove 60Aa-1 of the guide rail 60A at the three points. Therefore, when the disk 11 is transported in the longitudinal direction "Y2" by the disk transporting unit 34A, the disk 11 is safely supported in the horizontal position by the disk transporting unit 34A.

Accordingly, when the disk transporting instruction from the control unit 230 is supplied, the disk transporting unit 34A takes the disk 11 out of the disk holder unit 33A and transports the disk 11 in the longitudinal direction "Y2" in accordance with the rotation of the loading arm 140 around the shaft 144 in the rotating direction "L1". A frictional force between the disk 11 and the ejection lever 109, a frictional force between the disk 11 and the guide rail 60A, a frictional force between the disk 11 and the roller 61A, and a frictional force between the disk 11 and the roller 62A are very small. Therefore, the load when the disk 11 is transported by the disk transporting unit 34A is negligible, and it is possible that the disk 11 be very smoothly transported by the disk transporting unit 34A.

When the loading arm 140 is rotated in the rotating direction "L1" until the slit 140g-6 of the loading arm 140 is sensed by the sensor 145, the disk transporting unit 34A is at the second position of FIGS. 22A and 22B. At this time, the circumference 11a of the disk 11 is in contact with the guide groove 61Aa-1 of the guide rail 60A, and the inner perimeter 11d of the central opening 11c of the disk 11 is located above a tapered surface 37A*b* of a central projection 37A*a* of the turntable 37A as shown in FIG. 22B.

After this, the turntable 37A is moved up in the vertical direction "Z1", and the disk 11 on the turntable 37A is clamped by the clamper 38A. During the clamping action, the inner perimeter 11*d* of the disk 11 is slightly moved in the direction (indicated by the arrow "T" in FIG. 22A) along the tapered surface 37A*b* of the turntable 37A.

Figure 23A:
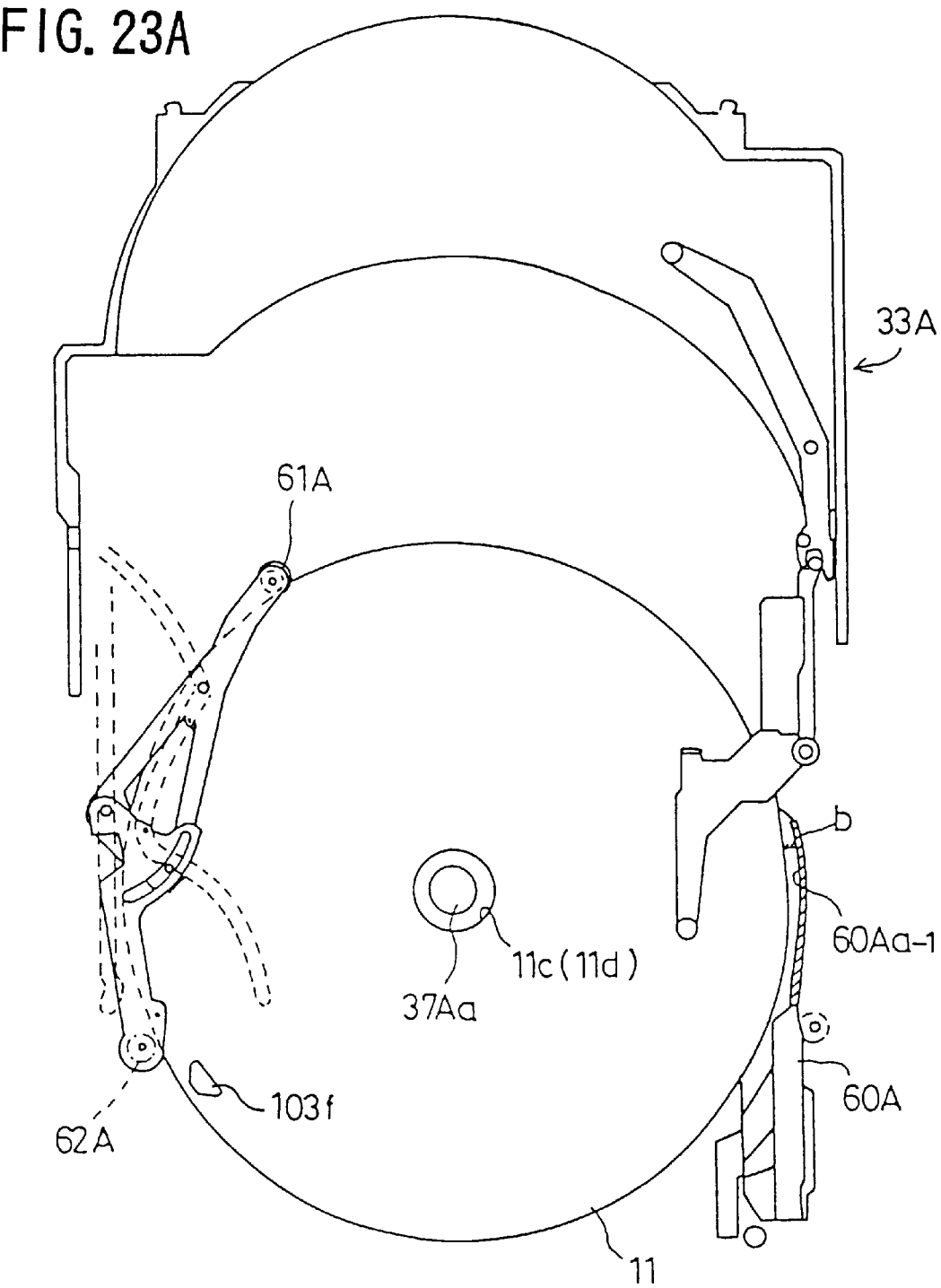
FIGS. 23A and 23B are diagrams showing a third position of the disk transporting unit during the disk transporting operation.
Figure 23B:
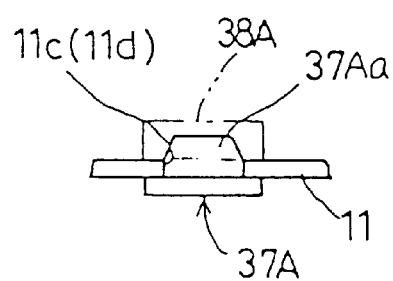

When the disk 11 on the turntable 37A is clamped by the clamper 38A, the disk transporting unit 34A is at a third position of FIGS. 23A and 23B. FIG. 23B shows a cross section of the disk transporting unit 34A at the third position.

In the third position of FIGS. 23A and 23B, the circumference 11*a* of the disk 11 is slightly separated from the guide groove 60A*a*-1 of the guide rail 60A by a distance "b" as indicated in FIG. 23A.

Figure 24:
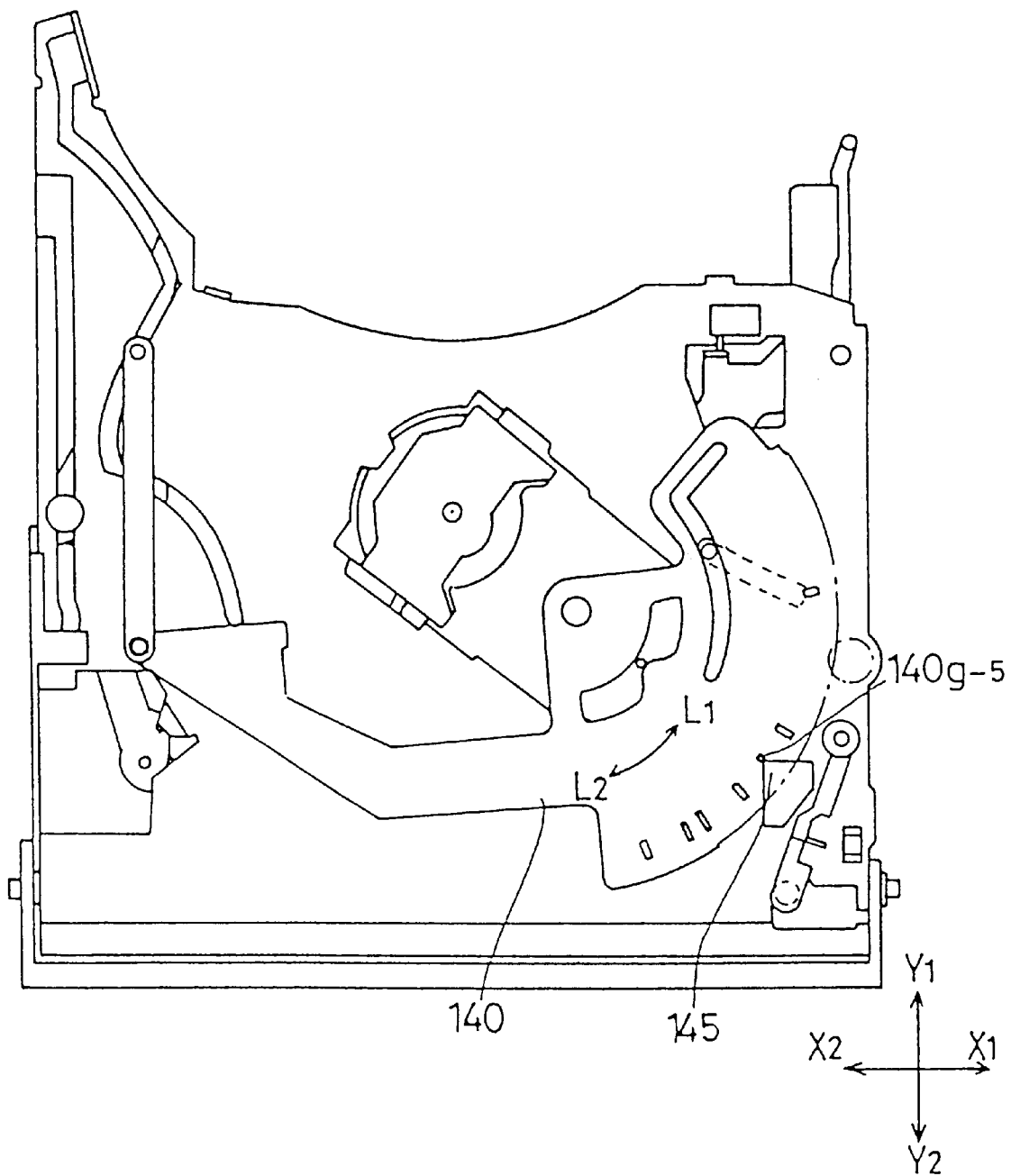
FIGS. 24 and 25 are diagrams showing a fourth position of the disk transporting unit during the disk transporting operation.
Figure 25:
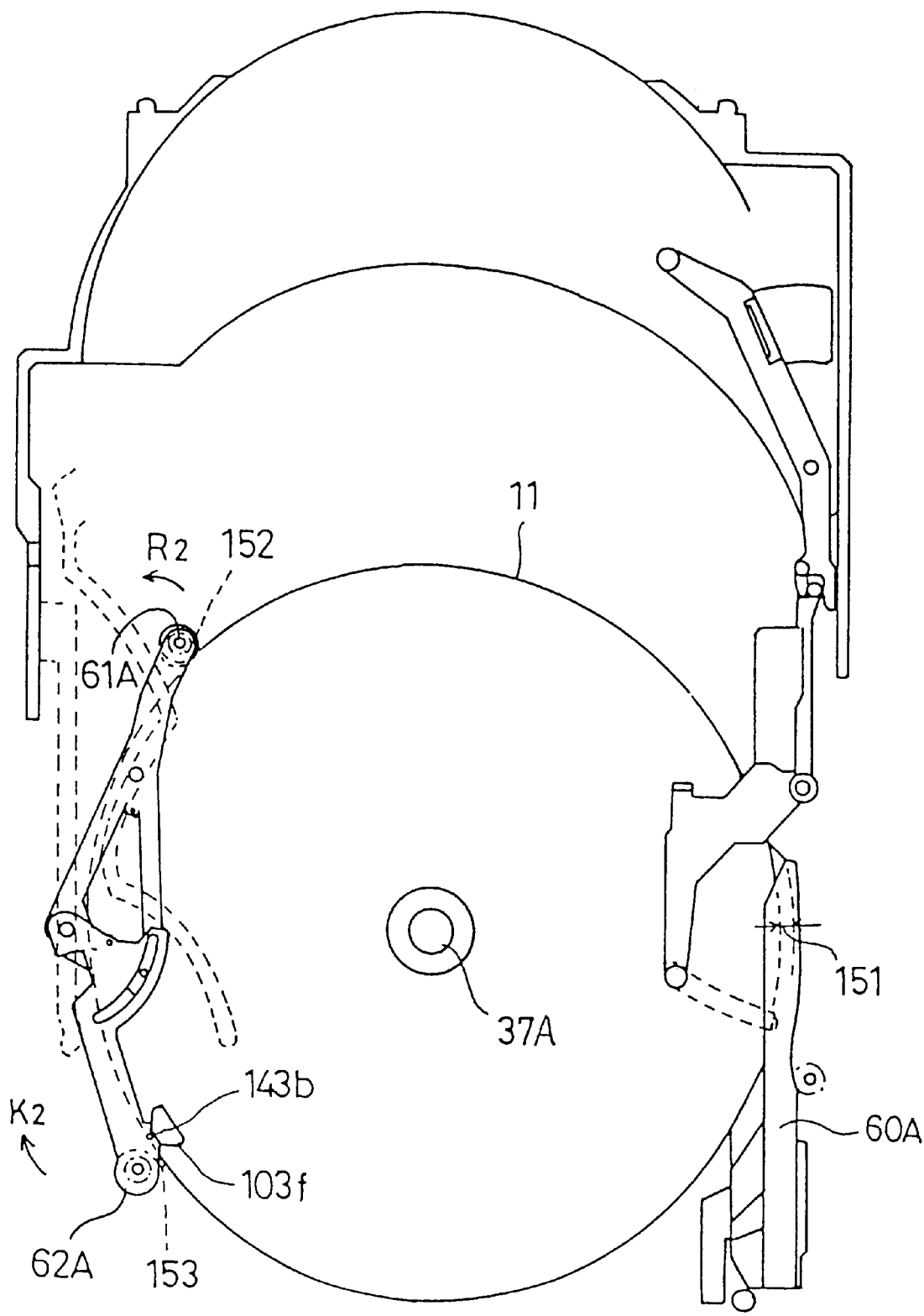

When the loading arm 140 is further rotated around the shaft 144 in the rotating direction "L1", the disk transporting unit 34A is at a fourth position of FIGS. 24 and 25. As shown in FIG. 24, the slit 140*g*-5 of the loading arm 140 is sensed by the sensor 145. The rotation of the loading arm 140 in the rotating direction "L1" is stopped when the disk transporting unit 34A reaches the fourth position of FIGS. 24 and 25.

As shown in FIG. 25, the first disk arm 142 is moved in the longitudinal direction "Y2" by the rotation of the loading arm 140. The pin 147 is moved along the second slanted guide opening 103*b*-2, and the first disk arm 142 is rotated in the rotating direction "R2". The roller 61A of the first disk arm 142 at this time is separated from the circumference 11*a* of the disk 11. A space between the roller 61A and the disk 11 is indicated by reference numeral 152 in FIG. 25.

Further, a pin 143*b* of the second disk arm 143 is connected to the projection 103*f* of the chassis 103, and the second disk arm 143 is slightly rotated in the rotating direction "K2". The roller 62A of the second disk arm 143 at this time is separated from the circumference 11*a* of the disk 11. A space between the roller 62A and the disk 11 is indicated by reference numeral 153 in FIG. 25. The circumference 11*a* of the disk 11 remains separated from the guide groove 60A*a*-1 of the guide rail 60A. A space between the guide rail 60A and the disk 11 is indicated by reference numeral 151 in FIG. 25.

Therefore, when the disk transporting unit 34A is at the fourth position of FIGS. 24 and 25, the disk 11 is not in contact with the disk transporting unit 34A, and the disk 11 in this condition is freely rotatable on the turntable 37A. When the disk 11 is rotated by the turntable 37A, the data signal is reproduced from the disk 11 on the turntable 37A by using the optical pickup 36A.

Further, when a disk returning instruction from the control unit 230 is supplied after the reproduction of the data signal from the disk 11 is finished, the disk transporting unit 34A transports the disk 11 from the playback unit 32A to the original disk holding portion of the disk holder unit 33A. This operation of the disk transporting unit 34A will now be described.

When the disk returning instruction from the control unit 230 is supplied, the loading motor 174 (shown in FIG. 33) in the disk loading unit 110 is driven in the backward direction. The loading arm 140 is rotated backward around the shaft 144 in the rotating direction "L2" (shown in FIG. 24) to the original position (shown in FIG. 19). The roller 61A of the first disk arm 142 is brought into contact with the disk 11, and the roller 62A of the second disk arm 143 is pushed by the circumference 11*a* of the disk 11. The turntable 37A is moved in the vertical direction "Z2", and the disk 11 on the turntable 37A is released. The circumference 11*a* of the disk 11 is pushed in the slanted direction by the roller 62A, and the disk 11 is supported by the roller 61A, the roller 62A and the guide rail 60A at the three points. The disk returning operation of the disk transporting unit 34A is performed by the backward rotation of the loading arm 140.

During the disk returning operation, the first disk arm 142 and the second disk arm 143 are moved in the backward directions according to the backward rotation of the loading arm 140. The disk 11 is transported from the playback unit 32A to the disk holder unit 33A in the longitudinal direction "Y1" while the disk 11 is supported by the roller 61A, the roller 62A and the guide rail 60A at the three points.

Figure 26:
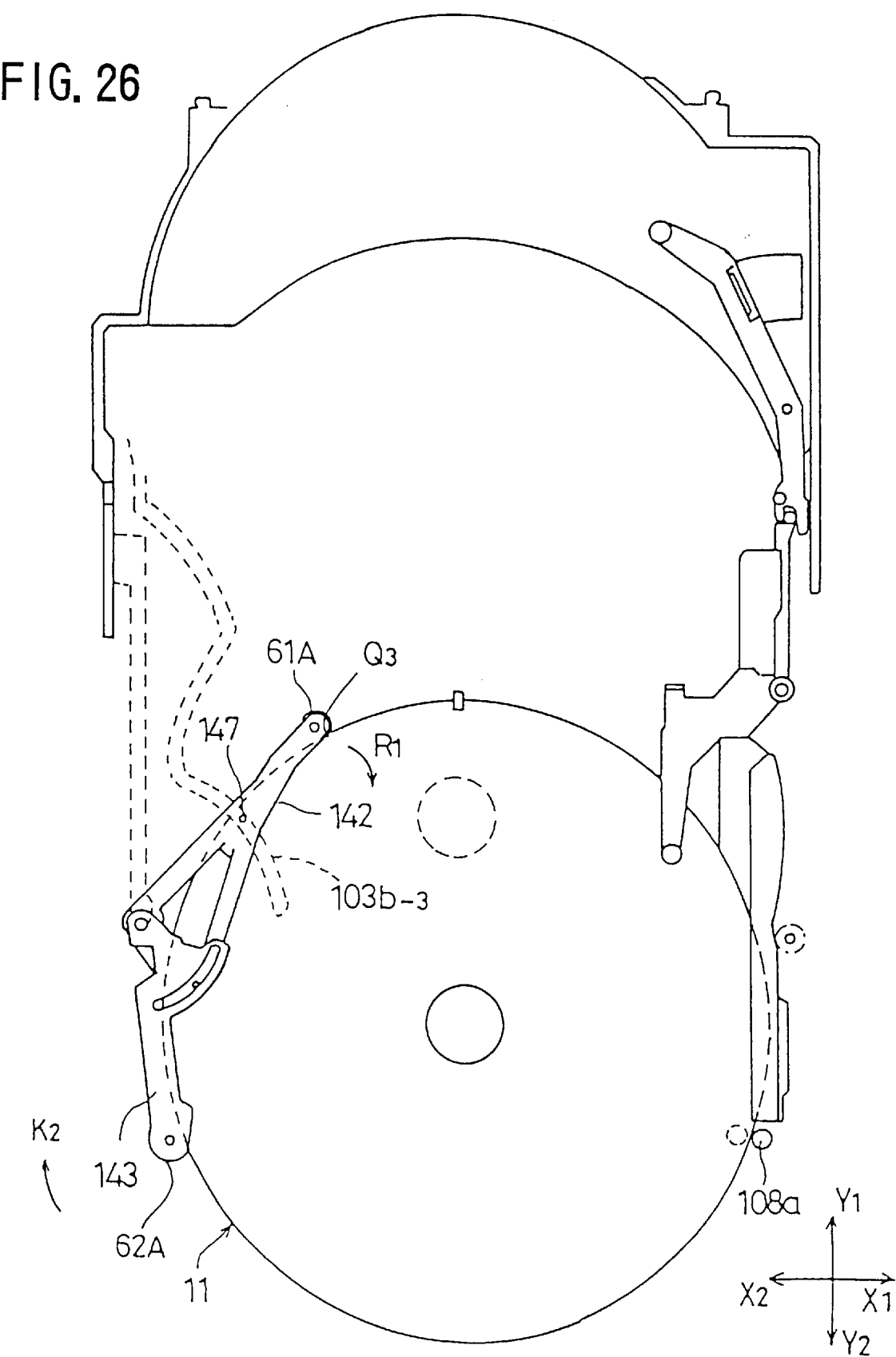
FIG. 26 is a diagram showing a first position of the disk transporting unit during a disk ejecting operation.
Figure 28:
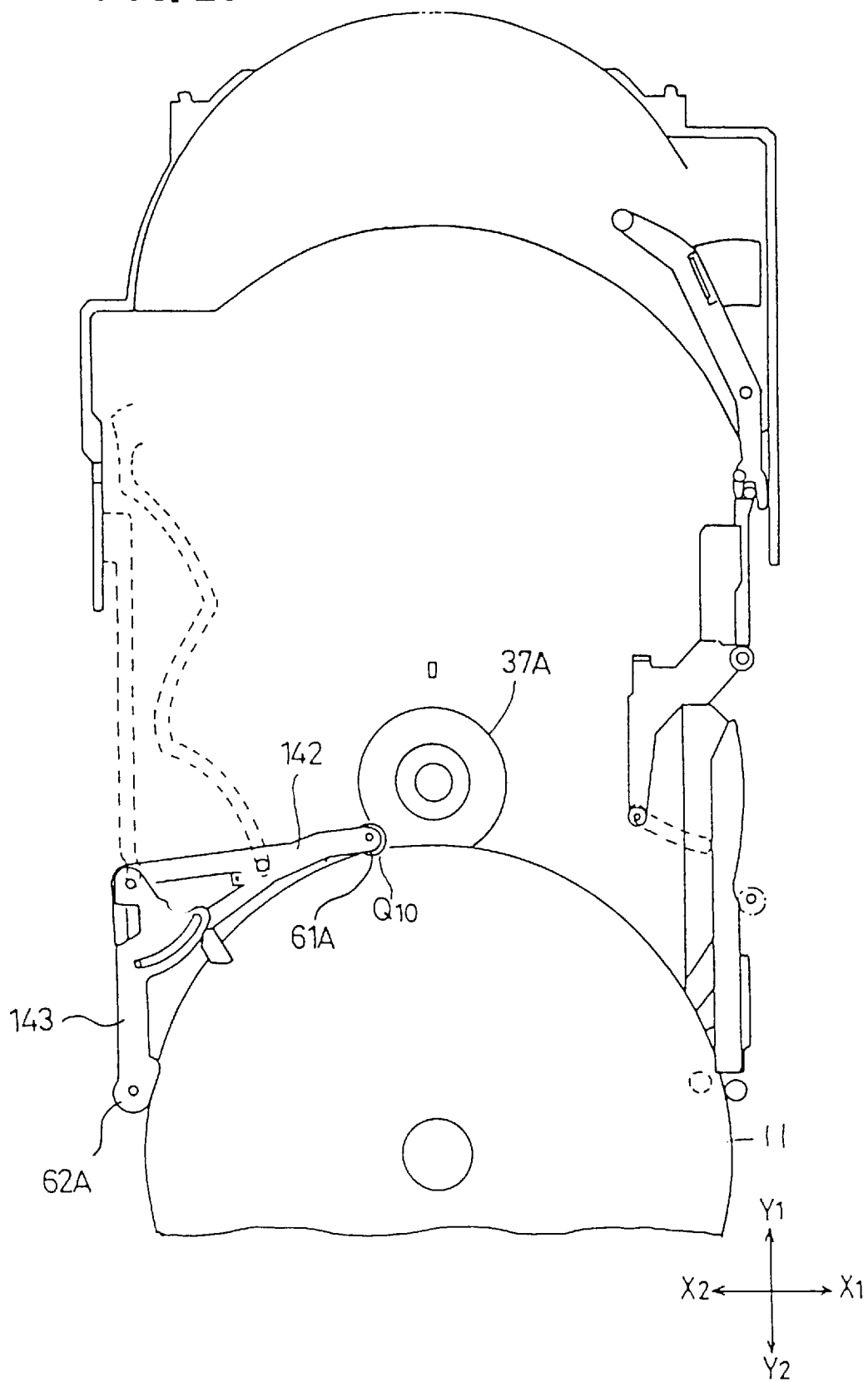

Further, when a disk ejecting instruction from the control unit 230 is supplied, the disk transporting unit 34A transports the disk 11 out of the playback unit 32A to the outside. FIG. 26 shows a first position of the disk transporting unit 34A during a disk ejecting operation. FIGS. 27 and 28 show a second position of the disk transporting unit 34A during the disk ejecting operation. This operation of the disk transporting unit 34A will now be described.

When the disk ejecting instruction from the control unit 230 is supplied, the loading motor 174 is further driven in the forward direction. The turntable 37A is moved down in the vertical direction "Z2", and the disk 11 on the turntable 37A is released. The loading arm 140 is further rotated around the shaft 144 in the rotating direction L1 to the position shown in FIG. 27, and the slit 140*g*-1 of the loading arm 140 is sensed by the sensor 145. When the slit 140*g*-1 is sensed by the sensor 145, it is detected that the disk ejecting operation of the disk transporting unit 34A is finished.

During the disk ejecting operation, the loading arm 140 is rotated around the shaft 144 in the rotating direction "L1" from the fourth position of FIG. 24. As shown in FIG. 26, the first disk arm 142 is moved in the longitudinal direction "Y2". The pin 147 is moved along the third slanted opening 103*b*-3 of the chassis 103 in the longitudinal direction "Y2". The first disk arm 142 is rotated around the pin 146 in the rotating direction "R1". The roller 61A of the first disk arm 142 slantingly pushes the circumference 11*a* of the disk 11 at the point "Q3". The circumference 11*a* of the disk 11 pushes the guide groove 60A*a*-1 of the guide rail 60A. The disk 11 in this condition is transported in the longitudinal direction "Y2".

Further, during the disk ejecting operation, the roller 62A of the second disk arm 143 is brought into contact with the disk 11, and the second disk arm 143 is rotated around the pin 146 in the rotating direction "K2" as shown in FIG. 26. The circumference 11*a* of the disk 11 pushes the pin 108*a* of the insertion lever 108 in the lateral direction "X1". The insertion lever 108 is rotated in the direction "U1" against a biasing force of a spring 116 by the movement of the disk 11. The disk 11 is thus moved in the longitudinal direction "Y2", and the front half of the disk 11 is ejected from the insertion opening of an insertion opening plate 111 out of the playback unit 32A.

When the loading arm 140 is rotated around the shaft 144 in the rotating direction "L1" to the position shown in FIG. 27, the first disk arm 142 and the second disk arm 143 are moved to the position shown in FIG. 28. As shown in FIG. 28, the first disk arm 142 is almost parallel to the lateral direction "X1", and the second disk arm 143 is almost parallel to the longitudinal direction "Y2". The roller 61A of the first disk arm 142 is moved to a position near the turntable 37A, and the roller 61A pushes the disk 11 at the point "Q10". In the position of FIGS. 27 and 28, the front half of the disk 11 is ejected from the insertion opening of the insertion opening plate 111. The operator can take the disk 11 in this condition out of the disk drive 30A.

Figure 29:
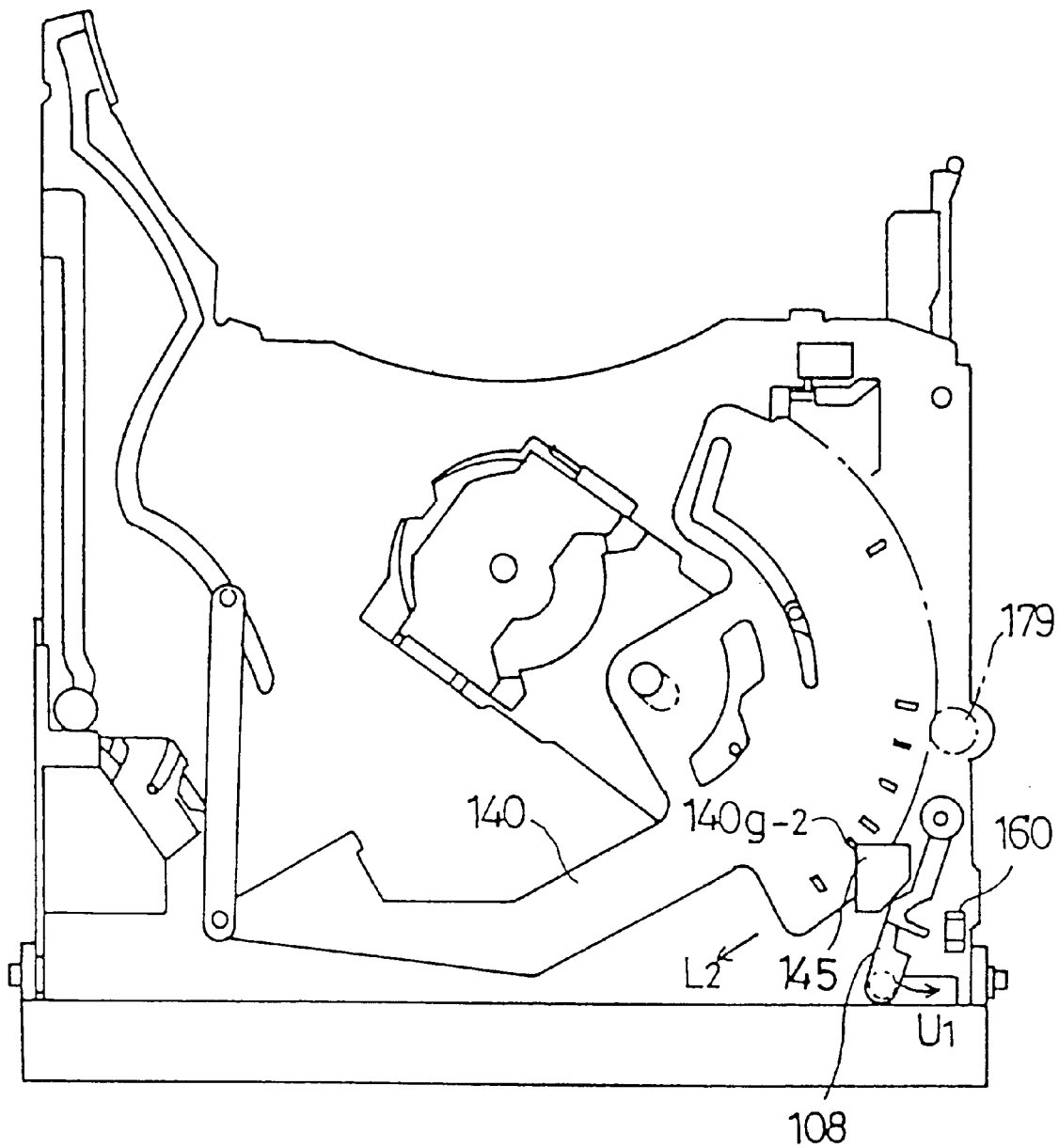
FIGS. 29 and 30 are diagrams showing a standby position of the disk transporting unit.
Figure 30:
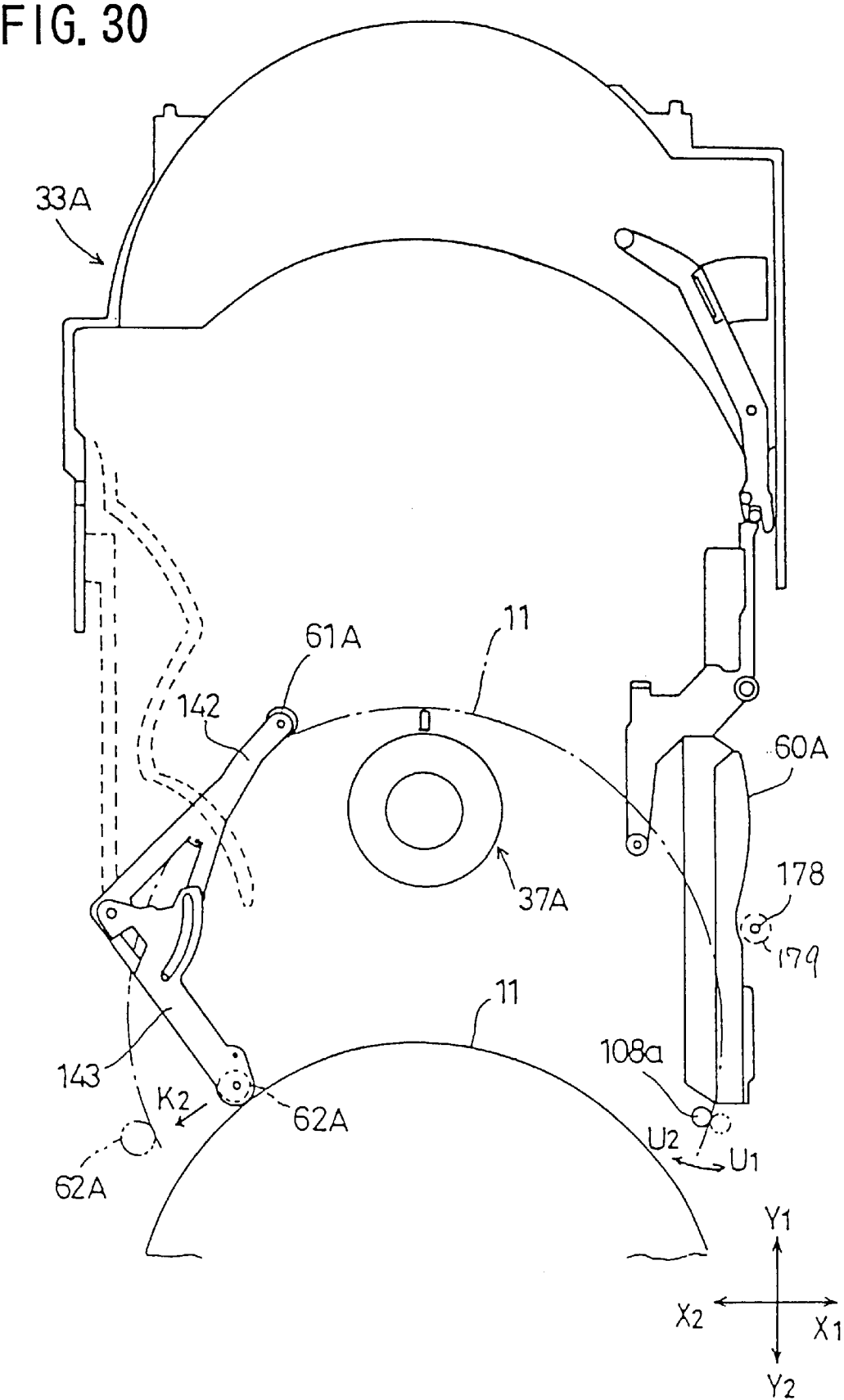

After the disk transporting unit 34A reaches the second position of FIGS. 27 and 28, the loading motor 174 is immediately driven in the backward direction so that the disk transporting unit 34A is returned back to a standby position of FIGS. 29 and 30.

Further, when a disk inserting action is performed by the operator, the disk transporting unit 34A is set at the standby position of FIGS. 29 and 30. The loading motor 174 is driven in the forward direction, and the loading arm 140 is rotated to the position shown in FIG. 29. Before the disk 11 is inserted into the disk drive 30A, the insertion lever 108 is rotated in the rotating direction "U2" by the biasing force the spring 116. After the disk 11 is inserted into the disk drive 30A, the insertion lever 108 is rotated in the rotating direction "U1" against the biasing force of the spring 116 by the disk 11.

When the disk inserting action is performed by the operator, the disk 11 is manually inserted into the disk drive 30A from the insertion opening 71A of the front bezel 39A. As shown in FIG. 30, the circumference 11a of the disk 11 pushes the roller 62A of the second disk arm 143, and the second disk arm 143 is rotated around the pin 146 in the rotating direction "K2" by the disk 11. Further, the circumference 11a of the disk 11 pushes the pin 108a of the insertion lever 108 in the lateral direction "X1". The insertion lever 108 is rotated in the rotating direction "U1" against the biasing force of the spring 116 by the disk 11.

When the entire disk 11 is inserted in the disk drive 30A, the disk detecting sensor 106 is turned ON by the circumference 11a of the inserted disk 11. Since a signal output from the disk detecting sensor 106 is supplied to the control unit 230, it is detected that the disk 11 is placed in the disk drive member 101. The loading motor 174 is driven in the backward direction, and the loading arm 140 is rotated around the shaft 144 in the rotating direction "L2". At this time, the roller 62A of the second disk arm 143 is placed in contact with the front left portion of the circumference 11a of the disk 11 as indicated by the two-dot chain line in FIG. 30.

During the disk inserting operation, the roller 62A pushes the disk 11 in the longitudinal direction "Y1" while the disk 11 is supported by the roller 61A, the roller 62A and the guide rail 60A at the three points. Therefore, the disk 11 is transported to the playback unit 32A in the longitudinal direction "Y1" along the guide groove 60Aa-1 of the guide rail 60A by the disk transporting unit 34A.

When the disk inserting operation is finished, the disk 11 placed on the turntable 37A of the playback unit 32A is temporarily clamped by the clamper 38A. After this, the disk 11 on the turntable 37A is released from the clamper 38A, and the disk 11 is transported in the longitudinal direction "Y1" to the disk holder unit 33A. The disk 11 is finally transported to a specified disk holding portion of the disk holder unit 33A and the disk 11 is held therein.

Figure 31:
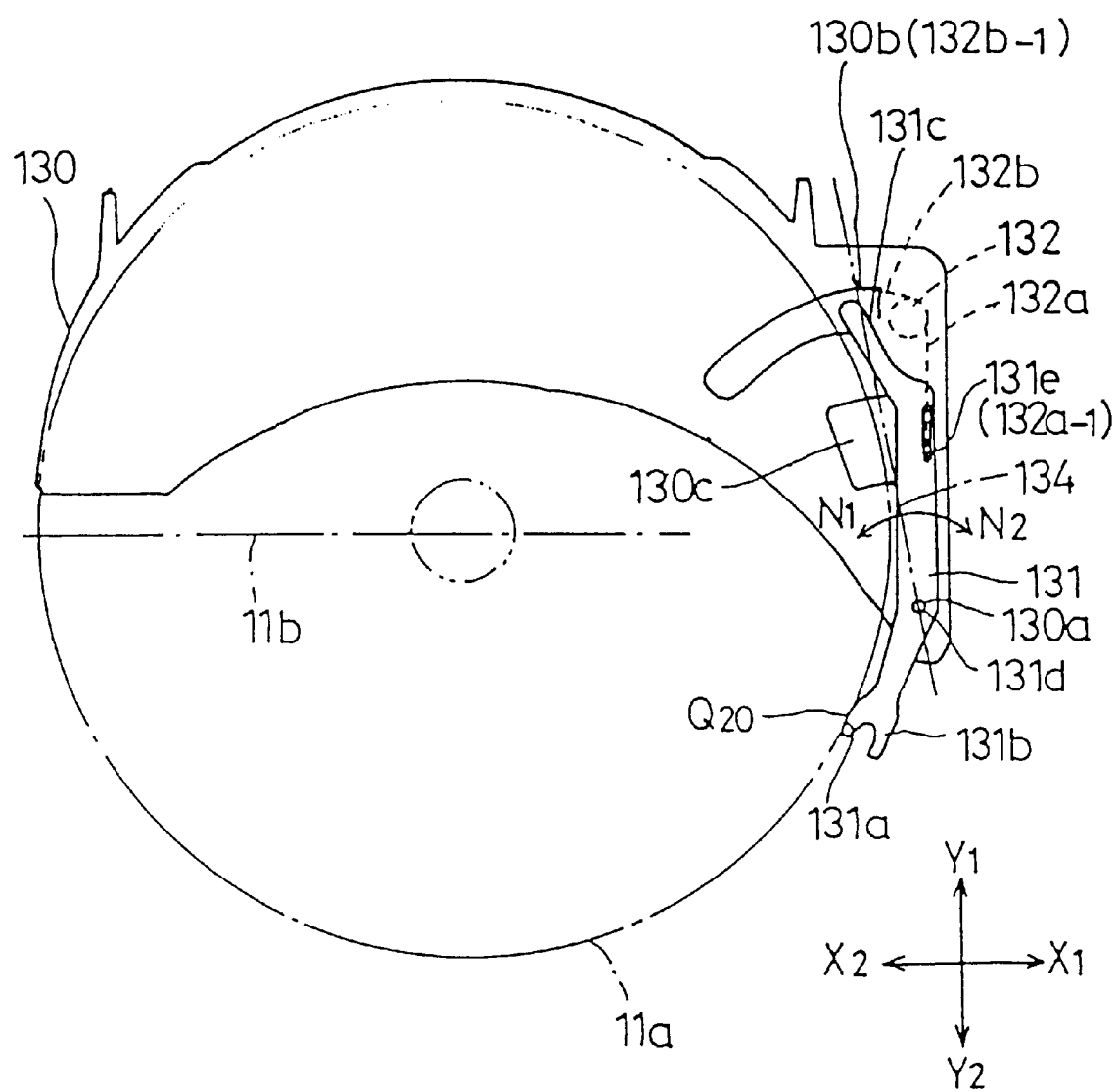
FIG. 31 is a diagram showing a position of the disk holder unit in which the disk is held therein.
Figure 32:
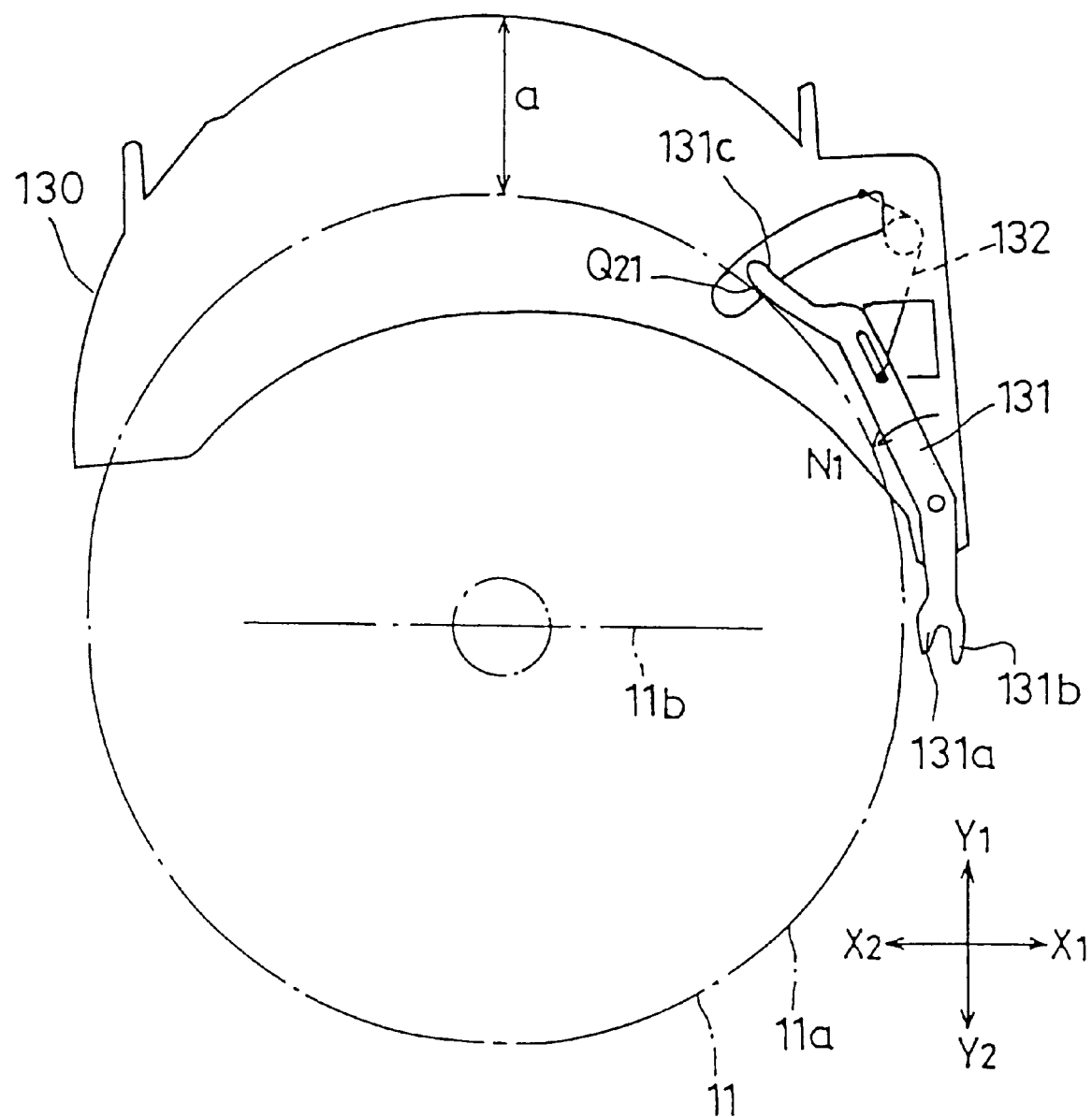
FIG. 32 is a diagram showing a position of the disk holder unit in which the disk is not held therein.

Next, FIG. 31 shows a position of the disk holder unit 33A when the disk 11 is held therein. FIG. 32 shows a position of the disk holder unit 33A when the disk 11 is not held therein.

As shown in FIG. 31, the disk handling arm 131 has the retaining claw 131a at the front end thereof and the pushing claw 131c at the rear end thereof. The disk handling arm 131 has a locking claw 131b adjacent to the retaining claw 131a at the front end of the disk handling arm 131. The disk handling arm 131 has a hole 131d formed at an intermediate portion of the disk handling arm 131, and the hole 131d is fitted into a shaft 130a of the separating plate 130. The disk handling arm 131 is rotatably supported at the hole 131d on the separating plate 130 and is rotatable around the shaft 130a in the rotating direction "N1" or "N2". Further, the disk handling arm 131 has an opening 131e formed at an intermediate portion of the disk handling arm 131 near the rear end thereof.

In the disk holder unit 33A of FIG. 31, a helical torsion spring 132 is arranged on the bottom surface of the separating plate 130. The spring 132 has a first arm portion 132a and a second arm portion 132b. The first arm portion 132a of the spring 132 has an end 132a-1 connected to the opening 131e. The second arm portion 132b of the spring 132 has an end 132b-1 connected to a hole 130b of the separating plate 130. The separating plate 130 has a rectangular opening 130c, and the first arm portion 132a of the spring 132 on the bottom surface of the plate 130 passes through the opening 130c of the plate 130, and the end 132a-1 of the portion 132a is connected to the disk handling arm 131 on the top surface of the plate 130. Since a movement of the first arm portion 132a of the spring 132 relative to the plate 130 is restricted by the periphery of the opening 130c, a range of the rotation of the disk handling arm 131 around the shaft 130a depends upon the configuration of the rectangular opening 130c.

The helical torsion spring 132 always exerts a biasing force on the disk handling arm 131 so as to rotate the disk handling arm 131 around the shaft 130a in the rotating direction "N2". The spring 132 is arranged on the separating plate 130 such that the end 132a-1 of the first arm portion 132a crosses a centerline 134 (indicated by a one-dot chain line in FIG. 31) of the opening 130c of the separating plate 130 when the disk handling arm 131 is rotated around the shaft 130a in the rotating direction "N1" or "N2". As shown in FIG. 31, the centerline 134 of the opening 130c is described so as to pass through the shaft 130a of the separating plate 130 and the end 132b-1 of the second arm portion 132b of the spring 132.

When the disk 11 is held in the disk holder unit 33A, as shown in FIG. 31, the disk handling arm 131 is rotated around the shaft 130a in the rotating direction "N2" by the biasing force of the spring 132. At this time, the end 132a-1 of the first arm portion 132a is located on the right side of the centerline 134. The position of the disk handling arm 131 is determined by the configuration of the periphery of the opening 130c. The disk 11 in this condition is held at the point "Q20" on the circumference 11a of the disk 11 by the retaining claw 131a of the disk handling arm 131. The point "Q20" is located on the front side of the centerline 11b of the disk 11. Therefore, the disk handling arm 131 in this condition serves to prevent the disk 11 from being ejected out of the disk holder unit 33A.

When the ejection lever 109 is rotated in the rotating direction "M1", a pin 109c of the ejection lever 109 pushes the locking claw 131b of the disk handling arm 131. The disk handling arm 131 is rotated around the shaft 130a in the rotating direction "N1" against the biasing force of the spring 132. After the end 132a-1 of the first arm portion 132a crosses the centerline 134, the disk handling arm 131 is pushed and rotated around the shaft 130a in the rotating direction "N1" by the helical torsion spring 132, as shown in FIG. 32.

As shown in FIG. 32, when the disk handling arm 131 is rotated around the shaft 130a in the rotating direction "N1", the retaining claw 131a is separated from the circumference 11a of the disk 11, and the pushing claw 131c pushes the circumference 11a of the disk 11 at the point "Q21". At this time, the disk 11 is moved in the longitudinal direction "Y2" by the disk handling arm 131, and the circumference 11a of the disk 11 is separated from the rear end of the separating plate 130 by the distance "a" in FIG. 32. As shown in FIG. 21A, the circumference 11a of the disk 11 is brought into contact with the roller 61A and the roller 62A.

Further, when the disk 11 from the playback unit 32A is transported to the disk holder unit 33A in the longitudinal direction "Y1", the ejection lever 109 and the disk handling arm 131 are moved in the backward directions. The disk 11 is held in the disk holder unit 33A by the helical torsion spring 132 as shown in FIG. 31.

When the disk 11 is transported to the disk holder unit 33A, the retaining claw 131a of the disk handling arm 131 pushes and transports the disk 11 in the longitudinal direction "Y1". As shown in FIG. 20, the circumference 11a of the disk 11 is separated from the roller 61A and the roller 62A.

Figure 33:
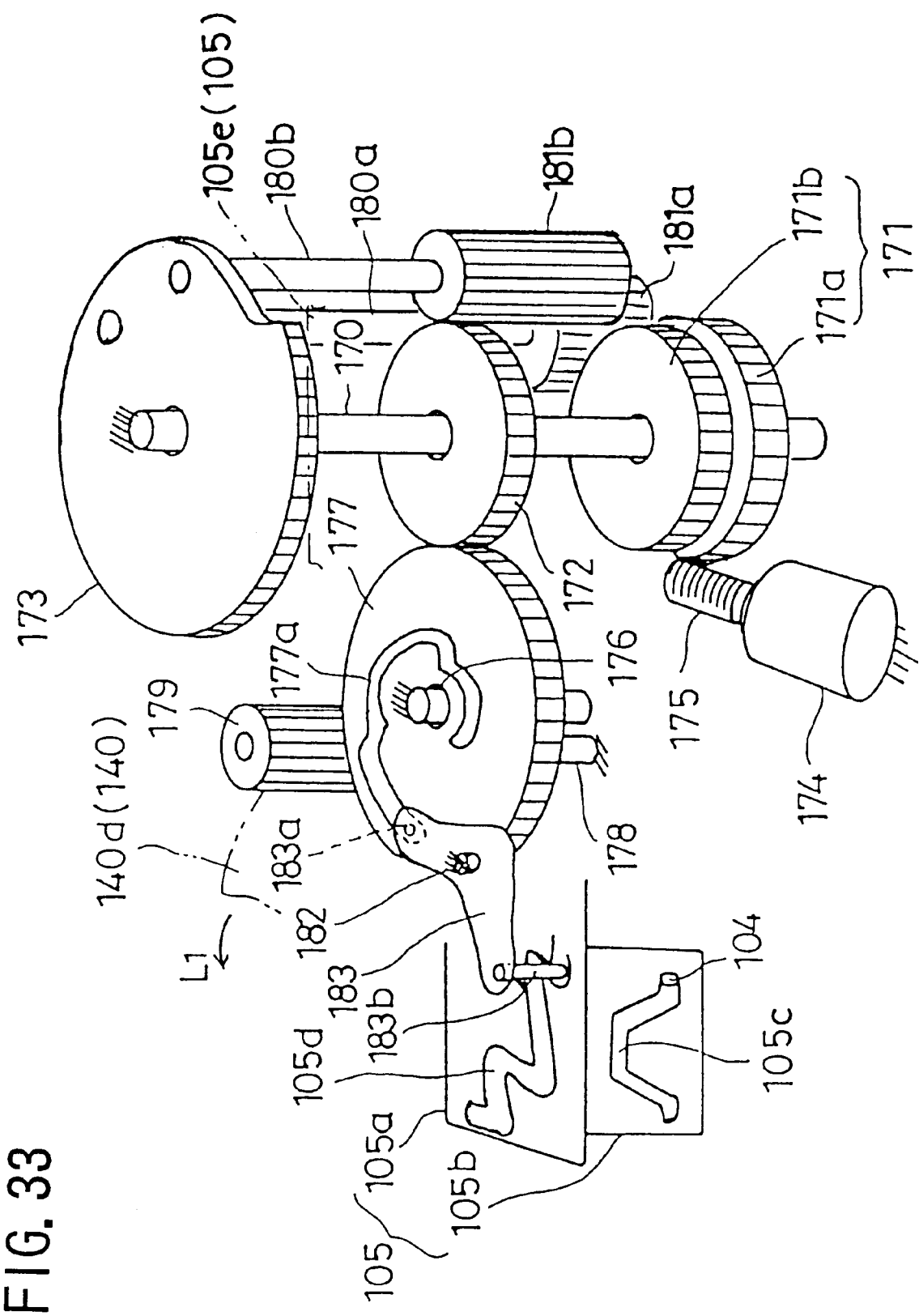
FIG. 33 is a diagram showing a disk loading unit in the disk drive.
Figure 34A:
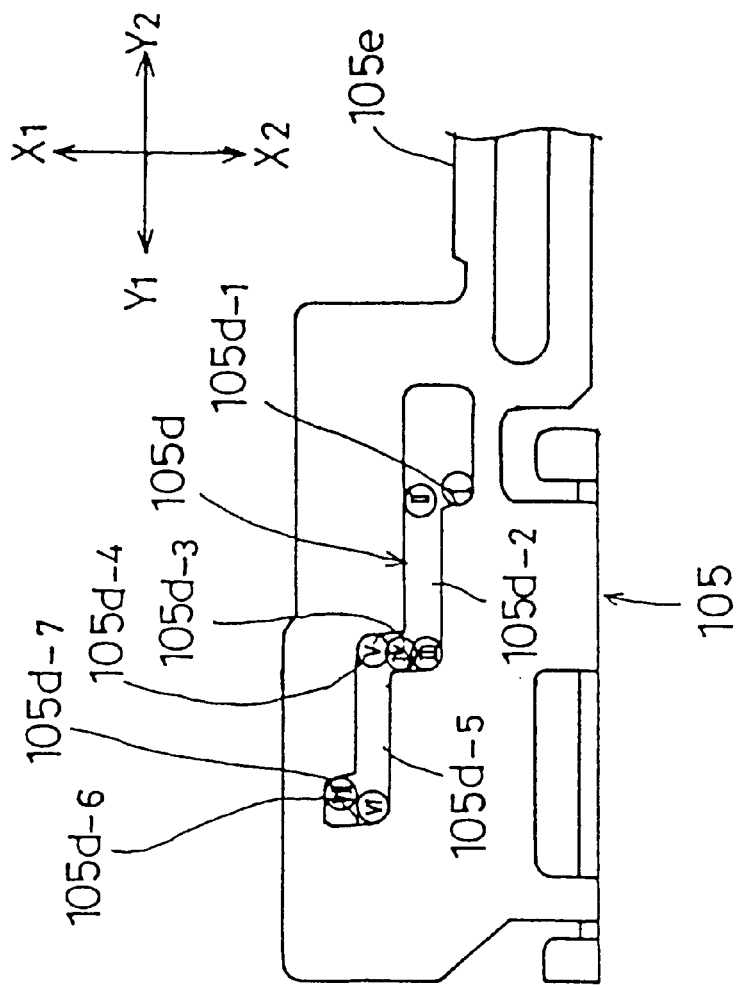
FIGS. 34A and 34B are diagrams showing various positions of pins of a link arm of the disk loading unit of FIG. 33.
Figure 34B:
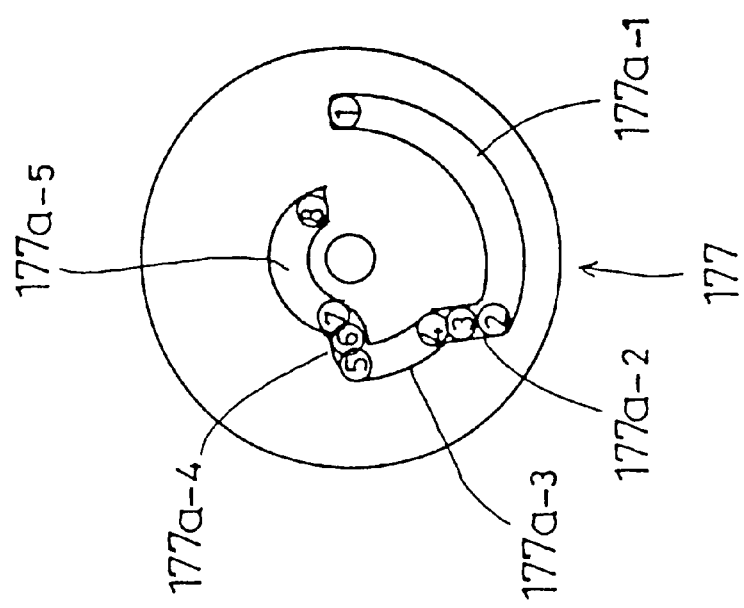

Next, FIGS. 33, 34A and 34B show the disk loading unit 110 of the disk drive 30A.

As shown in FIG. 33, the disk loading unit 110 includes the slide member 105 which is movably arranged on the bottom surface of the chassis base 150. The slide member 105 is movable in the longitudinal direction "Y1" or "Y2". A downward projecting shaft 170 is fixed to the chassis base 150. A gear 171 includes a worm wheel portion 171a and a gear portion 171b, and the worm wheel portion 171a and the gear portion 171b are rotatably supported on the shaft 170 independently of each other. Further, a gear 172 and a semicircular pinion 173 are rotatably supported on the shaft 170 independently of each other. The loading motor 174 is fixed onto the bottom surface of the chassis base 150. A worm gear 175 is secured to the spindle of the loading motor 174, and the worm 175 is engaged with the worm wheel portion 171a of the gear 171. A shaft 176 is fixed to the chassis base 150. A cam gear 177 having a cam groove 177a is engaged with the gear 172 and supported on the shaft 176.

Further, in the disk loading unit 110 of FIG. 33, a shaft 178 is rotatably supported on the chassis base 150. A gear 179 is rotatably supported on the shaft 178 and engaged with the cam gear 177. A shaft 180a and a shaft 180b are secured to the pinion 173. A gear 181a is rotatably supported on the shaft 180a, and a gear 181b is rotatably supported on the shaft 180b. The gear 181a and the gear 181b are engaged with each other. The gear 181a is engaged with the gear portion 171b, and the gear 181b is engaged with the gear 172.

A shaft 182 is fixed to the chassis base 150. A link arm 183 has a pin 183a and a pin 183b at both ends of the link arm 183, and the link arm 183 is rotatably supported on the shaft 182. As shown in FIG. 33, the pin 183a is fitted to the cam groove 177a of the cam gear 177, and the pin 183b is fitted to the stepped guide groove 105d of the slide member 105.

The gear 179 is engaged with the rack 140d (not shown in FIG. 33) of the loading arm 140. When the gear 179 is rotated around the shaft 178, the loading arm 140 is rotated by the engagement between the rack 140d and the gear 179.

When the rotation of the pinion 173 around the shaft 170 is inhibited, the gear 181b is not rotated around the circumference of the gear 172 and stays at a fixed position with respect to the shaft 170. The gears 181a and 181b at this time serve to transmit the rotation of the gear portion 171b to the gear 172 so that the gear 172 is rotated around the shaft 170 by the rotation of the gear portion 171b through the gears 181a and 181b. On the other hand, when the rotation of the pinion 173 around the shaft 170 is allowed, the cam gear 177 and the gear 172 are not rotated and remain stopped since the rotation of the cam gear 177 around the shaft 176 is inhibited by the connection of the cam groove 177a and the pin 183a. The gear 181b at this time is rotated around the circumference of the gear 172 while the gear 181b is rotated around the shaft 180b. Therefore, the pinion 173 is rotated around the shaft 170 by the rotation of the gears 181b around the circumference of the gear 172.

In the disk loading unit 110 of FIG. 33, the slide member 105 has a horizontal plate 105a and a vertical plate 105b. In the vertical plate 105b, the guide groove 105c is formed. In the horizontal plate 105a, a stepped guide groove 105d is formed. The pin 183a of the link arm 183 is fitted to the cam groove 177a of the cam gear 177, and the pin 183b of the link arm 183 is fitted to the stepped guide groove 105d.

As indicated by a one-dot chain line in FIG. 33, a rack 105e which is formed in the horizontal plate 105a of the slide member 105 is engaged with the semicircular pinion 173. As shown in FIG. 34B, the stepped guide groove 105d includes grooves which extend in the longitudinal direction "Y1" or "Y2" and steps which extend in the lateral direction "X1" or "X2. More specifically, the stepped guide groove 105d has a first step 105d-1, a longitudinally extending first groove 105d-2, a second step 105d-3, a third step 105d-4, a longitudinally extending second groove 105d-5, a fourth step 105d-6, and a fifth step 105d-7.

In FIG. 34B, positions of the pin 183b, when it is fitted to the first step 105d-1, the first groove 105d-2, the second step 105d-3, the third step 105d-4, the second groove 105d-5, the fourth step 105d-6 and the fifth step 105d-7 are respectively indicated by "I", "II", "III", "IV", "V", "VI" and "VII".

As shown in FIG. 34A, the cam groove 177a of the cam gear 177 includes a first circular groove 177a-1, a first radial groove 177a-2, a second circular groove 177a-3, a second radial groove 177a-4, and a third circular groove 177a-5. In FIG. 34A, positions of the pin 183a, when it is fitted to the ends of the first circular groove 177a-1, the first radial groove 177a-2, the ends of the second circular groove 177a-3, the second radial groove 177a-4, and the ends of the third circular groove 177a-5, are indicated by "1", "2", "3", "4", "5", "6", "7" and "8".

In the above-described disk loading unit 110, when the pin 183b is fitted to the first groove 105d-2, the connection of the pin 183b and the stepped guide groove 105d serves to inhibit the rotation of the link arm 183 around the shaft 182 while the pin 183a is fitted to the first radial groove 177a-2. When the pin 183b is fitted to the second groove 105d-5, the connection of the pin 183b and the stepped guide groove 105d serves to inhibit the rotation of the link arm 183 around the shaft 182 while the pin 183a is fitted to the second radial groove 177a-4.

When the pin 183a is fitted to the first circular groove 177a-1, the connection of the pin 183a and the cam groove 177 serves to inhibit the rotation of the link arm 183 around the shaft 182 while the pin 183b is fitted to the first step 105d-1. When the pin 183a is fitted to the second circular groove 177a-3, the connection of the pin 183a and the cam groove 177 serves to inhibit the rotation of the link arm 183 around the shaft 182 while the pin 183b is fitted to the second step 105d-3 or the third step 105d-4. When the pin 183a is fitted to the third circular groove 177a-5, the connection of the pin 183a and the cam groove 177 serves to inhibit the rotation of the link arm 183 around the shaft 182 while the pin 183*b* is fitted to the fourth step 105*d*-6 or the fifth step 105*d*-7.

When the cam gear 177 is rotated counterclockwise around the shaft 176, the pin 183*a* is fitted to the first radial groove 177*a*-2, and the connection of the pin 183*a* and the cam groove 177*a* serves to allow the link arm 183 to be rotated clockwise around the shaft 182 while the pin 183*b* is fitted to the first step 105*d*-1. At this time, the link arm 183 can be rotated clockwise around the shaft 182 by the connection of the pin 183*a* and the first radial groove 177*a*-2. On the other hand, when the cam gear 177 is rotated clockwise around the shaft 176, the pin 183*a* is fitted to the second radial groove 177*a*-4 or the first radial groove 177*a*-2, the connection of the pin 183*a* and the cam groove 177*a* serves to allow the link arm 183 to be rotated counterclockwise around the shaft 182.

When the pin 183*b* is fitted to the first step 105*d*-1, the second step 105*d*-3 or the fourth step 105*d*-6, the connection of the pin 183*b* and the stepped guide groove 105*d* serves to inhibit the movement of the slide member 105 in the longitudinal direction "Y2". When the pin 183*b* is fitted to the fifth step 105*d*-7 or the third step 105*d*-4, the connection of the pin 183*b* and the stepped guide groove 105*d* serves to inhibit the movement of the slide member 105 in the longitudinal direction "Y2". As described above, the rack 105*e* of the slide member 105 is engaged with the pinion 173.

Accordingly, the cam gear 177, the slide member 105, and the pinion 173 are arranged such that, when the rotation of the cam gear 177 around the shaft 176 is allowed, the movement of the slide member 105 (or the rotation of the pinion 173 around the shaft 170) is inhibited, and, when the rotation of the cam gear 177 around the shaft 176 is inhibited, the movement of the slide member 105 (or the rotation of the pinion 173 around the shaft 170) is allowed.

As shown in FIG. 14, the chassis base 150 has an arm portion 150*a* which extends in the lateral direction "X2. The arm portion 150*a* is arranged below the disk holder unit 34A. In the arm portion 150*a*, a pad 155 of a synthetic resin material is provided thereon. The pad 155 safely supports the disk 11 which is transported between the disk holder unit 33A and the playback unit 32A. The pad 155 serves to prevent the occurrence of a flaw in the disk 11 being transported.

Next, FIGS. 35A–35F, 36A–36F and 37 show operations of the elements of the disk loading unit 110.

Figure 37:
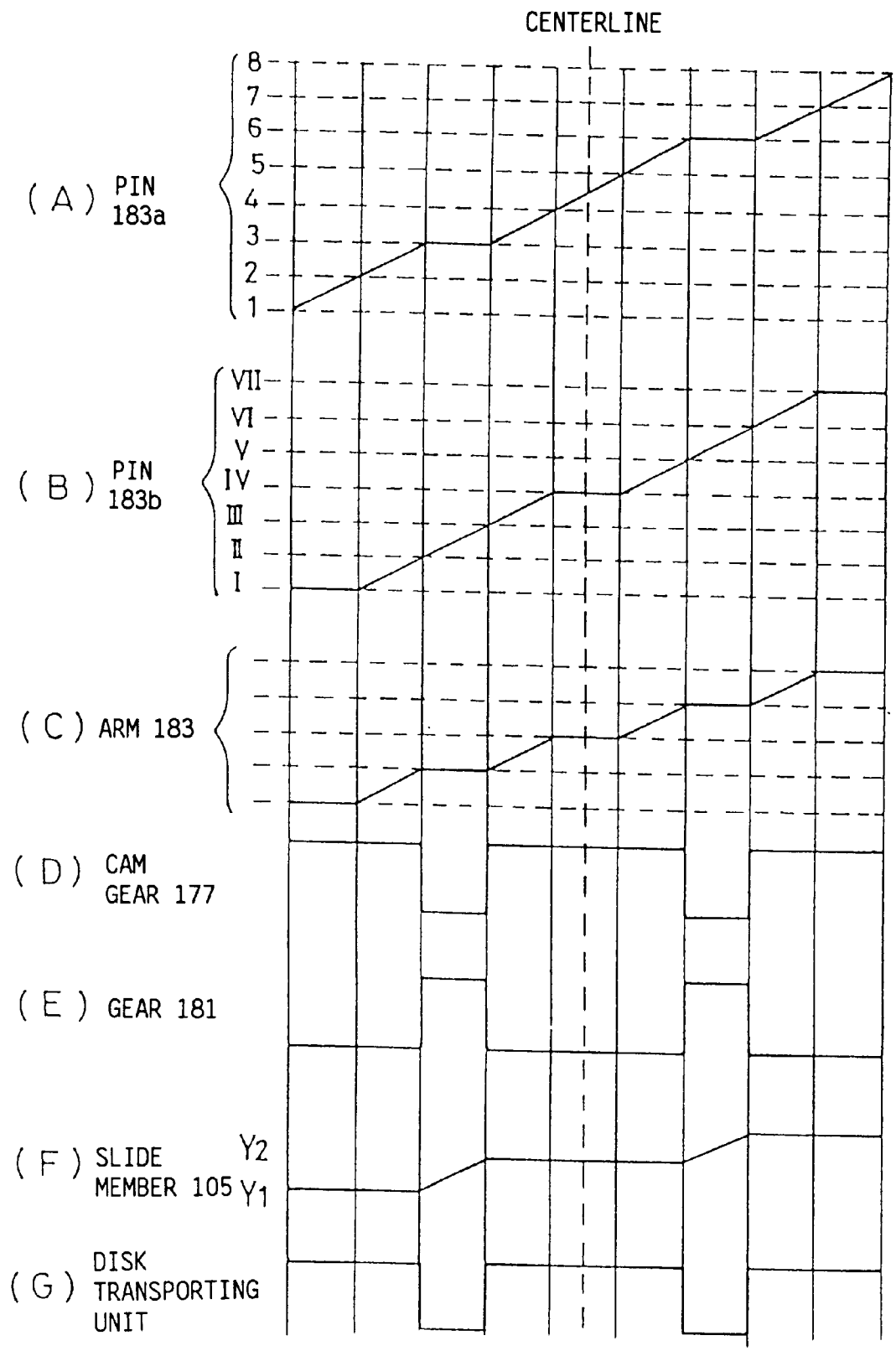
FIG. 37 is a diagram showing movements of the elements of the disk loading unit and the disk transporting unit.

In FIG. 37, (A) indicates a movement of the pin 183*a*, (B) indicates a movement of the pin 183*b*, (C) indicates a movement of the link arm 183, (D) indicates a movement of the cam gear 177, (E) indicates a movement of the gear 181*b*, (F) indicates a movement of the slide member 105, and (G) indicates a movement of the disk transporting unit 34A. The operations of the elements of the disk loading unit 110 will now be described.

Figure 35A:
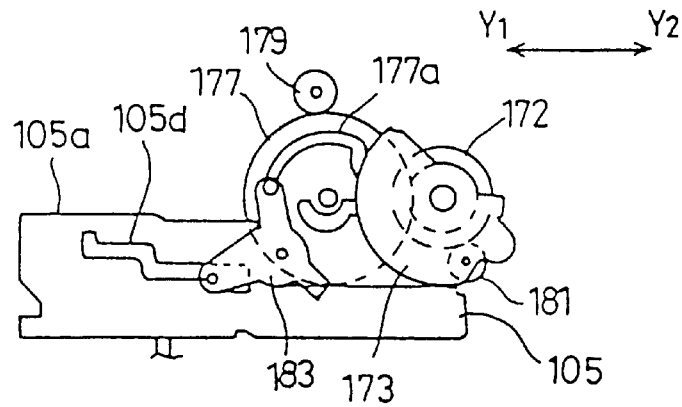
Figure 35B:
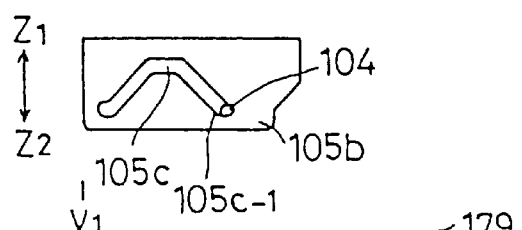
Figure 35C:
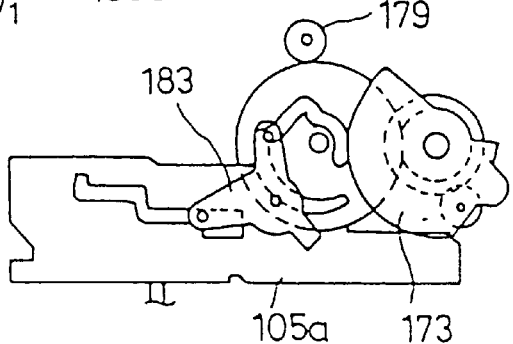

In the above-described disk loading unit 110, when the disk transporting unit 34A is at the starting position of FIG. 19, the disk loading unit 110 is at a position of FIGS. 35A and 35B. As shown in FIGS. 35A and 35B, the cam gear 177 is rotated clockwise around the shaft 136, and the pin 183*a* is fitted to the cam groove 177*a* at the position "1" indicated in FIG. 34A. The link arm 183 is rotated counterclockwise around the shaft 182, and the pin 183*b* is fitted to the stepped guide groove 105*d* at the position "I" indicated in FIG. 34B. The slide member 105 is located at a position "V1" indicated in FIG. 35B, and the movement of the slide member 105 in the longitudinal direction "Y2" is inhibited. The rotation of the pinion 173 around the shaft 170 is inhibited. The pin 104 is fitted to a position 105*c*-1 (indicated in FIG. 35B) of the guide groove 105*c*.

When the loading motor 174 is driven in the forward direction, the rotation of the worm gear 175 by the loading motor 174 is transmitted to the cam gear 177 through the gears 171, 181*a*, 181*b* and 172. The cam gear 177 is rotated counterclockwise around the shaft 136. The pin 183*a* is moved relative to the cam gear 177 from the position "1" to the position "2" in the cam groove 177*a*. The link arm 183 remains at the position of FIGS. 35A and 35B until the pin 183*a* reaches the position "2". The pin 183*b* is fitted to the stepped guide groove 105*d* at the position "I". The movement of the slide member 105 in the longitudinal direction "Y2" is inhibited, and the rotation of the pinion 173 around the shaft 170 is inhibited.

When the cam gear 177 is rotated counterclockwise, the gear 179 is rotated clockwise by the rotation of the cam gear 177. The loading arm 140 is moved in the rotating direction "L1" by the rotation of the gear 179. As described above, the disk transporting unit 34A transports the disk 11 in the longitudinal direction "Y2" from the disk holder unit 33A.

When the disk 11 is transported to the second position of FIGS. 22A and 22B, the link arm 183 is rotated clockwise around the shaft 182. The pin 183*a* is moved from the position "2" to the position "3" in the cam groove 177*a*, and the pin 183*b* is moved from the position "I" to the position "II". The disk loading unit 110 at this time is at a position of FIGS. 35C and 35D. The rotation of the cam gear 177 is inhibited, and the movement of the disk transporting unit 34A is stopped. The movement of the slide member 105 (or the rotation of the pinion 173) is allowed. The gear 181*b* is rotated around the circumference of the gear 172 while the gear 181*b* is rotated around the shaft 180*b*. The rotation of the pinion 173 is started, and the movement of the slide member 105 in the longitudinal direction is started.

Figure 35E:
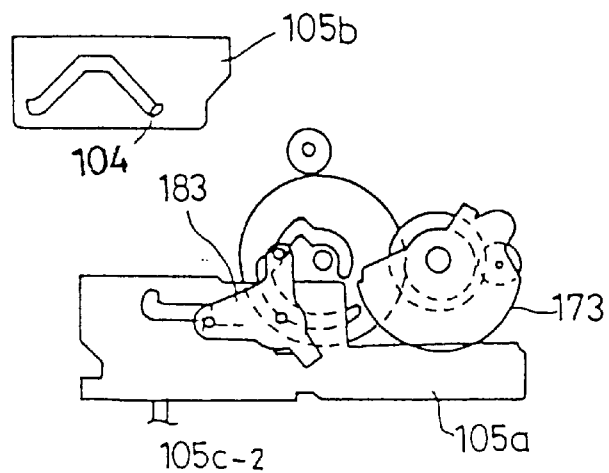
Figure 35F:
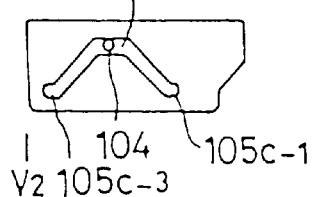

As shown in FIGS. 35E and 35F, the slide member 105 is moved such that the pin 183*b* is moved to the position "III" (indicated in FIG. 34B) in the stepped guide groove 105*d*, and the second step 105*d*-3 is moved to a position "V2" indicated in FIG. 35F. When the pin 183*b* is fitted to the second step 105*d*-3, the movement of the slide member 105 is inhibited and stopped.

As shown in FIG. 35F, the pin 104 is fitted to a position 105*c*-2 (indicated in FIG. 35F) of the guide groove 105*c*. At this time, the disk drive member 101 of the playback unit 32A is rotated in the rotating direction "J", the turntable 37A is upwardly moved in the vertical direction "Z1", and the disk 11 on the turntable 37A is clamped by the clamper 38A.

When the pin 183*b* is fitted to the stepped guide groove 105*d* at the position "III" indicated in FIG. 34B, the rotation of the link arm 183 around the shaft 182 is allowed. The pin 183*a* is moved along the cam groove 177*a* of the cam gear 177, and the link arm 183 is rotated clockwise around the shaft 182 by the movement of the pin 183*a*. The pin 183*a* is moved to the position "4", and the pin 183*b* is moved to the position "IV". The disk loading unit 110 at this time is at the position of FIGS. 35E and 35F. The movement of the slide member 105 is inhibited, and the rotation of the cam gear 177 around the shaft 176 is allowed. When the cam gear 177 is rotated counterclockwise around the shaft 176, the disk transporting unit 34A is operated by the rotation of the cam gear 177. The roller 61A and the roller 62A are separated from the circumference 11*a* of the disk 11.

When the cam gear 177 is rotated counterclockwise and the pin 183*a* is moved to an intermediate position between the position "4" and the position "5", the slit 140g-6 of the loading arm 140 is sensed by the sensor 145. At this time, the loading motor 174 is stopped, and another motor (not shown) for rotating the turntable 37A is started so that the disk 11 is rotated by the turntable 37A in order for the reproduction of the data signal from the disk 11.

When the disk 11 is returned back to the original disk holding portion of the disk holder unit 33A after the reproduction of the data signal from the disk 11 is finished, the loading motor 174 is driven in the backward direction. The cam gear 177 is rotated clockwise around the shaft 176 by the loading motor 174, and the disk 11 is held by the roller 61A and the roller 62A. The slide member 105 is moved in the longitudinal direction "Y1", and the disk 11 on the turntable 37A is released from the clamper 38A. The cam gear 177 is again rotated clockwise around the shaft 176, and the disk 11 is transported in the longitudinal direction "Y1".

When the disk 11 is ejected out of the disk drive 30A, the loading motor 174 is continuously driven in the forward direction even if the slit 140g-6 of the loading arm 140 is sensed by the sensor 145. The cam gear 177 is rotated counterclockwise around the shaft 176, and the pin 183a is moved from the position "4" to the position "5" in the cam groove 177a. The link arm 183 remains at the original position until the pin 183a reaches the position "5". The pin 183b stays at the position "IV" in the stepped guide groove 105d. The movement of the slide member 105 in the longitudinal direction "Y2" is inhibited. The rotation of the pinion 173 around the shaft 170 is inhibited.

When the cam gear 177 is rotated counterclockwise around the shaft 176, the gear 179 is rotated by the rotation of the cam gear 177. The loading arm 140 is rotated in the rotating direction "L1" by the rotation of the gear 179, and the slit 140g-4 of the loading arm 140 is sensed by the sensor 145. As described above, the disk 11 is held by the roller 61A and the roller 62A of the disk transporting unit 34A.

The pin 183a is moved along the second radial groove 177a-4 from the position "5" to the position "6". The pin 183b at this time is moved from the position "IV" to the position "V". The disk loading unit 110 is at the position of FIGS. 36A and 36B. The rotation of the cam gear 177 around the shaft 136 is inhibited. The movement of the slide member 105 is allowed. The gear 181b is rotated around the circumference of the gear 172 while the gear 181b is rotated around the shaft 180b. The rotation of the pinion 173 is started, and the movement of the slide member 105 in the longitudinal direction "Y2" is again started. The slide member 105 is moved in the longitudinal direction "Y2" to a position "V3" (indicated in FIG. 36C) until the pin 183b is moved to the position "VI". When the pin 183b is fitted to the fourth step 105d-6, the movement of the slide member 105 is inhibited.

At this time, the pin 104 is moved along the guide groove 105c, and the disk drive member 101 of the playback unit 32A is rotated in the rotating direction "J". The turntable 37A is downwardly moved in the vertical direction "Z2". The disk 11 on the turntable 37A is released from the clamper 38A. The turntable 37A is moved up and down while the loading motor 174 is driven in the forward direction. During the movement of the turntable 37A, the loading motor 174 is not driven in the backward direction.

As shown in FIGS. 36C and 36D, when the pin 183b is moved to the position "VI", the rotation of the link arm 183 around the shaft 182 clockwise is allowed. The pin 183a is moved along the cam groove 177a, and the link arm 183 is rotated clockwise around the shaft 182. The pin 183a at this time is moved to the position "7", and the pin 183b at this time is moved to the position "VII". The rotation of the cam gear 177 around the shaft 176 counterclockwise is again allowed. The movement of the slide member is inhibited.

The cam gear 177 is rotated counterclockwise around the shaft 176 to a position shown in FIGS. 36E and 36F. The gear 179 is rotated by the rotation of the cam gear 177, and the loading arm 140 is further rotated in the rotating direction "L1". As described above, the disk 11 is transported in the longitudinal direction "Y2" from the playback unit 32A to the disk holder unit 33A by the disk transporting unit 34A. The slit 140g-1 of the loading arm 140 is sensed by the sensor 145, and the rotation of the loading motor 174 is stopped. After this, the loading motor 174 is driven in the backward direction. When the slit 140g-2 of the loading arm 140 is sensed by the sensor 145, the rotation of the loading motor 174 in the backward direction is stepped. The pin 183a at this time is located at an intermediate position between the position "7" and the position "8".

When the disk 11 is inserted into the disk drive 30A at the above-mentioned position, the loading motor 174 is driven in the backward direction, and the cam gear 177 and the slide member 105 are moved in the backward directions in the opposite order. The disk loading unit 110 is moved to the position shown in FIGS. 35A and 35B.

Figure 39:
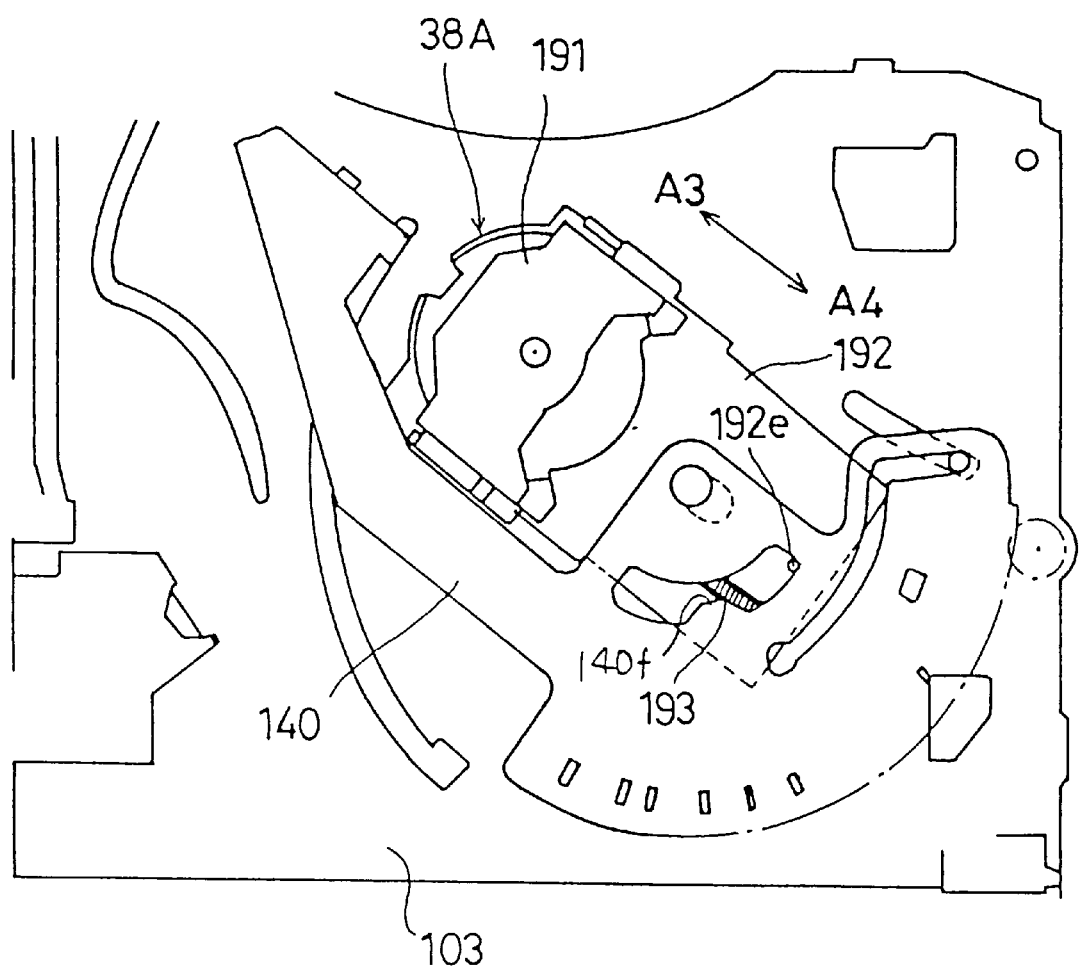
FIG. 39 is a diagram showing the disk clamping unit in the disk drive.

FIGS. 38 and 39 show a disk clamping unit 190 in the disk drive 30A. As shown, the disk clamping unit 190 includes a clamper holder moving unit 107 and a turntable moving unit 114. The clamper holder moving unit 107 moves up and down a clamper holder 191. The turntable moving unit 114 moves up and down the turntable 37A.

The disk clamping unit 190 in the present embodiment of the disk drive 30 is intended to effectively prevent the deformation of the disk 11 when the disk 11 above the turntable 37A is clamped by the clamper 38A or released from the clamper 38A.

As shown in FIG. 38, the turntable moving unit 114 includes the guide groove 105c of the slide member 105 and the pin 104 of the disk drive member 101. The turntable moving unit 114 moves up and down the turntable 37A by the connection of the pin 104 and the guide groove 105c.

As shown in FIG. 38, the clamper holder moving unit 107 includes the clamper 38A, the clamper holder 191, and a clamper slider 192. The clamper 38A has a lug 38Aa at the center of the clamper 38A, a flange 38Ab extending from the top of the lug 38Aa, and an annular groove 38Ac around the periphery of the lug 38Aa. The annular groove 38Ac is provided below the flange 38Ab.

The clamper holder 191 has a center hole 191a at the center of the clamper holder 191, a pair of pins 191b and 191c on one side of the clamper holder 191, and a pin 191d on the other side of the clamper holder 191. The clamper 38A is supported on the clamper holder 191 such that the annular groove 38Ac is fitted to the periphery of the center hole 191a.

FIGS. 40A through 40D show a disk clamping operation of the disk clamping unit 190.

Figures 40A, 40B, 40C, 40D:
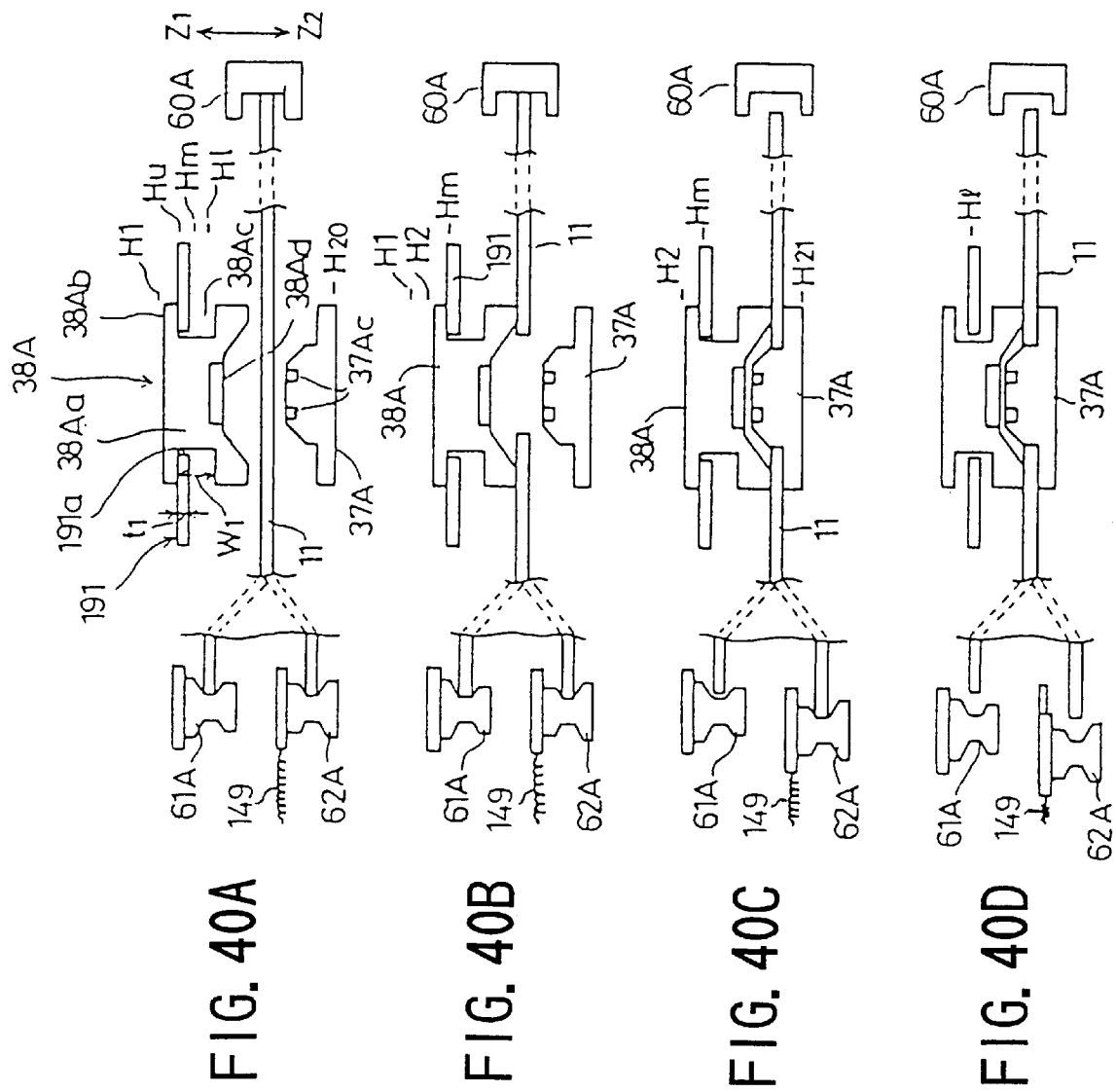
FIGS. 40A through 40D are diagrams for explaining an operation of the disk clamping unit.

As shown in FIG. 40A, a vertical width "W1" of the annular groove 38Ab of the clamper 38A is greater than a thickness "t1" of the clamper holder 191. The clamper 38A is vertically movable relative to the clamper holder 191 in the axial direction of the clamper 38A.

As shown in FIG. 38, the chassis 103 has a pair of guide grooves 103d and 103e in an upward projecting wall on one side of the periphery of the center hole 103a, and a guide groove 103f in an upward projecting wall on the other side of the periphery of the center hole 103a. The pins 191b, 191c and 191d of the clamper holder 191 are fitted into the guide grooves 103d, 103e and 103f of the chassis 103 such that the clamper holder 191 is movable in the vertical direction "Z1" or "Z2". The clamper 38A downwardly projects from the bottom surface of the chassis 103 through the center hole 103a.

As shown in FIG. 38, the clamper slider 192 has a two-arm portion 192a at one end of the clamper slider 192. One of the two-arm portion 192a is enlarged in length and has a pair of slanted cam grooves 192b and 192c, and the other of the two-arm portion 192a has a slanted cam groove 192d. The clamper slider 192 has a rectangular portion at the other end of the clamper slider 192. The pin 192e in the middle of the rectangular portion of the clamper slider 192 is formed. The pins 191b, 191c and 191d of the clamper holder 191 are fitted into the slanted guide grooves 192b, 192c and 192d of the clamper slider 192 such that the clamper slider 192 is movable on the chassis 103 in a slanted horizontal direction indicated by the arrow "A3" or "A4" in FIG. 38. The pin 192e of the clamper slider 192 is connected to the tooth-shaped cam 140f of the loading arm 140.

As shown in FIG. 38, the clamper slider 192 includes a helical tension spring 193 which exerts a biasing force on the clamper slider 192 such that the clamper slider 192 on the chassis 103 is pulled in the direction "A4" by the biasing force of the spring 193. As shown in FIG. 39, the clamper 38A, the clamper holder 191, the clamper slider 192 and the loading arm 140 are arranged on the chassis 103.

In the above-described disk clamping unit 190, the clamper slider 192 is set at one of three positions in the slanted horizontal direction "A3" or "A4" by the connection of the pin 192e and the tooth-shaped cam 140f of the loading arm 140. As shown in FIGS. 40A through 40D, the clamper holder 191 is set at one of an upper position "Hu", a middle position "Hm" and a lower position "Hl" according to the position at which the clamper slider 192 is set by the connection of the pin 192e and the cam 140f.

When the clamper holder 191 is set at the upper position "Hu", the flange 38Ab of the clamper 38A is supported on the clamper holder 191, and the clamper 38A is set at a position "H1" shown in FIG. 40A. The clamper 38A when it is set at the position "H1" is separated from the disk 11 and does not inhibit the transporting of the disk 11 in the transporting passage between the playback unit 32A and the disk holder unit 33A.

When the clamper holder 191 is set at the middle position "Hm", the clamper 38A is set at a position "H2" shown in FIG. 40B. The clamper 38A when it is set at the position "H2" is placed in contact with the disk 11.

When the clamper holder 191 is set at the lower position "Hl", the clamper 38A is maintained at the position "H2" and the flange 38Ab of the clamper 38A is separated from the clamper holder 191 as shown in FIG. 40D. The clamper holder 191 when it is set at the lower position "H1" is lower than the top surface of the clamper 38A at the position "H2".

FIG. 18 shows movements of the elements of the disk drive 30A. In FIG. 18, (G) indicates a movement of the clamper holder 191, and (I) indicates a movement of the turntable 37A.

A disk clamping operation of the disk clamping unit 190 will be described in the following.

When the disk transporting unit 34A is at the starting position of FIGS. 19 and 20, the clamper slider 192 is set at its right-end position and the clamper holder 191 is set at the position "Hu" as shown in FIG. 40A. The clamper 38A is supported at the position "H1" by the clamper holder 192. The turntable 37A is set at a lower position "H20" which does not inhibit the transporting of the disk 11 in the transporting passage between the playback unit 32A and the disk holder unit 33A.

The loading motor 174 is driven in the forward direction, and the loading arm 140 is rotated counterclockwise around the shaft 144. The disk 11 is moved to the playback position as shown in FIG. 40B. The pin 192e of the clamper slider 192 is moved along the cam 140f of the loading arm 140. The clamper slider 192 is moved in the direction "A3" to its middle position against the biasing force of the spring 193. The pin 191b of the clamper holder 191 is moved along the slanted guide groove 192b of the clamper slider 192. The clamper holder 191 is moved to the middle position "Hm", and the clamper 38A is moved to the position "H2".

As shown in FIG. 40C, the turntable moving unit 114 vertically moves the turntable 37A to an upper position "H21" at which the disk 11 is supported on the turntable 37A. As shown in FIG. 40A, the turntable 37A has magnets 37Ac included therein, and the clamper 38A has an iron plate 38Ad arranged on the bottom surface of the clamper 38A. When the turntable 37A is at the upper position "H21", the clamper 38A is attracted to the turntable 37A by an attracting force between the magnets 37Ac and the iron plate 38Ad so that the disk 11 on the turntable 37A is clamped by the clamper 38A.

After this, the loading arm 140 is further rotated counterclockwise around the shaft 144, and the pin 192e is moved along the cam 140f so that the clamper slider 192 is moved in the direction "A3" to its left-end position and the pins 191b, 191c and 191d are moved along the slanted guide grooves 192b, 192c and 192d. As shown in FIG. 40D, the clamper holder 191 is vertically moved to the position "H1", and the clamper 38A is separated from the clamper holder 191.

Accordingly, in the above-described embodiment of the disk drive 30A, the turntable moving unit 114 and the clamper holder moving unit 107 are configured such that, when the disk 11 above the turntable 37A is clamped by the clamper 38A, the clamper holder moving unit 107 first moves the clamper holder 191 from the position "Hu" to the position "Hm" to move the clamper 38A toward the turntable 37A, the turntable moving unit 114 vertically moves the turntable 37A from the non-contact position "H20" to the supporting position "H21" after the clamper 38A is moved toward the turntable 37A, and the clamper holder moving unit 107 finally moves the clamper holder 191 from the position "Hm" to the position "H1" so that the disk 11 on the turntable 37A is clamped by the clamper 38A by using the attracting force between the magnets 37Ac and the iron plate 38Ad.

Figure 41A:
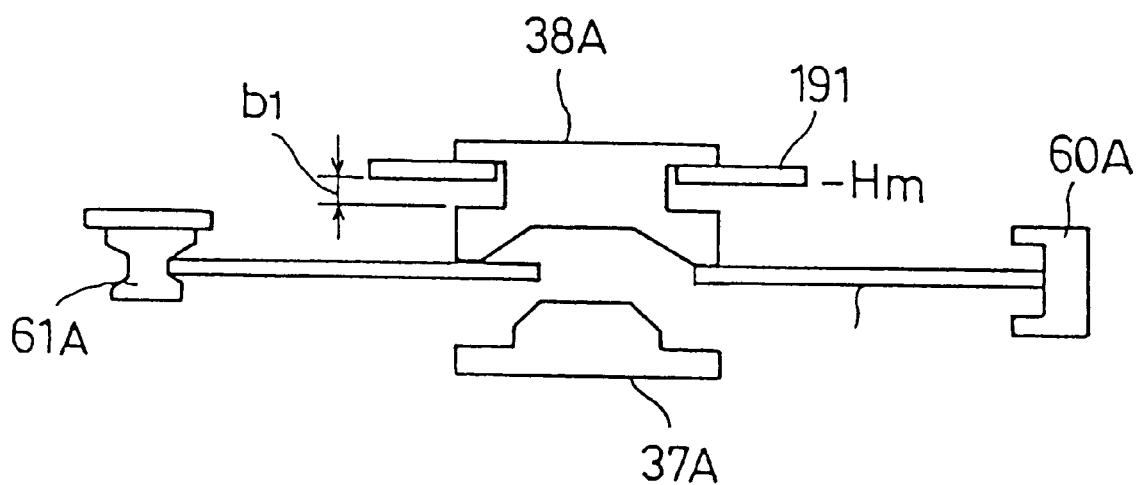
FIGS. 41A and 41B are diagrams for explaining an operation of the disk clamping unit when the disk is not correctly clamped by the clamper.
Figure 41B:
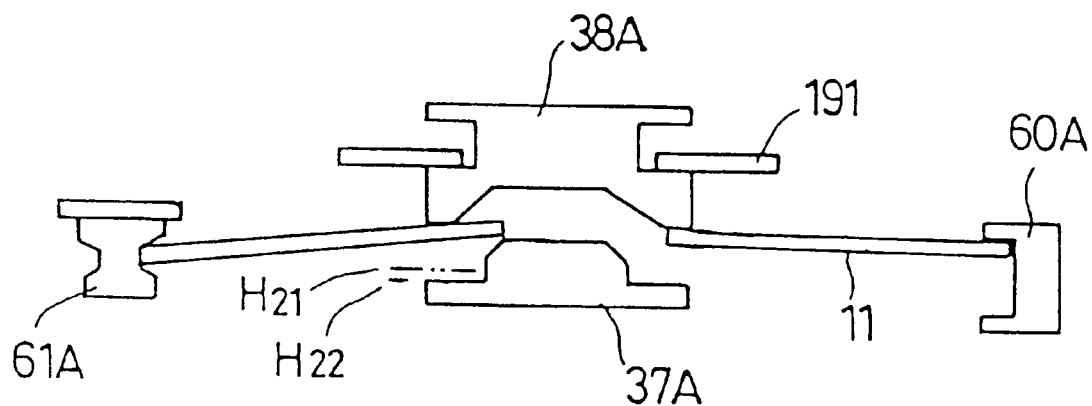

FIGS. 41A and 41B show a disk clamping operation of the disk clamping unit 190 when the position of the disk 11 deviates from the playback position and is not correctly clamped by the clamper 38A.

As shown in FIG. 41A, before the turntable 37A is vertically moved from the non-contact position "H20" to the supporting position "H2", the clamper holder 191 is moved from the position "Hu" to the position "Hm". The clamper 38A when the clamper holder 191 is at the position "Hm" is vertically movable relative to the disk 11 by a difference "b1" between the width "W1" and the thickness "t1".

As shown in FIG. 41B, when the position of the disk 11 deviates from the playback position and the turntable 37A is vertically moved toward the supporting position "H21", the movement of the turntable 37A is restricted and the turntable 37A is stopped at a position "H22" since the turntable 37A is connected to the disk 11. The position "H22" is slightly lower than the position "H21". Accordingly, in the above-described embodiment of the disk drive 30A, it is possible to effectively prevent the deformation of the disk 11 when the position of the disk 11 deviates from the playback position and the disk 11 above the turntable 37A is clamped by the clamper 38A.

FIGS. 42A through 42F show a disk releasing operation of the disk clamping unit 190 when the disk 11 on the turntable 37A at the playback position is released from the clamper 38A.

When the loading motor 174 is driven in the backward direction and the loading arm 140 is rotated clockwise around the shaft 144, the disk clamping unit 190 is at a position of FIG. 42A. The pin 192e is moved along the tooth-shaped cam 140f, and the clamper slider 192 is moved in the direction "A3" to the middle position. The pins 191b, 191c and 191d are moved along the slanted guide grooves 192b, 192c and 192d, and the clamper holder 191 is moved from the position "H1" to the position "Hm". The flange 38A of the clamper 38A is supported on the clamper holder 191 at the position "Hm".

As shown in FIG. 42B, the circumference of the disk 11 is held by the disk transporting unit 34A. The turntable moving unit 114 vertical moves the turntable 37A from the supporting position "H21" to the non-contact position "H20". The turntable 37A is separated from the clamper 38A, and the disk 11 on the turntable 37A is released from the clamper 38A.

Before the turntable 37A is vertically moved to the non-contact position "H20", the clamper holder 191 is moved from the position "Hl" to the position "Hm" by the clamper holder moving unit 107. The flange 38Ab of the clamper 38A is already supported on the clamper holder 191, and the downward movement of the clamper 38A when the turntable 37A is vertically moved to the non-contact position "H20" is prevented. Therefore, the disk clamping unit 190 effectively prevents the deformation of the disk 11 when the disk 11 on the turntable 37A at the playback position is released from the clamper 38A.

After this, the loading arm 140 is further rotated clockwise around the shaft 144, and the disk clamping unit 190 is at a position of FIG. 42C. The pin 192e is not connected to the tooth-shaped cam 140f, and the clamper slider 192 is moved in the direction "A4" from the middle position to the right-end position. The pins 191b, 191c and 191d are moved along the slanted guide grooves 192b, 192c and 192d, and the clamper holder 191 is moved from the position "Hm" to the position "Hu". The flange 38A of the clamper 38A is raised by the clamper holder 191 at the position "Hu", and the clamper 38A is separated from the disk 11.

Accordingly, in the above-described embodiment of the disk drive 30A, the turntable moving unit 114 and the clamper holder moving unit 107 are configured such that, when the disk 11 on the turntable 37A at the playback position is released from the clamper 38A, the clamper holder moving unit 107 moves the clamper holder 191 from the position "Hl" to the position "Hm", the turntable moving unit 114 vertically moves the turntable 37A from the supporting position "H21" to the non-contact position "H20" after the clamper 38A is moved to the position "Hm", and the clamper holder moving unit 107 finally moves the clamper holder 191 from the position "Hm" to the position "Hu" so that the disk 11 on the turntable 37A at the playback position is released from the clamper 38A.

Figure 43:
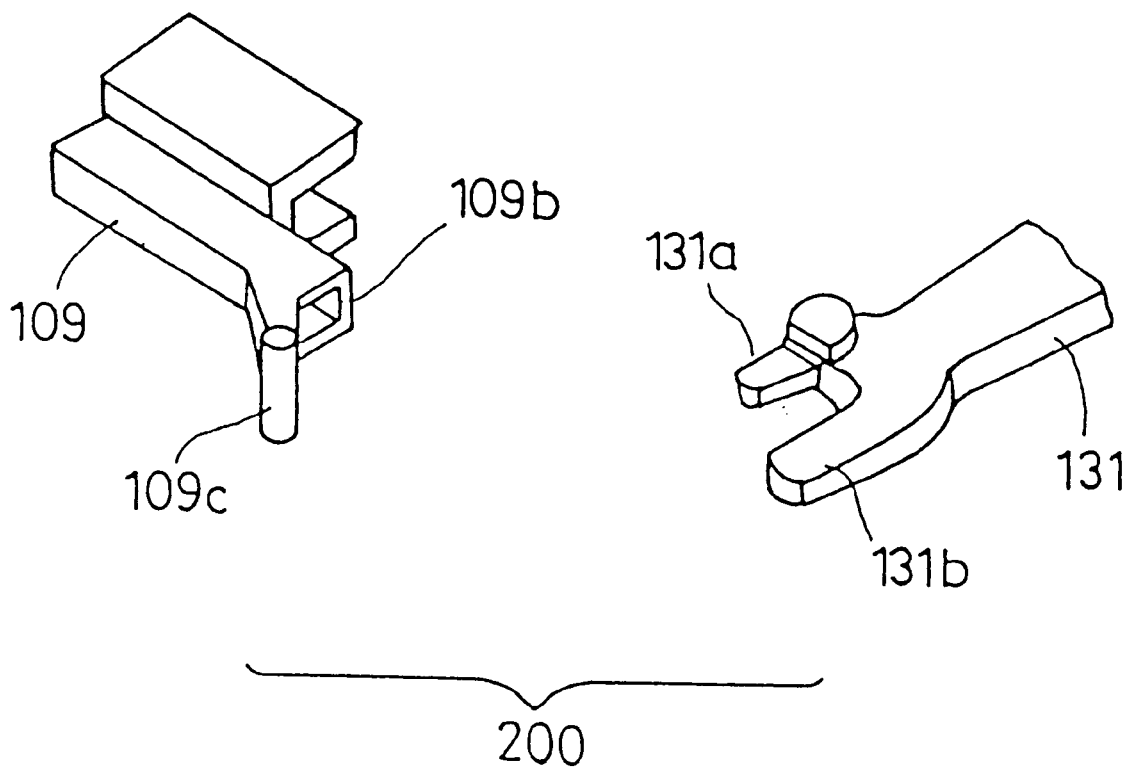
FIG. 43 is a diagram showing a connecting unit in the disk drive.
Figure 44A:
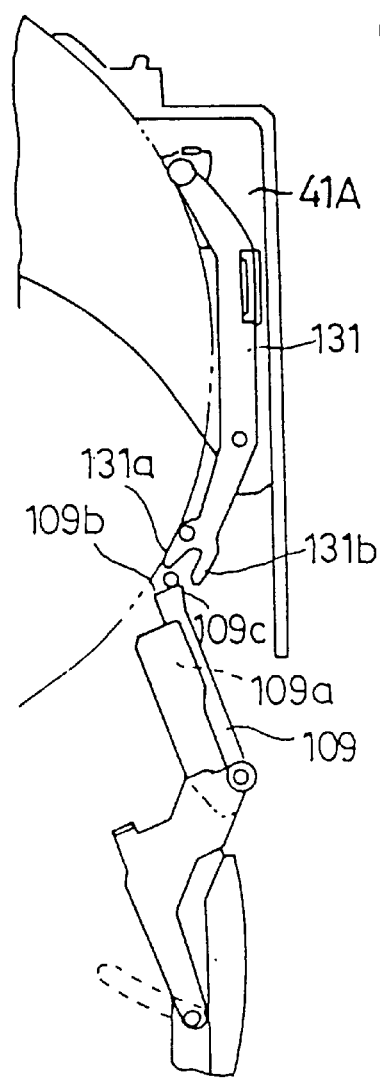
FIGS. 44A through 44C are diagrams for explaining an operation of the connecting unit of FIG. 43.
Figure 44B:
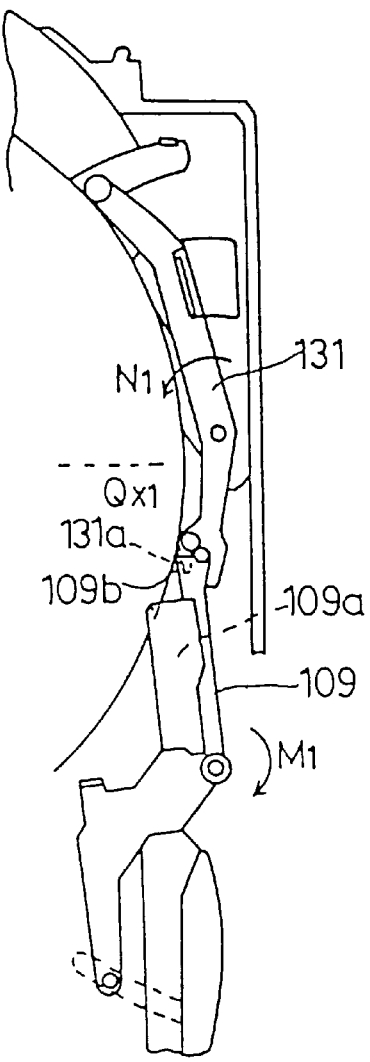
Figure 44C:
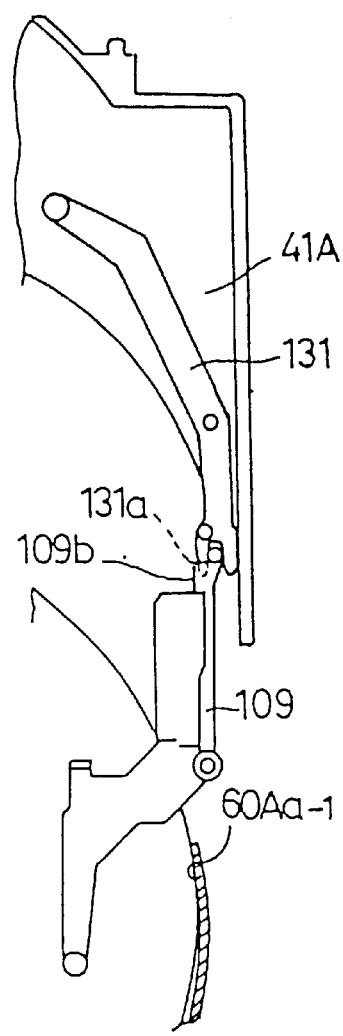

FIG. 43 shows a connecting unit 200 in the disk drive 30A. FIGS. 44A through 44C show an operation of the connecting unit 200 of FIG. 43.

When the disk transporting unit 34A is operated, the connecting unit 200 mechanically locks the connection of the playback unit 32A and the disk holder unit 33A and inhibits the operation of the rotating unit 35A. In other words, the connecting unit 200 inhibits the movement of the playback unit 32A and the disk holder unit 33A by the rotating unit 35A.

As shown in FIG. 43, the connecting unit 34A includes a recessed portion 109b at the rear end of the ejection lever 109 and the retaining claw 131a of the disk handling arm 131. The recessed portion 109b and the retaining claw 131a are configured such that the retaining claw 131a is fitted into the recessed portion 109b when the ejection lever 109 and the disk handling arm 131 are connected to each other.

When the disk transporting unit 34A is at the starting position of FIGS. 19 and 20, the ejection lever 109 is at a position shown in FIG. 44A. As shown in FIG. 44, the ejection lever 109 is separated from the disk handling arm 131. The playback unit 32A and the disk holder unit 33A are rotatable by the rotating unit 35A.

The rotating unit 35A rotates both the playback unit 32A and the disk holder unit 33A, and the transporting passage 48A of the playback unit 32A and the specified disk holding portion of the disk holder unit 33A are placed in line with each other. After this, the operation of the disk transporting unit 34A is started. The ejection lever 109 is rotated in the rotating direction "M1". The pin 109c of the ejection lever 109 pushes the locking claw 131b of the disk handling arm 131. The disk handling arm 131 is rotated in the rotating direction "N1".

As shown in FIG. 44B, when the rotation of the ejection lever 109 in the rotating direction "M1" is started, the ejection lever 109 and the disk handling arm 131 are connected to each other, and the retaining claw 131a is fitted into the recessed portion 109b. When the ejection lever 100 and the disk handling arm 131 are finally rotated to a position shown in FIG. 44C, the retaining claw 131a is completely fitted into the recessed portion 109b. The connection of the ejection lever 109 and the disk handling arm 131 is mechanically locked by the connecting unit 200.

Accordingly, the connection of the playback unit 32A and the disk holder unit 33A is mechanically locked by the connecting unit 200. In other words, the connecting unit 200 inhibits the movement of the playback unit 32A and the disk holder unit 33A by the rotating unit 35A. In the disk drive 30A of the present embodiment, when the disk transporting unit 34A is being operated, a signal which starts the operation of the rotating unit 35A is not supplied from the control unit 230. Even when the operation of the rotating unit 35A is started due to noise, the playback unit 32A and the disk holder unit 33A are not rotated by the rotating unit 35A.

The connecting unit 200 in the above-described embodiment may be modified. For example, the ejection lever and the separating plate 130 of the disk holder unit 33A are configured such that a portion of the separating plate 130 can be fitted into another portion at the rear end of the ejection lever 109.

Figure 45:
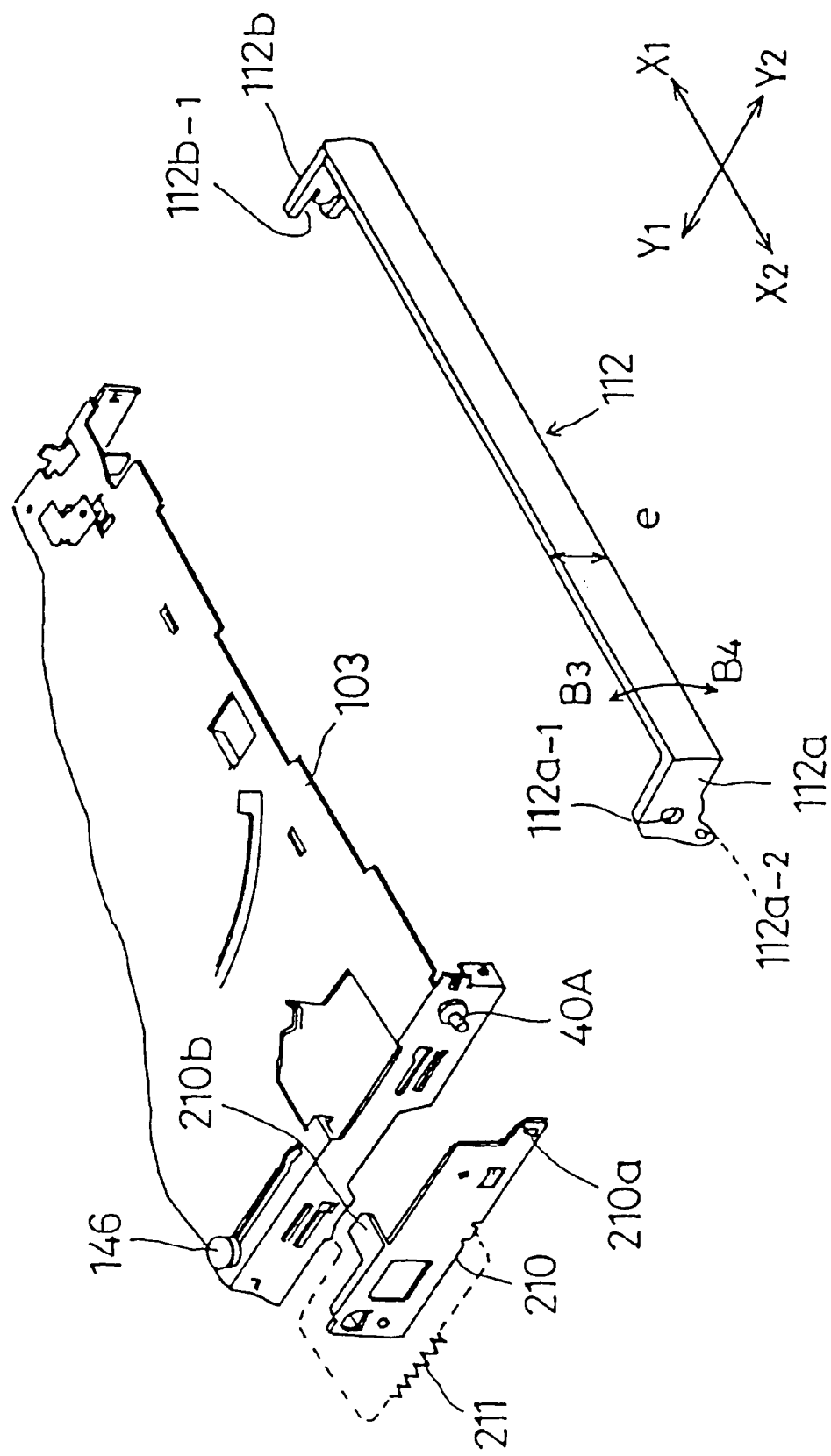
FIG. 45 is a diagram showing a flap and a flap opening unit in the disk drive.
Figure 46B:
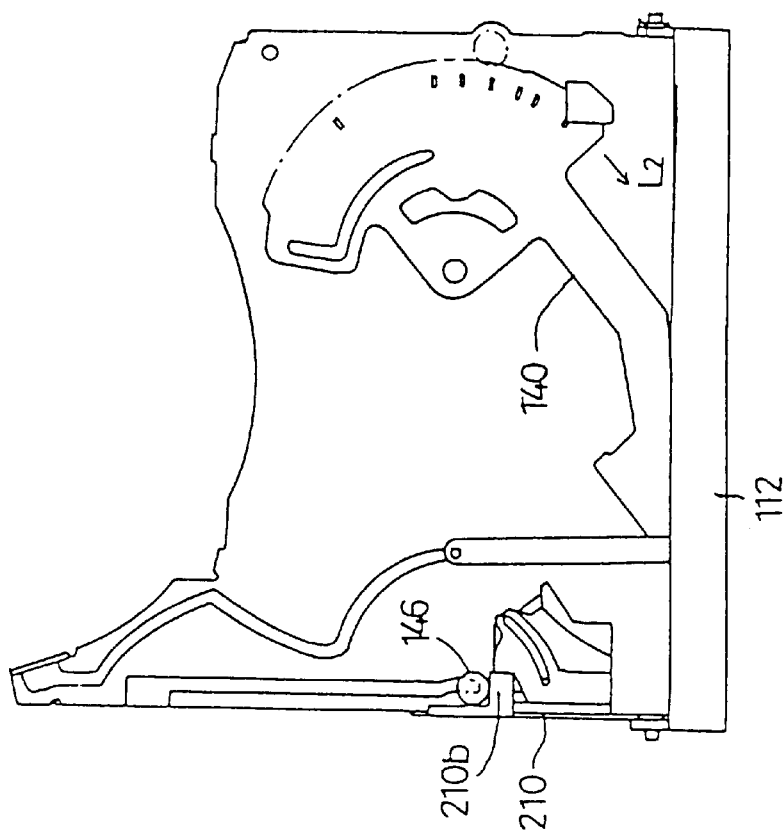
FIGS. 46A and 46B are diagrams for explaining an operation of the flap opening unit of FIG. 45.
Figure 46A:
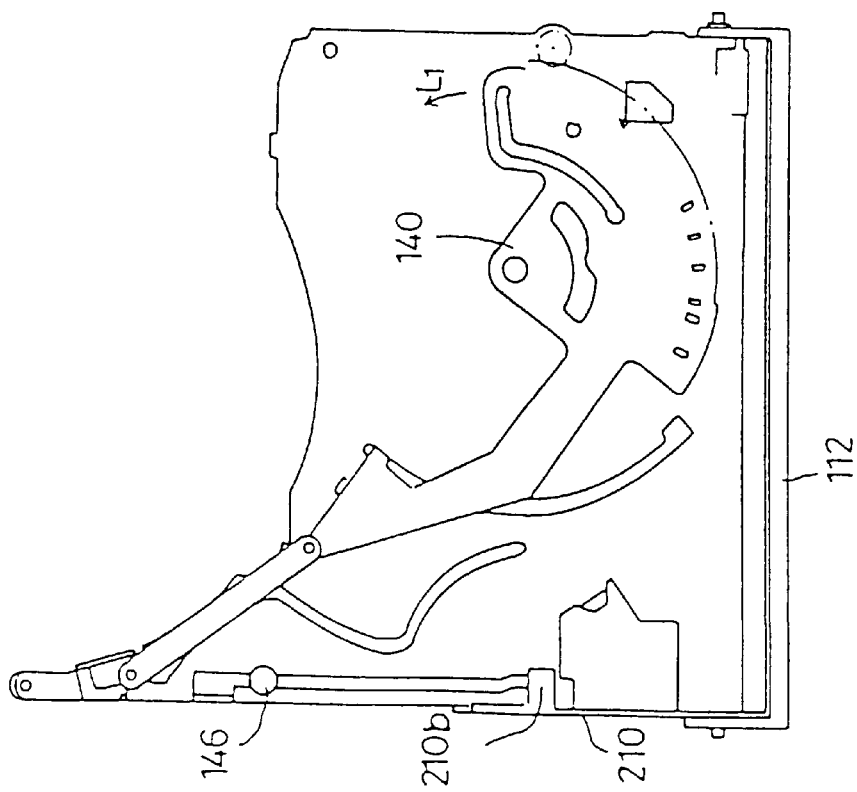
Figure 47A:
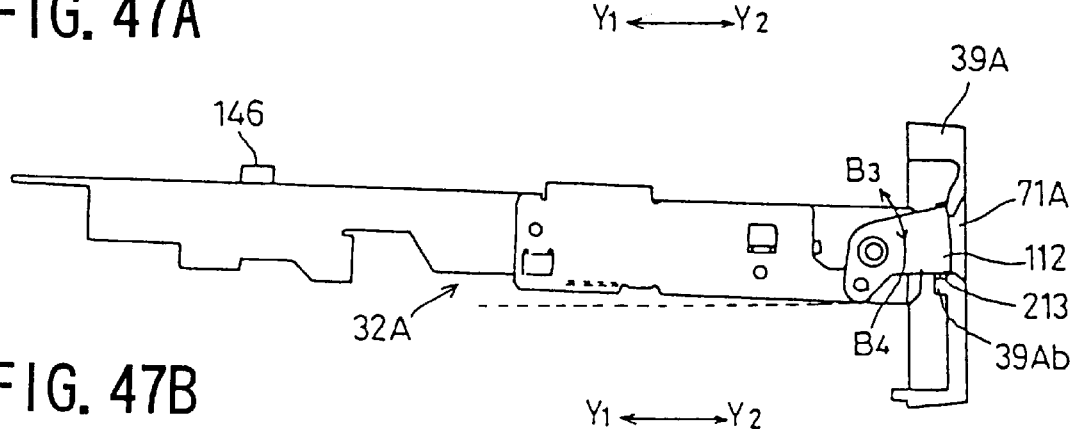
FIGS. 47A through 47C are diagrams for explaining an operation of the flap opening unit of FIG. 45.
Figure 47B:
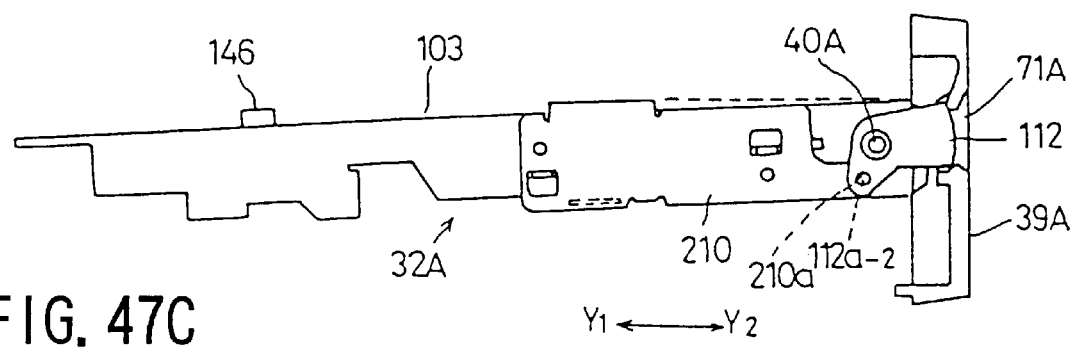
Figure 47C:
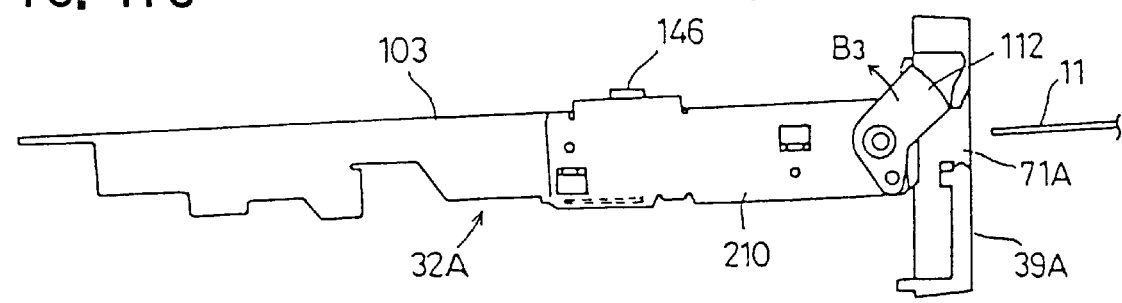

FIG. 45 shows a flap 112 and a flap opening unit 113 in the disk drive 30A. FIGS. 46A and 46B show an operation of the flap opening unit of FIG. 45. FIGS. 47A through 47C show an operation of the flap opening unit of FIG. 45.

As shown in FIGS. 45 and 46A, the flap 112 includes an arm portion 112a at a left end of the flap 112 and an arm portion 112b at a right end of the flap 112. The arm portion 112a has a hole 112a-1 which is fitted to one of the pins 40A of the chassis 103 of the disk loading member 100. The arm portion 112a has a pin 112a-2 which is formed at the end of the arm portion 112a. The arm portion 112b has a two-arm portion 112b-1 which is fitted to the other of the pins 40A of the chassis 103. The flap 112 is rotatable around the axial direction of the pins 40A of the chassis 103 in a rotating direction indicated by the arrow "B3" or "B4" in FIG. 45.

As shown in FIGS. 45 and 46A, a slider 210 is attached to the left-end side of the chassis 103. The slider 210 is movable on the chassis 103 in the longitudinal direction "Y1" or "Y2". The slider 210 has a hole 210a at the front end of the slider 210, and the pin 112a-2 of the flap 112 is fitted to the hole 210a of the slider 210. The flap 112 and the slider 210 are connected to each other by the connection of the pin 112a-2 and the hole 210a.

Further, as shown in FIG. 45, a spring 211 is attached to the slider 210. The spring 211 is connected at one end to the slider 210 and connected at the other end to the chassis 103. The slider 210 is pulled in the longitudinal direction "Y1" by the spring 211, and the flap 112 is rotated in the rotating direction "B4" by the slider 210. The flap 112 in this condition closes the insertion opening 71A of the front bezel 39A as shown in FIGS. 46A and 47A.

Further, as shown in FIGS. 45 and 46A, the slider 210 includes a laterally extending lug 210b. The lug 210b of the slider 210 is arranged above the chassis 103. The pin 146 which is fitted to connect the first disk arm 142 and the second disk arm 143 can be connected to the lug 210b of the slider 210.

When the disk 11 is ejected out of the disk drive 30A by the disk transporting unit 34A, the pin 146 is moved in the longitudinal direction "Y2" to push the lug 210b forward. The slider 210 is moved in the longitudinal direction "Y2" against the biasing force of the spring 211 by the movement of the pin 146. The flap 112 is rotated in the rotating direction "B3" by the movement of the slider 210. The flap 112 in this condition opens the insertion opening 71A of the front bezel 39A as shown in FIGS. 46B and 47C. After the insertion opening 71A is opened by the flap 112, the disk 11 immediately projects out of the disk drive 30A from the insertion opening 71A.

A sponge 213 is attached to a receiving portion 39Ab on the rear side of the insertion opening 71A of the front bezel 39A. When the insertion opening 71A of the front bezel 39A is closed by the flap 112, as shown in FIGS. 47A and 47B, the flap 112 is brought into contact with the sponge 213.

When the rotating unit 35A rotates the playback unit 32A around the pins 40A, the slider 210 is slightly inclined according to the rotation of the rotating unit 35A. However, the contact between the flap 112 and the sponge 213 is maintained even when the slider 210 is slightly inclined. The movement or vibration of the playback unit 32A when the playback unit 32A is rotated by the rotating unit 35A is reduced by the contact between the flap 112 and the sponge 213.

Further, when the insertion opening 71A of the front bezel 39A is closed by the flap 112, the contact between the flap 112 and the sponge 213 is maintained, and there is no clearance between the flap 112 and the receiving portion 39Ab on the rear side of the insertion opening 71A of the front bezel 39A. Therefore, this provides a dust resistant characteristic for the disk drive 30A.

Further, the flap 112 is arranged on the rear side of the insertion opening 71A of the front bezel 39A. When the insertion opening 71A of the front bezel 39A is opened by the flap 112, the flap 112 does not become an obstacle to the operator, and the operator can easily pull out the disk 11 from the insertion opening 71A of the front bezel 71A.

Figure 48:
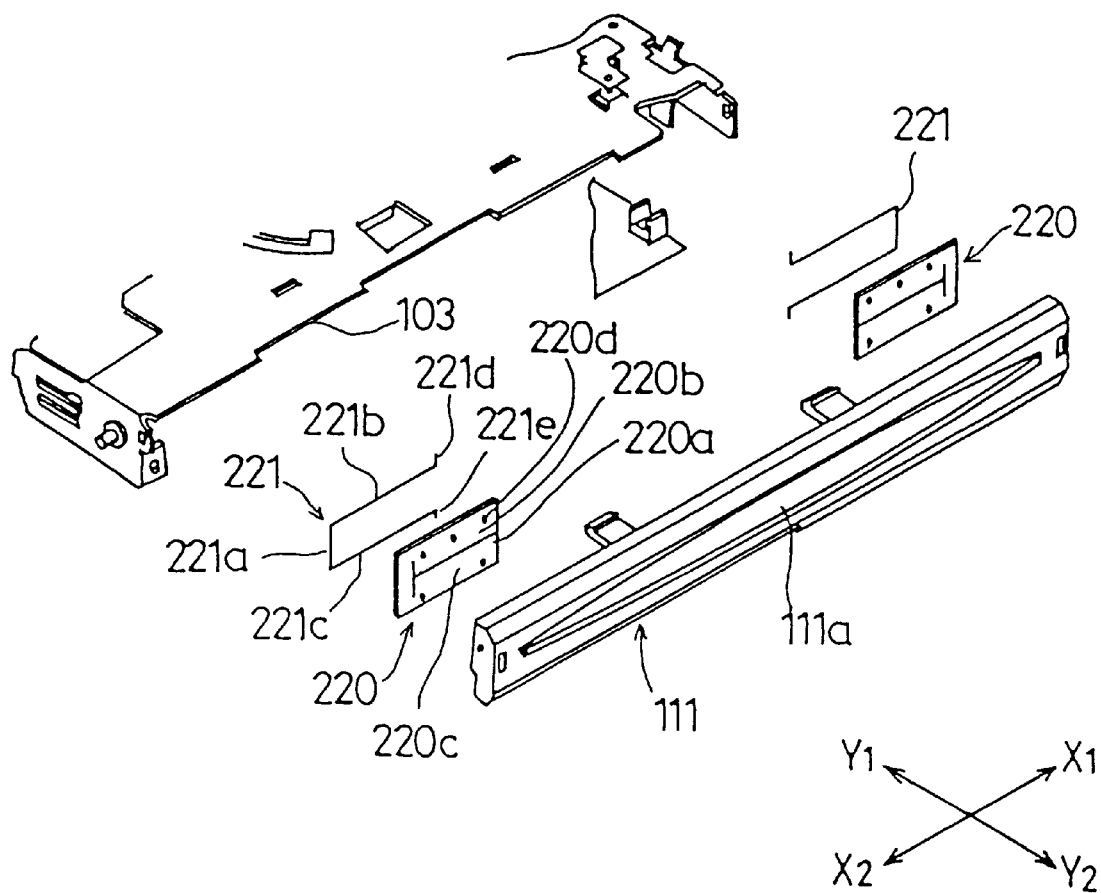
FIG. 48 is an exploded view of the elements of the disk drive around an insertion opening plate.
Figure 49A:
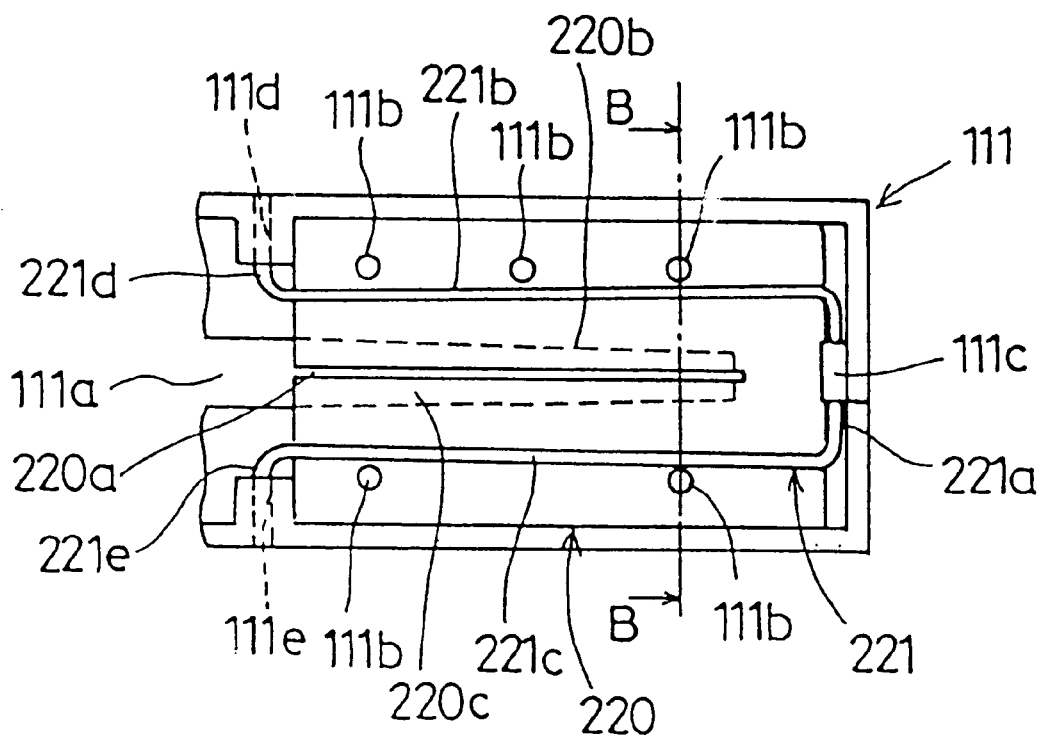
FIGS. 49A and 49B are diagrams showing the elements of the disk drive around disk supporting plates.
Figure 49B:
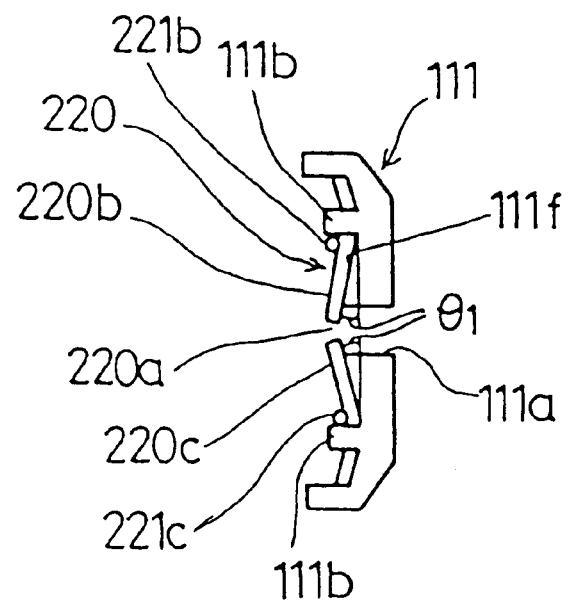

FIG. 48 shows the elements of the disk drive 30A around the insertion opening plate 111. FIGS. 49A and 49B show the elements of the disk drive 30A around disk supporting plates 220. In the present embodiment, the insertion opening plate 111 is made of a resin-molded material, and the disk supporting plates 220 are made of a felt material and formed into rectangular sheets.

As shown in FIGS. 48 through 49B, the disk supporting plates 220 are attached to left and right end portions on a rear surface 111f of the insertion opening plate 111. The insertion opening plate 111 is secured to the chassis 103.

Each of the disk supporting plates 220 has a T-shaped slit 220a formed therein. Each of the disk supporting plates 220 includes an upper wing portion 220b and a lower wing portion 220c which are separated by the T-shaped slit 220a. The wing portions 220b and 220c are resiliently deformable. Further, each of the disk supporting plates 220 includes a plurality of holes 220d. A plurality of projections 111b are formed on the rear surface 111f of the insertion opening plate 111. The holes 220d of the disk supporting plates 220 are fitted to the projections 111b of the insertion opening plate 111.

Further, as shown in FIGS. 48 and 49A, U-shaped attaching parts 221 are secured to the insertion opening plate 111 such that the disk supporting plates 220 are fitted to the insertion opening plate 111 by the attaching parts 221. Each of the attaching parts 221 has three arm portions 221a, 221b and 221c, and two hook portions 221d and 221e. The hook portion 221d is formed to extend upward by bending the end of the arm portion 221b, and the hook portion 221e is formed to extend downward by bending the end of the arm portion 221c.

As shown in FIGS. 49A and 49B, the insertion opening plate 111 has three retaining portions 111c, 111d and 111e which are formed at each of the left and right end portions on the rear surface 111f of the insertion opening plate 111. The attaching parts 221 are secured to the insertion opening plate 111 by connecting the hook portions 221d and 221e to the retaining portions 111d and 111e of the rear surface 111f and connecting the arm portions 221a to the retaining portions 111c of the rear surface 111f. The arm portions 221b and 221c of the attaching parts 221 are fitted onto the disk supporting plates 220 on the rear surface 111f of the insertion opening plate 111 inside the projections 111b. The disk supporting plates 220 are firmly attached to the insertion opening plate 111 by the attaching parts 221.

Figure 50A:
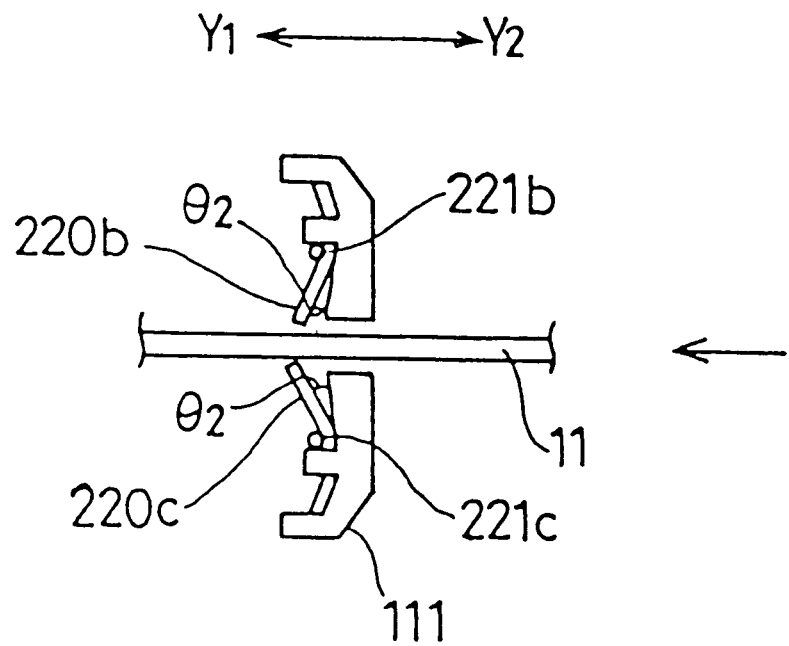
FIGS. 50A and 50B are diagrams for explaining an operation of the disk supporting plate.
Figure 50B:
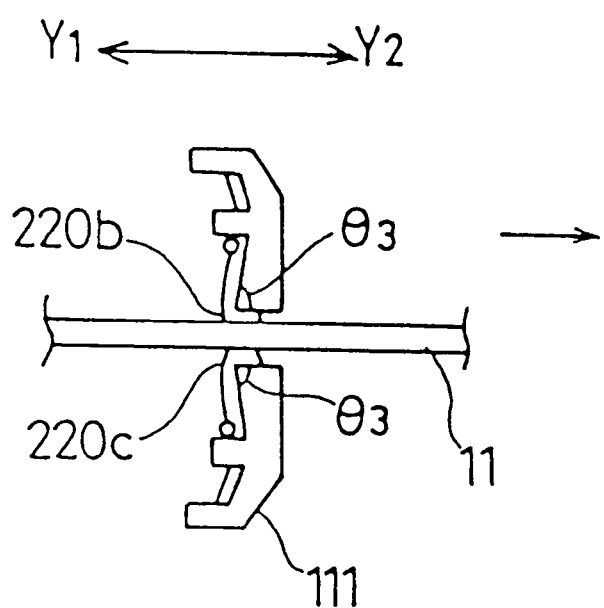

FIGS. 50A and 50B show an operation of the disk supporting plates 220.

When the disk 11 is inserted into the disk drive 30A, as shown in FIG. 50A, the wing portions 220b and 220c of the disk supporting plates 220 are inclined by the disk 11 at an angle of Θ2 to the vertical line. After the disk 11 passes through the insertion opening 71A, the wing portions 220b and 220c of the disk supporting plates 220 are returned to the original positions.

When the disk 11 is ejected out of the disk drive 30A, as shown in FIG. 50B, the wing portions 220b and 220c of the disk supporting plates 220 are curled back by the disk 11, and the curled portions have an angle of Θ3. After the disk 11 passes through the insertion opening 71A, the wing portions 220*b* and 220*c* of the disk supporting plates 220 are returned to the original positions.

As shown in FIG. 49B, when the disk supporting plates 220 are attached to the rear surface 111*f* of the insertion opening plate 111, the wing portions 220*b* and 220*c* are at an angle of Θ1 to the vertical line (Θ1<Θ2).

Therefore, the disk supporting plates 220 in the disk drive 30A of the present embodiment provide a good operability for the operator when the disk 11 is inserted into or pulled out from the disk drive 30A.

The material of the disk supporting plates 220 is not limited to the felt material. The material of the disk supporting plates 220 may be a rubber material or a sponge material. Further, the disk supporting plates 220 may be used to support another recording medium such as an intelligent card.

Next, a description of an operation of the disk drive 30A when the disk 11 is forcefully pulled out from the disk drive 30A by the operator after the disk 11 is inserted therein and the operation of the disk transporting unit 34A is started.

Figure 51:
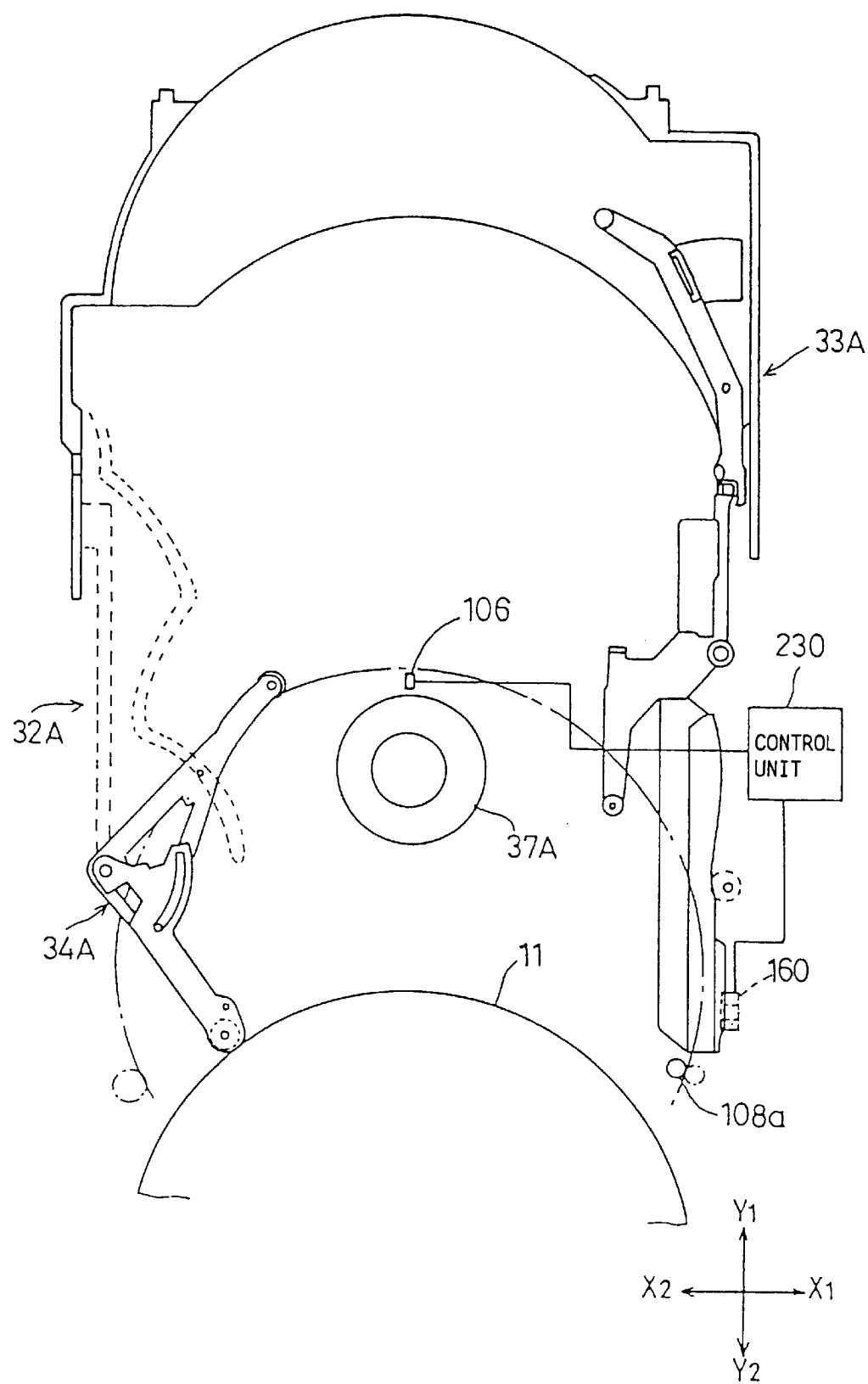
FIG. 51 is a diagram showing a position of the disk drive when the disk is inserted into the disk drive.
Figure 52A:
FIGS. 52A and 52B are diagrams for explaining operations of a disk detecting switch and a disk detecting sensor in the disk drive.
Figure 52B:

FIG. 51 shows a position of the disk drive 30A when the disk 11 is inserted into the disk drive 30A. FIGS. 52A and 52B show operations of a disk detecting switch 160 and the disk detecting sensor 106 in the disk drive 30A.

As shown in FIG. 51, the disk detecting switch 160 and the disk detecting sensor 106 are arranged in the disk drive 30A. The switch 160 and the sensor 106 are electrically connected to the control unit 230.

When approximately three fourths of the disk 11 are placed in the disk drive 30A, the disk detecting switch 160 is turned ON by the circumference of the inserted disk 11. When the entire disk 11 is placed in the disk drive 30A, the disk detecting sensor 106 is turned ON by the circumference 11*a* of the inserted disk 11. Shortly after the disk detecting sensor 106 is turned ON, the disk detecting switch 160 is turned OFF as shown in FIGS. 52A and 52B.

There may be a case in which the disk 11 is forcefully pulled out from the disk drive 30A by the operator after the switch 160 is turned ON and the sensor 106 is turned ON.

Taking the above case into account, in the disk drive 30A of the present embodiment, it is detected whether the switch 160 is in the OFF state and the sensor 106 is in the ON state at a given time after the switch 160 is turned ON and the sensor 106 is turned ON.

When it is detected that the switch 160 is in the OFF state and the sensor 106 is in the ON state, the control unit 230 determines that the disk drive 30A is in a normal operation, and the operation of the disk transporting unit 34A is continuously performed. Otherwise the control unit 230 determines that an error in the disk drive 30A occurs and the disk transporting unit 34A is returned to the starting position.

Figure 53:
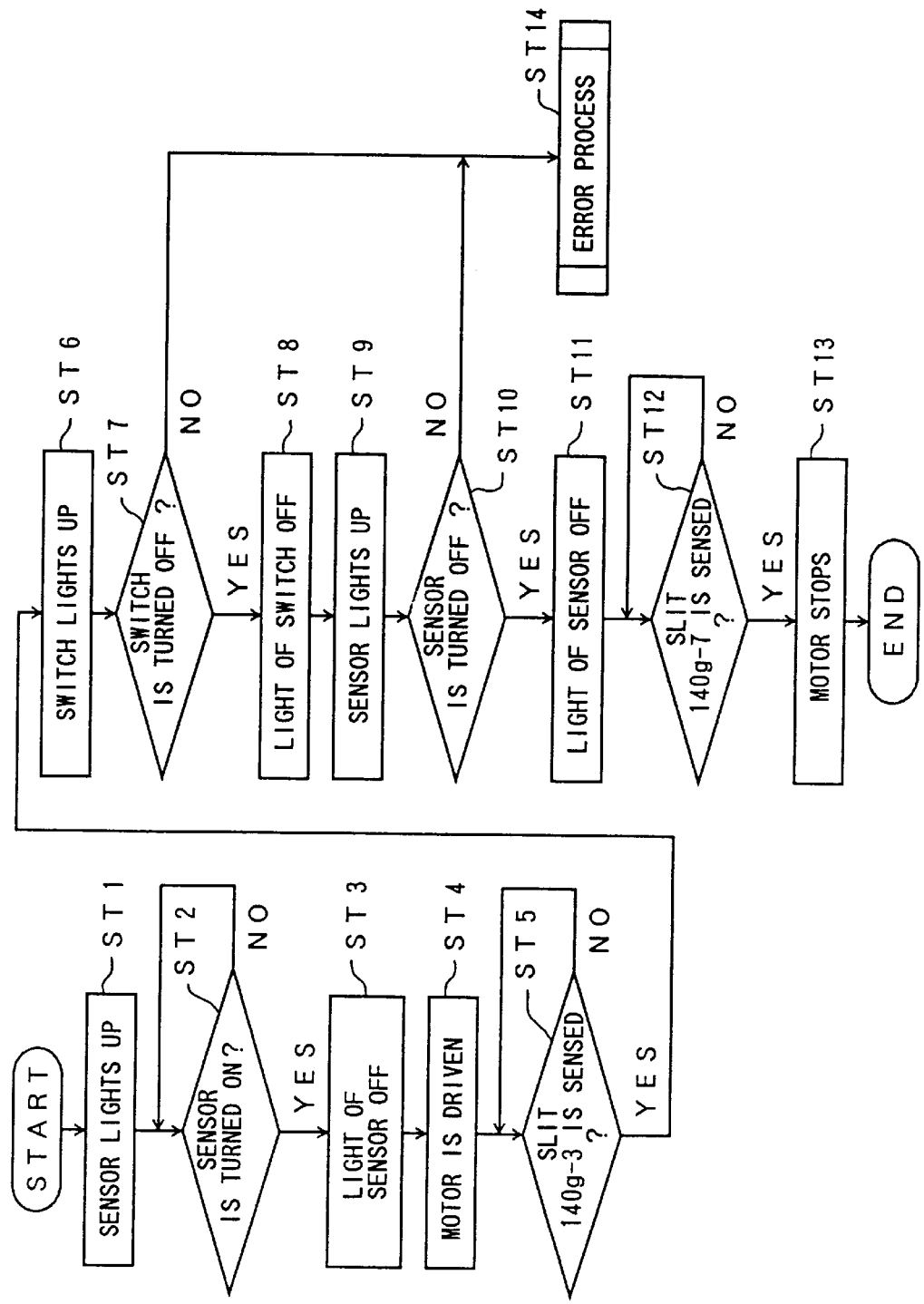
FIG. 53 is a flowchart for explaining a disk detecting operation of a control unit in the disk drive.

FIG. 53 shows a disk detecting operation of the control unit 230 in the disk drive 30A.

As shown in FIG. 53, the control unit 230 at step ST1 makes the disk detecting sensor 106 light up. Step ST2 detects whether the disk detecting sensor 106 is turned ON. When the result at step ST2 is negative (or the sensor 106 is OFF), the step ST2 is repeated.

When the result at step ST2 is affirmative (or the sensor 106 is ON), step ST3 is performed. Step ST3 turns OFF the light of the disk detecting sensor 106. Step ST4 drives the loading motor 174 in the backward direction to rotate the loading arm 140. Step ST5 detects whether the slit 140*g*-3 of the loading arm 140 is sensed by the sensor 145. When the result at step ST5 is negative (or the slit 140*g*-3 is not sensed), the step ST5 is repeated.

When the result at step ST5 is affirmative (or the slit 140*g*-3 is sensed), step ST6 is performed. Step ST6 makes the disk detecting switch 160 light up. Step ST7 detects whether the disk detecting switch 160 is in the OFF state.

When the result at step ST7 is affirmative (or the switch 160 is OFF), step ST8 is performed. Step ST8 turns OFF the light of the disk detecting switch 160. Step ST9 makes the disk detecting sensor 106 light up. Step ST10 detects whether the disk detecting sensor 106 is in the OFF state. When the result at step ST10 is affirmative (or the sensor 106 is OFF), step S11 is performed.

Step ST11 turns OFF the light of the disk detecting sensor 106. Step ST12 detects whether the slit 140*g*-7 of the loading arm 140 is sensed by the sensor 145. When the result at step ST12 is negative (the slit 140*g*-7 is not sensed), the step ST12 is repeated.

When the result at step ST12 is affirmative (the slit 140*g*-7 is sensed), step ST13 is performed. Step ST13 stops the rotation of the loading motor 174. After the step ST13 is performed, the disk detecting operation in FIG. 53 is finished.

On the other hand, when the result at step ST7 is negative (or the switch 160 is ON), step ST14 is performed. When the result at step ST10 is negative (or the sensor 106 is ON), step ST14 is performed. Step ST14 carries out an error procedure.

In the above-described disk detecting operation of the control unit 230, the detection of the slit 140*g*-3 by the sensor 145 is performed before the insertion opening 71A is closed by the flap 112. If the disk 11 is normally loaded in the disk drive 30A, the disk 11 cannot be pulled out from the disk drive 30A after the slit 140*g*-3 is sensed by the sensor 145. Therefore, the above-described disk detecting operation can effectively prevent the pulling out of the disk 11 from the disk drive 30A after the disk 11 is inserted therein and the operation of the disk transporting unit 34A is started.

Further, in the above-described disk detecting operation, the detection of the slit 140*g*-3 by the sensor 145 is performed before the insertion opening 71A is closed by the flap 112. It is possible to prevent the damage of the disk 11 by interference of the disk 11 and the flap 112 while the disk 11 is forcefully pulled out from the disk drive 30A.

It should be noted that the disk drive of the present invention is applicable to CD-ROM disk drive units, compact disk (CD) drive units, other magnetic disk (such as MD) drive units, magneto-optical disk (MO) drive units, and digital video disk (DVD) drive units.

Further, the present invention is not limited to the above-described embodiment, and variations and modifications may be made without departing from the scope of the present invention.

What is claimed is:

1. A disk drive having a disk loading mechanism which comprises:
   a turntable for supporting a disk at a playback position to rotate the disk around a center of the turntable;
   a clamper for clamping the disk on the turntable when the disk is rotatable around the center of the turntable;
   a clamper holder for supporting the clamper such that the clamper is vertically movable relative to the turntable;
   a turntable moving unit for vertically moving the turntable relative to the clamper between a non-contact position and a supporting position such that when the turntable is in the non-contact position a transporting passage is provided between the turntable and the clamper through which the disk may pass and when the turntable is at the supporting position, the disk is supported on the turntable for the clamper to clamp the disk to the turntable; and a clamper holder moving unit for vertically moving the clamper holder between a first position, a second position and an intermediate position between said first position and said second position with the clamper holder being moved into said positions in a predetermined sequence for controlling the movement of the clamper in relation to the turntable such that when the clamper holder is at the first position no contact occurs between the camper and the disk and, when the clamper holder is at the intermediate position the clamper makes contact with the disk; and wherein the turntable moving unit and the clamper holder moving unit are interconnected such that said clamper holder and turntable move relative to one another in a predetermined sequence with the turntable moved to the supporting position for supporting said disk after the clamper holder is moved to said intermediate position and the clamper holder moves from the intermediate position to the second position after the turntable is moved to the supporting position whereupon the disk supported on the turntable is clamped by the clamper.

2. The disk drive according to claim 1, wherein, when the disk on the turntable at the playback position is released from the clamper, the clamper holder moving unit vertically moves the clamper holder from the second position to the intermediate position before the turntable is moved from the supporting position to the non-contact position by the turntable moving unit, and vertically moves, after the turntable is moved to the non-contact position the clamper holder from the intermediate position to the first position so that the disk on the turntable is released from the clamper, and wherein the clamper holder at the intermediate position places the clamper out of contact with the disk.

3. The disk drive according to claim 1, wherein the disk loading mechanism comprises a disk transporting unit for transporting the disk to the playback position through the transporting passage while the disk is held by the disk transporting unit.

4. The disk drive according to claim 1, wherein the disk loading mechanism comprises a loading arm having a cam formed in the loading arm, and the clamper holder moving unit comprises a clamper slider having a pin formed on the clamper slider, the pin of the clamper slider being connected to the cam of the loading arm when the loading arm is rotated to transport the disk to the playback position.

5. The disk drive according to claim 1, wherein the disk drive comprises a chassis, and the clamper holder moving unit comprises a clamper slider, the clamper slider being movably supported on the chassis.

6. The disk drive according to claim 1, wherein the disk drive comprises a chassis, and the clamper holder moving unit comprises a spring and a clamper slider, the spring being connected at one end to the chassis and connected at the other end to the clamper slider, the clamper slider being movably supported on the chassis and being pulled in a direction by the spring.

7. The disk drive according to claim 1, wherein the disk loading mechanism comprises a slide member having a guide groove, and the turntable moving unit comprises a pin, the pin of the turntable moving unit being connected to the guide groove of the slide member.

8. The disk drive according to claim 1, wherein the clamper holder has pins formed on sides of the clamper holder, and the clamper holder moving unit comprises a clamper slider having guide grooves formed in the clamper slider, the pins of the clamper holder being fitted to the guide grooves of the clamper slider.

9. The disk drive according to claim 1, wherein the disk drive comprises a rotating unit and a disk holder unit for holding a plurality of disks, the disk holder unit and the disk loading mechanism being connected by the rotating unit and being vertically rotatable by the rotating unit.

10. The disk drive according to claim 1, wherein the disk drive comprises a disk holder unit, and the disk loading mechanism comprises a disk transporting unit for transporting the disk from the disk holder unit to the playback position through the transporting passage.

11. A disk drive having a disk loading mechanism which comprises:

a turntable for supporting a disk at a playback position to rotate the disk around a center of the turntable;

a clamper for clamping the disk on the turntable when the disk is rotatable around the center of the turntable;

a clamper holder for supporting the clamper such that the clamper is vertically movable relative to the turntable;

a turntable moving unit for vertically moving the turntable relative to the clamper between a non-contact position and a supporting position such that when the turntable is in the non-contact position a transporting passage is provided between the turntable and the clamper through which the disk may pass and when the turntable is at the supporting position, the disk is supported on the turntable for the clamper to clamp the disk to the turntable; and a clamper holder moving unit for vertically moving the clamper holder between a first position, a second position and an intermediate position between said first position and said second position with the clamper holder being moved into said positions in a predetermined sequence for controlling the movement of the clamper in relation to the turntable such that when the clamper holder is at the first position no contact occurs between the clamper and the disk and, when the clamper holder is at the second position, the disk on the turntable is clamped by the clamper, and wherein the turntable moving unit and the clamper holder moving unit are interconnected such that said clamper holder and turntable move relative to one another in a predetermined sequence such that, when the disk on the turntable at the playback position is released from the clamper, the clamper holder moving unit vertically moves the clamper holder to said intermediate position before the turntable is moved from the supporting position to the non-contact position by the turntable moving unit, and vertically moves, after the turntable is moved to the non-contact position, the clamper holder from the intermediate position to the first position and wherein the clamper holder in said intermediate position keeps the clamper out of contact with the disk when the turntable is moved.

12. The disk drive according to claim 11, wherein, when the disk above the turntable is clamped by the clamper, the clamper holder moving unit vertically moves the clamper holder from the first position to the intermediate position before the turntable is moved to the supporting position by the turntable moving unit, and vertically moves, after the turntable is moved to the supporting position, the clamper holder from the intermediate position to the second position so that the disk on the turntable is clamped by the clamper, and wherein the clamper holder at the intermediate position places the clamper into contact with the disk.

13. The disk drive according to claim 11, wherein the disk loading mechanism comprises a disk transporting unit for transporting the disk to the playback position through the transporting passage while the disk is held by the disk transporting unit.

14. The disk drive according to claim 11, wherein the disk loading mechanism comprises a loading arm having a cam formed in the loading arm, and the clamper holder moving unit comprises a clamper slider having a pin formed on the clamper slider, the pin of the clamper slider being connected to the cam of the loading arm when the loading arm is rotated to transport the disk to the playback position.

15. The disk drive according to claim 11, wherein the disk drive comprises a chassis, and the clamper holder moving unit comprises a clamper slider, the clamper slider being movably supported on the chassis.

16. The disk drive according to claim 11, wherein the disk drive comprises a chassis, and the clamper holder moving unit comprises a spring and a clamper slider, the spring being connected at one end to the chassis and connected at the other end to the clamper slider, the clamper slider being movably supported on the chassis and being pulled in a direction by the spring.

17. The disk drive according to claim 11, wherein the disk loading mechanism comprises a slide member having a guide groove, and the turntable moving unit comprises a pin, the pin of the turntable moving unit being connected to the guide groove of the slide member.

18. The disk drive according to claim 11, wherein the clamper holder has pins formed on sides of the clamper holder, and the clamper holder moving unit comprises a clamper slider having guide grooves formed in the clamper slider, the pins of the clamper holder being fitted to the guide grooves of the clamper slider.

19. The disk drive according to claim 11, wherein the disk drive comprises a rotating unit and a disk holder unit for holding a plurality of disks, the disk holder unit and the disk loading mechanism being connected by the rotating unit and being vertically rotatable by the rotating unit.

20. The disk drive according to claim 11, wherein the disk drive comprises a disk holder unit, and the disk loading mechanism comprises a disk transporting unit for transporting the disk from the disk holder unit to the playback position through the transporting passage.

* * * * *